United States Patent
Comstock et al.

(10) Patent No.: US 11,223,694 B2
(45) Date of Patent: Jan. 11, 2022

(54) SYSTEMS AND METHODS FOR ANALYZING TRAFFIC ACROSS MULTIPLE MEDIA CHANNELS VIA ENCODED LINKS

(71) Applicant: BITLY, INC., New York, NY (US)

(72) Inventors: Christopher Comstock, Louisville, CO (US); Robert Platzer, Brooklyn, NY (US)

(73) Assignee: BITLY, INC., New York, NY (US)

( * ) Notice: Subject to any disclaimer, the term of this patent is extended or adjusted under 35 U.S.C. 154(b) by 69 days.

(21) Appl. No.: 16/741,169

(22) Filed: Jan. 13, 2020

(65) Prior Publication Data

US 2020/0153917 A1 May 14, 2020

Related U.S. Application Data

(63) Continuation of application No. 15/231,453, filed on Aug. 8, 2016, now Pat. No. 10,536,541.

(60) Provisional application No. 62/269,360, filed on Dec. 18, 2015.

(51) Int. Cl.
| | |
|---|---|
| G06F 15/173 | (2006.01) |
| H04L 29/08 | (2006.01) |
| H04W 4/14 | (2009.01) |

(52) U.S. Cl.
CPC ............ *H04L 67/22* (2013.01); *H04L 67/146* (2013.01); *H04W 4/14* (2013.01)

(58) Field of Classification Search
CPC ........ H04L 67/02; H04L 67/42; H04L 67/327
See application file for complete search history.

(56) References Cited

U.S. PATENT DOCUMENTS

| | | | |
|---|---|---|---|
| 2013/0159826 A1* | 6/2013 | Mason | G06F 16/954 715/205 |
| 2014/0207579 A1* | 7/2014 | LeBrun | G06Q 50/01 705/14.66 |

OTHER PUBLICATIONS

Final Office Action on U.S. Appl. No. 15/231,453 dated May 1, 2019.
Non-Final Office Action on U.S. Appl. No. 15/231,453 dated Sep. 14, 2018.
Notice of Allowance on U.S. Appl. No. 15/231,453 dated Sep. 9, 2019.

* cited by examiner

*Primary Examiner* — Yves Dalencourt
(74) *Attorney, Agent, or Firm* — Foley & Lardner LLP

(57) ABSTRACT

The present disclosure is directed towards analyzing traffic across multiple media channels via encoded links. The method may include receiving, by a server of a media channel analysis system, identification of a plurality of media channels for which to generate encoded links to a resource, generating, by the server, different links encoded by the server and linked to the resource, assigning, by the server, a respective encoded link of the generated encoded links to each of the identified media channels, determining, by the server, for each of the identified media channels, statistics related to traffic corresponding to the respective encoded link and providing, by the server, an output comprising at least a portion of the statistics.

18 Claims, 26 Drawing Sheets

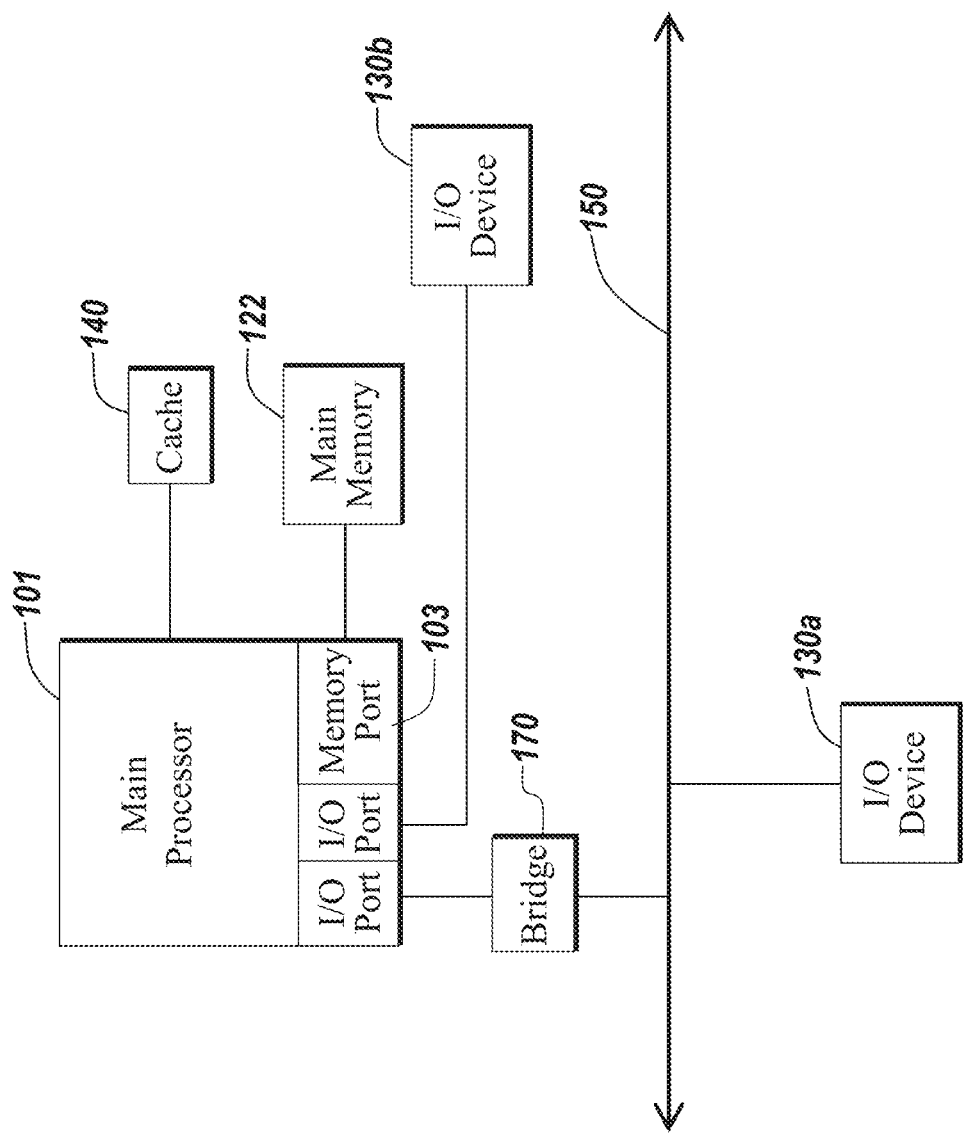

Resource requests table 1160

| Cookie ID 1161 | Source resource 1162 | Source Content publisher ID 1163 | Destination resource 1164 | Destination Content publisher ID 1165 | Timestamp 1166 |
|---|---|---|---|---|---|
| C1 | yahoo.com | P3 | mtv.com | P1 | 04/12/2015 12:00:00 |
| C1 | facebook.com | P4 | mtv.com | P1 | 04/19/2015 05:00:00 |
| C2 | dogs.com | P5 | mtv.com | P1 | 06/09/2015 02:00:00 |
| C2 | cats.com | P5 | mtv.com | P1 | 10/25/2015 12:00:00 |
| C1 | facebook.com | P4 | abc.com | P2 | 11/26/2015 15:00:00 |

Content publisher table 1167

| resource 1168 | Content publisher ID 1169 |
|---|---|
| mtv.com | P1 |
| abc.com | P2 |
| yahoo.com | P3 |
| facebook.com | P4 |
| dogs.com | P5 |
| cats.com | P5 |

Database 230

*Fig. 11B*

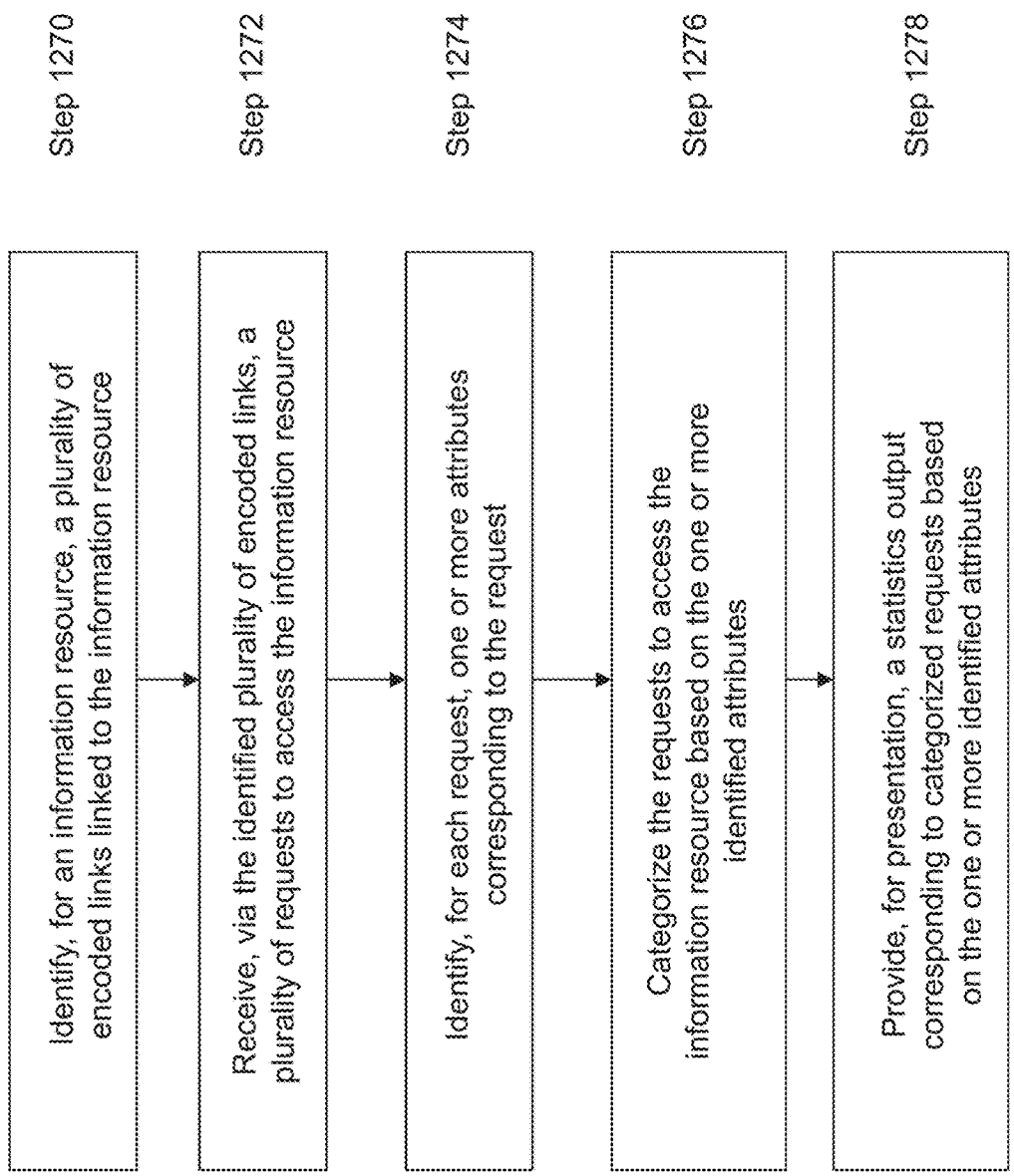

SYSTEMS AND METHODS FOR ANALYZING TRAFFIC ACROSS MULTIPLE MEDIA CHANNELS VIA ENCODED LINKS

RELATED APPLICATION

The application claims the benefit of and priority under 35 U.S.C. § 120 as a continuation application of U.S. patent application Ser. No. 15/231,453, titled "SYSTEMS AND METHODS FOR ANALYZING TRAFFIC ACROSS MULTIPLE MEDIA CHANNELS VIA ENCODED LINKS," filed on Aug. 8, 2016, which claims the benefit of and priority under 35 U.S.C. § 119(e) to U.S. Patent Application 62/269,360, titled "METHODS AND SYSTEMS FOR SOCIAL MEDIA CHANNEL SPECIFIC MARKETING CAMPAIGNS AND METRICS," filed on Dec. 18, 2015, both of which are incorporated by reference in their entireties.

FIELD OF THE INVENTION

The present application is generally directed to systems and methods for analyzing traffic across multiple media channels via encoded links. In particular, the present application is directed to generating respective encoded links to a resource for different media channels, and determining, for each of the media channels, traffic statistics related to user interactions with the encoded links, and providing channel-specific or aggregate traffic statistics.

BACKGROUND

With the growth of social networking and content on the Internet in general, more and more people are sharing content with other people on a regular basis across multiple online media channels. As a result of one person sharing content across the multiple media channels, a multitude of users may interact with the same content across the multiple media channels. This sharing may occur with a plurality of different content from different sources. This sharing also allows a marketer to share their marketing campaigns across multiple media channels as marketing channels.

SUMMARY OF THE INVENTION

The present solution provides multiple techniques for identifying, tracking and analyzing user's interactions with content that may be shared across the Internet. Embodiments of the present solution identifies and tracks user's interactions with content, such as via clicking on shortened URLs or links that may be shared among users. One technique of the present solution provides a relevance score of a digital resource based on user's interactions with digital resources. Another technique of the present solution provides relevance search results based on user interaction with content. Another technique of the present solution identifies phrases that are trending or are temporally popular based on aggregating multiple users' interactions with an aggregate of content. Yet another technique of the present solution identifies trending phrases that are relevant to a unique user. One technique of the present solution provides for tracking influence of a user, based on engagement or clicks driven by that user on content shared by that user, such as via shortened links. Another technique of the present solution provides a recommended set of URLs given an input URL based on user interactions with a list of related URLs.

In one aspect, the present application is directed to a method for relevance scoring of a digital resource keyword based on user actions associated with a plurality of digital resources. The method scores content, URLs, domains, phrases or any entity (all of which are examples of digital resources) based on an expected relevance to an individual user which may be based on that user's previous engagement with digital resources. The method may include receiving, by a server, identification of a first plurality of actions of a user. Each of the first plurality of actions may include a click by the user on a link associated with a digital resource of a plurality of digital resources. The server may receive identification of a second plurality of actions of the user to share one or more digital resources of the plurality of digital resources. The server may identify a plurality of keywords from content of one or more digital resources of the plurality of digital resources. The server may classify patterns from the first plurality of actions, the second plurality of actions and the plurality of keywords. The server may generate, based on the pattern classification, a relevance score responsive to receiving a user identifier and a digital resource keyword.

In some embodiments, the server may receive identification of the first plurality of actions of the user comprising clicks by the user on an encoded link associated with the digital resource. The encoded link may provide a shortened version of the link to the digital resource. The server may receive identification of the first plurality of actions of the user from one or more cookies associated with the user. The server may receive identification of the second plurality of actions of the user comprising forwarding at least a portion of content of the digital resource to a second user. The server may receive identification of the second plurality of actions of the user comprising sharing at least a portion of content from the digital resource in a social networking site. The server may identify the plurality of keywords from the content based on one or more of the following: text, phrases and meta-data. The server may identify the plurality of keywords from analyzing text or phrases in media files, such as video and/or audio files.

In some embodiments, the server may classify patterns from the plurality of digital resources. The server may match the digital resource keyword to the pattern classification data of the user identified by the user identifier. The server may receive the user identifier and the digital resource keyword comprising any of the following: uniform resource locator, domain name and a phrase. The server may generate a data score identifying an amount or quality of data classified for the user. The digital resource may include any of the following: content, a web page, a uniform resource locator, a domain name and a phrase.

In another aspect, the present application is directed to a system for relevance scoring of a digital resource keyword based on user actions associated with a plurality of digital resources. The system scores content, URLs, domains, phrases or any entity (all of which are examples of digital resources) based on an expected relevance to an individual user which may be based on that user's previous engagement with digital resources. The system may include a server receiving identification of a first plurality of actions associated with digital resources and a second plurality actions of user engagement with digital resources such as via viewing of the digital resource by others to whom the user shared the digital resource. Each of the first plurality of actions may include a click by the user on a link associated with a digital resource of a plurality of digital resources. Each of the second plurality of actions of the user may include an action to share one or more digital resources of the plurality of digital resources. A content extractor may identify a plurality of keywords from content of one or more digital resources of the plurality of digital resources. A classifier may classify patterns from the first plurality of actions, the second plurality of actions and the plurality of keywords. In addition, a relevance score generator may generate, responsive to the classifier, a relevance score responsive to receiving a user identifier and a digital resource keyword.

In some embodiments, the first plurality of actions of the user includes clicks by the user on an encoded link associated with the digital resource. The encoded link may provide a shortened version of the link to the digital resource. The server may identify the first plurality of actions of the user from one or more cookies associated with the user. The second plurality of actions of the user may comprise forwarding at least a portion of content of the digital resource to a second user. The second plurality of actions of the user may include sharing at least a portion of content from the digital resource in a social networking site.

In certain embodiments, the content extractor may identify the plurality of keywords from the content based on one or more of the following: text, phrases, images and metadata. The content extractor may identify the plurality of keywords from media by analyzing text, phrases or content of media files, such as video and/or audio files. The relevance score generator may match, via the classifier, the digital resource keyword to the pattern classification data of the user identified by the user identifier. The classifier may further classify patterns from the plurality of digital resources. The relevance score generator may receive the digital resource keyword comprising any of the following: uniform resource locator, domain name and a phrase. The relevance score generator may generate a data score identifying an amount of data of the classifier for the user. The digital resource may, in some embodiments, comprise any of the following: content, a web page, a uniform resource locator, a domain name and a phrase.

In yet another aspect, the present application is directed to a method for providing search results based on user interaction with content. The method may include receiving, by a server, identification of a plurality of clicks of encoded uniform resource locator (URL) links. The server may identify, for each of the plurality of clicks, data about a user who clicked an encoded URL link and traffic data associated with a device from which the user clicked the encoded URL link. The server may store a record for each click of the plurality of clicks, the record comprising data about the user and traffic data associated with each click. The server may determine, based on the records, a relevancy score for each content identified from decoding the encoded URL links. The server may communicate, responsive to receiving a request to search content based on a keyword, a set of search results based on the keyword and the relevancy score. The search results may be based on audience segmenting parameters identified via the request, such as geography, language or other demographic parameters.

In some embodiments, the server decodes each of the encoded URL links. The server may identify data about the user from a cookie communicated via a click by the user on the encoded URL link. The server may identify traffic data comprising one or more of a browser type, a referring web site, a source internet protocol address and a destination internet protocol address. In certain embodiments, the server may determine an engagement score for each content based on a number of clicks received via one or more encoded URL links to the content. Each of the number of clicks may be weighted based on when received. The server may determine a distribution score for each content based on a number of clicks from different sources via one or more encoded URL links to the content. The server may determine a social score for each content. The server may determine a frequency normalization value for each content by extracting keywords from the content, normalizing the keywords and storing the keywords and corresponding normalization values into a database.

In certain embodiments, the server may apply a time decay function to the relevancy score based on the length of time a content has been stored in a record after being identified from decoding the encoded URL links. The server may determine the relevancy score by a combination of two or more of a social score, a distribution score, an engagement score, a frequency normalization value and a time decay function. In some embodiments, the server may order the set of search results by relevance score. Although sometimes referred to as scores, these score may be considered weights to be applied to determine the relevance score.

In still another aspect, the present application is directed to a system for providing search results based on user interaction with content. A server may receive identification of a plurality of clicks of encoded uniform resource locator (URL) links. A click tracker may identify, for each of the plurality of clicks, data about a user who clicked an encoded URL link and traffic data associated with a device from which the user clicked the encoded URL link. A database may store a record for each click of the plurality of clicks. The record may include data about the user and/or traffic data associated with each click. A relevancy scorer may determine, based on the records, a relevancy score for each content identified from decoding the encoded URL links. The server may communicate a set of search results based on the keyword and the relevancy score responsive to receiving a request to search content based on a keyword. The server may perform the search based on any audience segmentation parameters, such as a geography, language or other demographics.

In some embodiments, the server may decode each of the encoded URL links. The click tracker may identify data about the user from a cookie communicated via a click by the user on the encoded URL link. The click tracker may identify traffic data comprising one or more of a browser type, a referring web site, a source internet protocol address and a destination internet protocol address. In certain embodiments, the relevancy scorer determines a distribution score for each content based on a number of clicks from different sources via one or more encoded URL links to the content. The relevancy scorer may determine an engagement score for each content based on a number of clicks received via one or more encoded URL links to the content. Each of the number of clicks may be weighted based on when received.

In some embodiments, the relevancy scorer determines a frequency normalization value for each content by extracting keywords from the content. The relevancy scorer may normalize the keywords and may store the keywords and corresponding normalization values into a database. The relevancy scorer may apply a time decay function to the relevancy score based on the length of time a content has been stored in a record after being identified from decoding the encoded URL links. The relevancy scorer may determine the relevancy score by a combination of two or more of a distribution score, an engagement score, a frequency normalization value and a time decay function. The relevancy scorer generate and/or may order search results by relevance score.

In another aspect, the present application is directed to a method for identifying trends in phrases based on users interaction with content containing, related to or associated with the phrases. The method may identify trending or temporally popular phrases based on aggregating multiple users' interactions with an aggregate of content. The method may include receiving, by a server, identification of a plurality of clicks of encoded uniform resource locator (URL) links. The server may identify, for each of the plurality of clicks, in content identified from decoding the encoded URL links, a plurality of phrases that correspond to a predetermined set of keywords. The server may determine a velocity of clicks on content corresponding to each phrase of the plurality of phrases. The server may identify a trend in one or more phrases of the plurality of phrases based on the velocity of clicks. The server may receive identification of the plurality of clicks from a plurality of different users via a plurality of different sources.

In some embodiments, the server decodes each of the encoded URL links to obtain a URL to the content. The server may identify the plurality of phrases in the content based on one of text or meta-data in the content. The server may identify one or more phrases of the plurality of phrases in the content that deviates from a predetermined norm for the content. The server may determine velocity based on a number of clicks via one or more encoded URL links within a predetermined time period on content corresponding to a phrase. The server may determine velocity based on a rate of clicks via one or more encoded URL links to content corresponding to a phrase. The server may determine velocity based on a change in rate of clicks via one or more encoded URL links to content corresponding to a phrase. In some embodiments, the server enumerates a list of phrases from the plurality of phrases based on increasing velocity of clicks. The server may enumerate a list of phrases from the plurality of phrases based on decreasing velocity of clicks.

In yet another aspect, the present application is directed to a system for identifying trends in phrases based on users interaction with content containing, related to or associated with the phrases. The system may identify trending or temporally popular phrases based on aggregating multiple users' interactions with an aggregate of content. The system may include a server receiving identification of a plurality of clicks of encoded uniform resource locator (URL) links. A content extractor may identify, for each of the plurality of clicks, in content identified from decoding the encoded URL links, a plurality of phrases that correspond to a predetermined set of keywords. A trending engine may determine a velocity of clicks on content corresponding to each phrase of the plurality of phrases and identifying a trend in one or more phrases of the plurality of phrases based on the velocity of clicks.

In some embodiments, the server receives identification of the plurality of clicks from a plurality of different users via a plurality of different sources. The server may decode each of the encoded URL links to obtain a URL to the content. In certain embodiments, the content extractor identifies the plurality of phrases in the content based on one of text or meta-data in the content. In some embodiments, the content extractor identifies a plurality of phrases in the media content based on analyzing text or meta-data in a media file, such as video and/or audio files. The content extractor may identify one or phrases of the plurality of phrases in the content that deviates from a predetermined norm for the content. The trending engine may determine velocity based on a number of clicks via one or more encoded URL links within a predetermined time period on content corresponding to a phrase. The trending engine may determine velocity based on a rate of clicks via one or more encoded URL links to content corresponding to a phrase. The trending engine may determine velocity based on a change in rate of clicks via one or more encoded URL links to content corresponding to a phrase. The trending engine may enumerate a list of phrases from the plurality of phrases based on increasing velocity of clicks. The trending engine may enumerate a list of phrases from the plurality of phrases based on decreasing velocity of clicks.

In yet another aspect, the present application is directed to a method for identifying which phrases are trending across an aggregate of users that are relevant to a specific user. The method may include receiving, by a server, identification of a user. The server may identify a plurality of phrases that are trending upwards based on velocity of clicks to content containing, related to or associated with the plurality of phrases. The server may identify trending or temporally popular phrases based on aggregating multiple users' interactions with an aggregate of content. The server may determine a relevance score for each phrase of the plurality of phrases that are trending upwards based on identification of the user and actions of the user on content associated with each phrase, such as user clicking on content identifying or related to each phrase. The server may identify one or more phrases of the plurality of phrases based on relevance score.

In some embodiments, the server may receive identification of the user via a cookie. The server may identify the plurality of phrases that are trending upwards above a predetermined threshold. The server may identify an enumerated list of the plurality of phrases based on trending from highest to lowest. The server may determine the relevance score for each phrases based on a plurality of actions of the user to click on a link to content user on content related to or identifying each phrase. The server may determine the relevance score for each phrase based on a plurality of actions of the user to share content associated with each phrase. The server may select the one or more phrases with the highest relevance score. In some embodiments, the server selects the one or more phrases with a relevance score greater than a predetermined threshold. The server may select the one or more phrases with a relevance score greater than a first predetermined threshold and that are trending within a second predetermined threshold. The server may select content to serve the user based on the identified one or more phrases.

In yet another aspect, the present application is directed to a system for identifying phrases trending across an aggregate of user interactions that are relevant to a specific user. The system may include a server receiving identification of a user. A trending engine may identify a plurality of phrases that are trending upwards based on velocity of clicks from a plurality of user to content containing, associated with or related to the plurality of phrases. The trending engine may identify trending or temporally popular phrases based on aggregating multiple users' interactions with an aggregate of content. A relevance scorer may determine for each phrase of the plurality of phrases that are trending upwards based on identification of the user and actions of the user on content associated with or identifying each phrase, such as a user clicking on content related to each phrase. The server may identify one or more phrases of the plurality of phrases based on relevance score.

In some embodiments, the server receives identification of the user via a cookie. The trending engine may identify the plurality of phrases that are trending upwards above a predetermined threshold. The trending engine may identify the plurality of phrases that are trending based on rank ordered relative to other phrases. The trending engine may identify an enumerated list of the plurality of phrases based on trending from highest to lowest. In certain embodiments, the relevance scorer determines the relevance score for each phrase based on a plurality of actions of the user to click on a link to content relating to or identifying each phrase. The relevance scorer may determine the relevance score for each phrase for each user based on a plurality of actions of the user to share content associated with each phrase. The server may select the identified one or more phrases with the highest relevance score. The server may select the identified one or more phrases with a relevance score greater than a predetermined threshold. The server may select the identified one or more phrases with a relevance score greater than a first predetermined threshold and that are trending within a second predetermined threshold. In some embodiments, one of the server or a second server selects content to serve the user based on the identified one or more phrases.

In yet another aspect, the present application is directed to a method for tracking influence of a user on content shared via encoded uniform resource locator (URL) links. Measuring influence of a user may identify what level of engagement the user drives to content when the user shares content with other users, such as via encoded links. A high influencer may be a user who drives a high level of engagement with content when the user shares content. A low influencer may be a user who does not drive a high level of engagement, or otherwise drives a low level of engagement with content when the user shares content. The method may include receiving, by a server, identification of a user for each of a plurality of encoded uniform resource locator (URL) links. The server may identify a plurality of keywords from content identified by each encoded URL link. The server may determine a number of actions via a plurality of users that decoded each encoded URL link of the plurality of encoded URL links of the user. The server may store, in a profile of the user, information on the one or more keywords and the number of actions.

In some embodiments, the server receives one or more requests from the user to encode one or more the plurality of encoded URL links. The server may identify the user via one of a cookie or a user account with the server. The server may identify the plurality of keywords from the content identified by the decoded URL links based on one or more of the following: text, phrases and meta-data. The server may identify the plurality of keywords from media associated with or in the content identified by the decoded URL links based on analyzing text or phrases in the media file, such as video and/or audio files. The server may determine the plurality of actions of the plurality of users on the encoded URLs links from one or more cookies associated with each of the plurality of users. The server may receive identification of the plurality of actions of the plurality of users comprising forwarding by each of the plurality of the users an encoded URL link. The server may receive identification of the plurality of actions of the plurality of users comprising sharing by each of the plurality of the users an encoded URL link in one or more social networking sites. In certain embodiments, the server may receive a request for a relevance score for the user and a keyword. The server may generate the relevance score responsive to the request and one of up weighting or down weighting the relevance score based on the profile of the user. The server may generate the relevance score responsive to the request and generating the relevance score based on the profile of the user and the profiles of users who decoded the encoded URL links of the user.

In still another aspect, the present application is directed to a system for tracking influence of a user on content shared via encoded uniform resource locator (URL) links. The system may include a server receiving identification of a user for each of a plurality of encoded uniform resource locator (URL) links. A content extractor may identify a plurality of keywords from content identified by each encoded URL link. A click tracker determining a number of actions via a plurality of users that decoded each encoded URL link of the plurality of encoded URL links of the user. The server may store in a profile of the user information on the one or more keywords and the number of actions.

In certain embodiments, the server may receive one or more requests from the user to encode one or more of the plurality of encoded URL links. The server may identify the user via one of a cookie or a user account with the server. The server may identify the plurality of keywords from the content identified by the decoded URL links based on one or more of the following: text, phrases and meta-data. The server may identify the plurality of keywords from media associated with or in the content identified by the decoded URL links based on analyzing text or phrases in the media file, such as video and/or audio files. The click tracker may determine the plurality of actions of the plurality of users on the encoded URLs links from one or more cookies associated with each of the plurality of users.

In some embodiments, the plurality of actions of the plurality of users may include forwarding by each of the plurality of the users an encoded URL link. The plurality of actions of the plurality of users may include sharing by each of the plurality of the users an encoded URL link in one or more social networking sites. The server may receive a request for a relevance score for the user and a keyword. A relevance scorer may generate the relevance score responsive to the request and one of up weights or down weights the relevance score based on the profile of the user. A relevance scorer may generate, responsive to the request, the relevance score based on the profile of the user and the profiles of users who decoded the encoded URL links of the user.

In still another aspect, the present application is directed to a method for providing a recommended list of uniform resource locators (URLs) responsive to a uniform resource locator (URL). The method may include identifying, by a server, a plurality of users that clicked on an encoded uniform resource locator (URL) link corresponding to a URL. The server may identify a plurality of encoded URL links clicked by each of the plurality of users. The server may determine a number of users who clicked on each encoded URL link of the plurality of encoded URL links and also clicked on the encoded URL link. The server may enumerate, responsive a request comprising the URL, a list of URLs and their corresponding score based on the determination, each URL of the list of URLs corresponding to one of the plurality of encoded URL links.

In certain embodiments, the server may receive identification of a click of the encoded URL link from each of the plurality of users. The server may determine a decoded URL corresponding to the encoded URL link. The server may identify the user via a cookie. The server may track clicks on encoded URL links for each user of the plurality of users. The server may generate a click co-occurrence map that correlates the plurality of users that clicked on the encoded URL link. The server may generate the click co-occurrence map or co-occurrence map that correlates the plurality of users that clicked on the encoded URL link to the plurality of encoded URLs link that each of the plurality of users has clicked. The server may communicate a response to the request. The response may include the enumerated list of URLs and their corresponding score. The server may enumerate the list of URLS ordered by the number of users who clicked on the encoded URL link corresponding to the URL and clicked on the encoded URL link. The server may filter the list of URLs based on content or domain.

In another aspect, the present application is directed to a system for providing a recommended list of uniform resource locators (URLs) responsive to a uniform resource locator (URL). The system may include a server identifying a plurality of users that clicked on an encoded uniform resource locator (URL) link corresponding to a URL. A click tracker may identify a plurality of encoded URL links clicked by each of the plurality of users. A correlation engine may determine a number of users who clicked on each encoded URL link of the plurality of encoded URL links and also clicked on the encoded URL link. The server may, responsive to a request comprising the URL, enumerate a list of URLs. Each URL of the list of URLs may correspond to one of the plurality of encoded URL links.

In certain embodiments, the server may receive identification of a click of the encoded URL link from each of the plurality of users. The server may determine a decoded URL corresponding to the encoded URL link. In certain embodiments, the server identifies the user via a cookie. The click tracker may track clicks on encoded URL links for each user of the plurality of users. The correlation engine may generate a click coherency or co-occurrence map that correlates the plurality of users that clicked on the encoded URL link. The correlation engine may generate the click co-occurrence map that correlates the plurality of users that clicked on the encoded URL link to the plurality of encoded URLs link that each of the plurality of users has clicked.

In certain embodiments, the server communicates a response to the request, the response comprising the enumerated list of URLs and their corresponding score. The server may enumerate the list of URLS ordered by the number of users who clicked on the encoded URL link corresponding to the URL and clicked on the encoded URL link. The server may filter the list of URLs based on content identified by the URL.

In another aspect, the present application is directed to a method for monitoring online activities of users. The method may include providing, by a server of a link shortening system, a cookie of the link shortening system to a client device responsive to receiving from a client device, a first request from a first resource to access a first link that is encoded by the link shortening system and linked to a second resource. The server may identify from the first request, the cookie of the link shortening system, the first resource and the second resource. The server may receive from the client device, a second request to access a second link that is encoded by the link shortening system and linked to a third resource. The server may identify from the second request, the same cookie provided to the client device and the third resource. The server may identify, via the cookie provided to the client device, that the client device has accessed the first resource, the second resource and the third resource.

In some embodiments, the server may identify, from the second request, a fourth resource from which the server received the second request. The fourth resource may be the same as the first resource.

In some embodiments, the server may receive a third request from a fifth resource to access a link that is encoded by the link shortening system and linked to a sixth resource, and identify, via the cookie provided to the client device, that the client device has accessed the first resource, the second resource, the third resource, the fourth resource, the fifth resource and the sixth resource.

In some embodiments, the first request may be received by receiving a first interaction on the first encoded link, and the second request may be received by receiving a second interaction on the second encoded link. The server may provide an output identifying a plurality of resources accessed by the client device. Responsive to the server receiving the second request from the client device, the server may receive the cookie included in the second request, update browsing data stored in the cookie to include a source resource and a destination resource identified by the second request, and transmit, to the client device, the updated cookie.

In some embodiments, the server may provide the cookie responsive to determining that the first request does not identify a cookie. The server may provide a second cookie to a second client device responsive to receiving a request to access any link encoded by the link shortening system. The server may identify, from the second cookie, a plurality of resources accessed by the second client device based on links encoded by the link shortening system.

In still another aspect, the present application is directed to a system for monitoring online activities of users. A server of a link shortening system may include a cookie management engine and a resource identification engine. The cookie management engine may be configured to provide a cookie to a client device responsive to receiving from a client device, a first request from a first resource to access a first link that is encoded by the link shortening system and linked to a second resource. The resource identification engine may be configured to identify from the first request, the cookie, the first resource and the second resource, receive a second request to access a second link that is encoded by the link shortening system and linked to a third resource, identify from the second request, the same cookie provided to the client device by the cookie management engine and the third resource, and identify, via the cookie provided to the client device, that the client device has accessed the first resource, the second resource and the third resource.

In some embodiments, the resource identification engine may be further configured to identify, from the second request, a fourth resource from which the server received the second request. The fourth resource may be the same as the first resource.

In some embodiments, the resource identification engine may be further configured to receive a third request from a fifth resource to access a link that is encoded by the link shortening system and linked to a sixth resource, and identify, via the cookie provided to the client device, that the client device has accessed the first resource, the second resource, the third resource, the fourth resource, the fifth resource and the sixth resource.

In some embodiments, the first request may be received by receiving a first interaction on the first encoded link, and the second request may be received by receiving a second interaction on the second encoded link. The resource identification engine may be further configured to provide an output identifying a plurality of resources accessed by the client device. Responsive to the server receiving the second request from the client device, the cookie management engine may be configured to receive the cookie included in the second request, update browsing data stored in the cookie to include a source resource and a destination resource identified by the second request, and transmit, to the client device, the updated cookie.

In some embodiments, the cookie management engine may be configured to provide the cookie responsive to determining that the first request does not identify a cookie. The cookie management engine may be configured to provide a second cookie to a second client device responsive to receiving a request to access any link encoded by the link shortening system.

In some embodiments, the resource identification module may be further configured to identify, from the second cookie, a plurality of resources accessed by the second client device based on links encoded by the link shortening system.

In another aspect, the present application is directed to a system for analyzing traffic across multiple media channels via encoded links. A server of a link shortening system may be configured to receive identification of the media channels to distribute a link to a resource and generate different links encoded by the server and linked to the resource for the identified media channels. The server may be configured to assign a respective encoded link of the generated encoded links to each of the identified media channels and determine for each of the identified media channels, statistics related to the respective encoded link. The server may also be configured to provide an output comprising at least a portion of the statistics.

In some embodiments, the statistics may include for each media channel, at least one of a first number of requests to access the resource that were received or a second number of different source Uniform Resource Locators (URLs) from which requests to access the resource were received.

In some embodiments, the server may be further configured to assign the respective encoded link to each of the identified media channels by assigning a first encoded link to a first social networking channel, a second encoded link to a Short Message Service (SMS) channel, and a third encoded link to an email channel.

In some embodiments, the server is configured to provide the output by providing statistics relating to performance of a Short Message Service (SMS) channel or an email channel. The SMS channel or email channel may have a source address that is not a Uniform Resource Locator (URL).

In some embodiments, the server may be configured to identify, for the resource, a first statistic for each of the media channels, and aggregate each of the identified first statistics to generate an aggregate first statistic for the resource. The server may be further configured to rank each of the media channels based on their respective first statistics. The portion of the statistics relates to a specific media channel that is one of social networking channel, Short Message Service (SMS) channel and email channel.

In some embodiments, the server may be further configured to identify a common source Uniform Resource Locator (URL) across multiple media channels. The server may be configured to receive multiple requests to access a first resource via a first encoded link linked to the first resource and generated for a first media channel. The server may be configured to identify a common source URL from which requests to access the first resource via the first encoded link, among the multiple requests, were received.

In some embodiments, the media channels may include a first channel corresponding to a first domain and a second channel corresponding to a second domain. The media channels may include a first channel corresponding to a first advertisement of an advertiser and a second channel corresponding to a second advertisement of the advertiser.

In still another aspect, the present application is directed to a method for traffic across multiple media channels via encoded links. The method may include receiving, by a server of a media channel analysis system, identification of the media channels to distribute a link to a resource. The server may generate different encoded links linked to the resource for the identified media channels and assign a respective encoded link of the generated encoded links to each of the identified media channels. The server may also determine, for each of the identified media channels, statistics related to the respective encoded link, and provide an output comprising at least a portion of the statistics.

In some embodiments, the statistics may include for each media channel, at least one of a first number of requests to access the resource that were received or a second number of different source Uniform Resource Locators (URLs) from which requests to access the resource were received. In assigning the respective encoded link to each of the identified media channels, the server may assign a first encoded link to a first social networking channel, a second encoded link to a Short Message Service (SMS) channel, and a third encoded link to an email channel.

In some embodiments, in providing the output, the server may provide statistics relating to performance of a Short Message Service (SMS) channel or an email channel. The SMS channel or email channel may have a source address that is not a Uniform Resource Locator (URL). For the resource, a first statistic may be identified for each of the media channels. Each of the identified first statistics may be aggregated to generate an aggregate first statistic for the resource. Each of the media channels may be ranked based on their respective first statistics.

In some embodiments, the portion of the statistics may relate to a specific media channel that is one of social networking channel, Short Message Service (SMS) channel and email channel. Multiple requests to access a first resource may be received via a first encoded link linked to the first resource and generated for a first media channel. A common source Uniform Resource Locator (URL) may be identified from which requests to access the first resource via the first encoded link, among the plurality of requests, were received.

In some embodiments, the media channels may include a first channel corresponding to a first domain, a second channel corresponding to a second domain, a third channel corresponding to a first advertisement of an advertiser, and a fourth channel corresponding to a second advertisement of the advertiser.

In still another aspect, the present application is directed to a system for analyzing online content audience. The system may include a server of a linking system, including a cookie management engine and a content publisher identification engine. The cookie management engine may be configured to receive a plurality of interactions with encoded links generated by the linking system and linked to resources of a first content publisher, and identify, from the plurality of interactions, a plurality of cookies of the linking system assigned to unique client devices. The content publisher identification engine may be configured to identify second content publishers having resources that were accessed by the client devices corresponding to the plurality of cookies via encoded links generated by the server, and provide, to the first content publisher, data corresponding to the identified second content publishers having resources accessed by client devices that also accessed the resources of the first content publisher.

In some embodiments, the server may further includes a link generation engine configured to generate the encoded links linked to the resources of the first content publisher. In receiving the plurality of interactions, the cookie management engine may be configured to receive, from the client devices, a plurality of requests to access the encoded links.

In some embodiments, each request to access an encoded link from a client device of the client devices may identify i) a source URL identifying a resource on which the encoded link was presented and ii) a cookie of the linking system that is unique to the client device. The cookie management engine may be further configured to identify, for each request, a source content publisher corresponding to the resource identified by the source URL.

In some embodiments, the content publisher identification engine may be further configured to provide, to the first content publisher, data corresponding to the identified source content publishers having resources identified by the source URLs that are accessed by the client devices that also accessed the resources of the first content publisher. The cookie management engine may be further configured to store the plurality of requests to access encoded links in a data structure, the data structure including data identifying the source URL on which the encoded link was presented, the identity of the first content publisher, the destination URL identifying the resource of the first content publisher, and the cookie provided to the client device.

In some embodiments, the cookie management engine may be further configured to determine that the request includes a cookie of the linking system, and responsive to determining that the request does not include a cookie of the linking system, provide, to the client device, a unique cookie of the linking system. The content publisher identification engine may be further configured to receive, from the first content publisher, a request to identify content publishers that have resources that have been accessed by client devices that also accessed the first content publisher.

In still another aspect, the present application is directed to a method for analyzing online content audience. The method may include receiving, by a server of a linking system, a plurality of interactions with encoded links generated by the linking system and linked to resources of a first content publisher. The server may identify from the plurality of interactions, a plurality of cookies of the linking system assigned to unique client devices. The server may identify second content publishers having resources that were accessed by the client devices corresponding to the plurality of cookies via encoded links generated by the server of the linking system. The server may provide, to the first content publisher, data corresponding to the identified second content publishers having resources accessed by client devices that also accessed the resources of the first content publisher.

In some embodiments, the server may generate the encoded links linked to the resources of the first content publisher. In receiving the plurality of interactions, the server may receive, from the client devices, a plurality of requests to access the encoded links. Each request to access an encoded link from a client device of the client devices may identify i) a source URL identifying a resource on which the encoded link was presented and ii) a cookie of the linking system that is unique to the client device. The server may further identify, for each request, a source content publisher corresponding to the resource identified by the source URL.

In some embodiments, the server may provide, to the first content publisher, data corresponding to the identified source content publishers having resources identified by the source URLs that are accessed by the client devices that also accessed the resources of the first content publisher. The server may store, to memory, the plurality of requests to access encoded links in a data structure, the data structure including data identifying the source URL on which the encoded link was presented, the identity of the first content publisher, the destination URL identifying the resource of the first content publisher, and the cookie provided to the client device.

In some embodiments, the server may determine that the request includes a cookie of the linking system, and responsive to determining that the request does not include a cookie of the linking system, provide, to the client device, a unique cookie of the linking system. The server may further receive, from the first content publisher, a request to identify content publishers that have resources that have been accessed by client devices that also accessed the first content publisher.

In still another aspect, the present application is directed to a method for analyzing online content audience. The method may include receiving, by a server of a linking system, a plurality of requests to access destination resources of a plurality of content publishers via interactions with encoded links linked to the destination resources, the encoded links generated by the linking system and presented on source resources. The server may identify from the plurality of requests, a plurality of cookies of the linking system assigned to unique client devices. The server may identify second resources that were accessed by the client devices corresponding to the plurality of cookies via encoded links generated by the server of the linking system. The server may store, for each cookie of the plurality of cookies, in memory, data indicating i) the destination resources of the plurality of content publishers accessed by the client device of the cookie, ii) the source resources on which encoded links linked to the resources accessed by the client device of the cookie; and iii) second resources accessed by the client device of the cookie. The server may provide to a content publisher of the plurality of content publishers, statistics derived from the stored data.

In some embodiments, the server may further determine, for a destination resource of the destination resources, a topic based on the content included in the destination resource, and generate, from the stored data, a list including one or more of the second resources that also relate to the topic based on the content included in the second resources.

In some embodiments, the server may further provide, to a first content publisher of the plurality of content publishers, a list including one or more domains corresponding to the resources accessed by client devices that also accessed resources of the first content publisher. The server may further provide, to a first content publisher of the plurality of content publishers, a number of cookies of the linking system that accessed a first resource of the first content publisher and a second resource of a second content publisher of the plurality of content publishers.

In another aspect, the present application is directed to a system for benchmarking online activity via encoded links generated by an online activity benchmarking system. A server of a online activity benchmarking system may be configured to identify, for an information resource, multiple encoded links encoded by the server of the online activity benchmarking system and linked to the information resource. The server may be configured to receive, via the identified multiple encoded links, multiple requests to access the information resource. The server may be configured to identify, for each request of the multiple requests to access the information resource, one or more attributes corresponding to the request. The server may be configured to categorize the multiple requests to access the information resource based on the one or more identified attributes. The server may be further configured to provide, for presentation, an output indicating statistics corresponding to the categorized multiple requests based on the one or more identified attributes.

In some embodiments, the one or more attributes corresponding to each request that is performed by a client device, may include a type of the client device, a geographic location of the client device, a time of day at which the request is performed, or a source Uniform Resource Locator (URL) on which the request is performed. The server may be further configured to identify, from the multiple requests, multiple cookies of the online activity benchmarking system assigned to unique client devices.

In some embodiments, the server may be configured to identify, from a cookie corresponding to each request, one or more attributes corresponding to the request. The server may be further configured to provide a first number of requests via a first one of the multiple links across the at least one attribute of the one or more identified attributes, and a second number of requests via a second one of the multiple encoded link across the at least one attribute of the one or more identified attributes.

In some embodiments, the server may be further configured to rank each of the first and second encoded links based on their respective number of requests across the at least one attribute of the one or more identified attributes. The server may be configured to generate a first set of encoded links of the multiple encoded links for presentation on multiple first source information resources corresponding to a first vertical, and generate a second set of encoded links of the multiple encoded links for presentation on multiple second source information resources corresponding to a second vertical different from the first vertical.

In some embodiments, in categorizing the multiple requests to access the information resource based on the one or more identified attributes, the server may be configured to assign a first set of the multiple requests to the first vertical and assign a second set of the multiple requests to the second vertical.

In some embodiments, the server may be further configured to identify, for each request of the first set of the multiple requests assigned to the first vertical, a cookie of the online activity benchmarking system assigned to a client device from which the request is received. The server may be further configured to update a data structure of the cookie to associate the cookie to the first vertical.

In some embodiments, the server may be further configured to determine a first number of requests to access the information resource via encoded links of the online activity benchmarking system that are displayed on webpages corresponding to a first vertical. The server may be further configured to determine a second number of requests to access the information resource via encoded links of the online activity benchmarking system that are displayed on webpages corresponding to a second vertical. The server may be configured to provide, for presentation, a visual content item based on at least one of the first number of requests or the second number of requests.

In some embodiments, the server may be further configured to determine a first number of requests to access the information resource via encoded links of the online activity benchmarking system that are received from a first referral source. The server may be configured to determine a second number of requests to access the information resource via encoded links of the online activity benchmarking system that are received from a second referral source. The server may be configured to provide, for presentation a visual content item based on at least one of the first number of requests or the second number of requests.

In still another aspect, the present application is directed to a method for benchmarking online activity via encoded links generated by a online activity benchmarking system. The method may include identifying by a server of a online activity benchmarking system, for an information resource, multiple encoded links encoded by the server of the online activity benchmarking system and linked to the information resource. Multiple requests to access the information resource may be received via the identified multiple encoded links. For each request of the multiple requests to access the information resource, one or more attributes corresponding to the request may be identified. The multiple requests to access the information resource may be categorized based on the one or more identified attributes. For presentation, an output indicating statistics corresponding to the categorized multiple requests may be provided based on the one or more identified attributes.

In some embodiments, the one or more attributes corresponding to each request that is performed by a client device, may include a type of the client device, a geographic location of the client device, a time of day at which the request is performed, or a source Uniform Resource Locator (URL) on which the request is performed. From the multiple requests, multiple cookies of the online activity benchmarking system assigned to unique client devices may be identified. From a cookie corresponding to each request, one or more attributes corresponding to the request may be identified.

In some embodiments, a first number of requests via a first one of the multiple encoded links may be provided across the at least one attribute of the one or more identified attributes, and a second number of requests via a second one of the multiple encoded link may be provided across the at least one attribute of the one or more identified attributes. Each of the first and second encoded links may be ranked based on their respective number of requests across the at least one attribute of the one or more identified attributes. A first set of encoded links of the multiple encoded links may be generated for presentation on multiple first source information resources corresponding to a first vertical. A second set of encoded links of the multiple encoded links may be generated for presentation on multiple second source information resources corresponding to a second vertical different from the first vertical.

In some embodiments, in categorizing the multiple requests to access the information resource based on the one or more identified attributes, a first set of the multiple requests may be assigned to the first vertical and a second set of the multiple requests may be assigned to the second vertical. For each request of the first set of the multiple requests assigned to the first vertical, a cookie of the online activity benchmarking system assigned to a client device from which the request is received may be identified. A data structure of the cookie may be updated to associate the cookie to the first vertical.

In some embodiments, a first number of requests to access the information resource via encoded links of the online activity benchmarking system that are displayed on webpages corresponding to a first vertical may be determined. A second number of requests to access the information resource via encoded links of the online activity benchmarking system that are displayed on webpages corresponding to a second vertical may be determined. In providing, for presentation, an output indicating statistics corresponding to the categorized multiple requests based on the one or more identified attributes, for presentation, a visual content item may be provided based on at least one of the first number of requests or the second number of requests.

In some embodiments, a first number of requests to access the information resource via encoded links of the online activity benchmarking system that are received from a first referral source may be determined. A second number of requests to access the information resource via encoded links of the online activity benchmarking system that are received from a second referral source may be determined. In providing, for presentation, an output indicating statistics corresponding to the categorized multiple requests based on the one or more identified attributes, for presentation, a visual content item may be provided based on at least one of the first number of requests or the second number of requests.

The details of various embodiments of the invention are set forth in the accompanying drawings and the description below.

BRIEF DESCRIPTION OF DRAWINGS

The foregoing and other objects, aspects, features, and advantages of the present invention will become more apparent and better understood by referring to the following description taken in conjunction with the accompanying drawings, in which:

FIGS. 1B and 1C are block diagrams of embodiments of a computing device;

FIG. 11B is a diagram of an embodiment of a database including information or data associated with an interaction on an encoded link;

FIG. 12C is a flow diagram of an embodiment of a method for benchmarking online activity via encoded links.

In the drawings, like reference numbers generally indicate identical, functionally similar, and/or structurally similar elements.

DETAILED DESCRIPTION

For purposes of reading the description of the various embodiments below, the following enumeration of the sections of the specification and their respective contents may be helpful:

Section A describes a network and computing environment which may be useful for practicing embodiments described herein;

Section B describes embodiments of a system to shorten, track and analyze links;

Section C describes embodiments of systems and methods for relevance scoring of a digital resource;

Section D describes embodiments of systems and methods for providing search results based on user interaction with content;

Section E describes embodiments of systems and methods for identifying trends in phrases of content;

Section F describes embodiments of systems and methods for identifying trending and relevance of phrases for a user;

Section G describes embodiments of systems and methods for tracking influence of a user on content shared via encoded uniform resource locator (URL) link;

Section H describes embodiments of systems and methods for providing recommended list of uniform resource locators (URLs) responsive to a uniform resource locator (URL);

Section I describes embodiments of systems and methods for monitoring online activities of users via cookies of a linking system;

Section J describes embodiments of systems and methods for analyzing traffic across multiple media channels via encoded links;

Section K describes embodiments of systems and methods for analyzing online content audience via encoded links; and Section L describes embodiments of systems and methods for benchmarking online activity via encoded links.

A. Network and Computing Environment

Figure 1A:
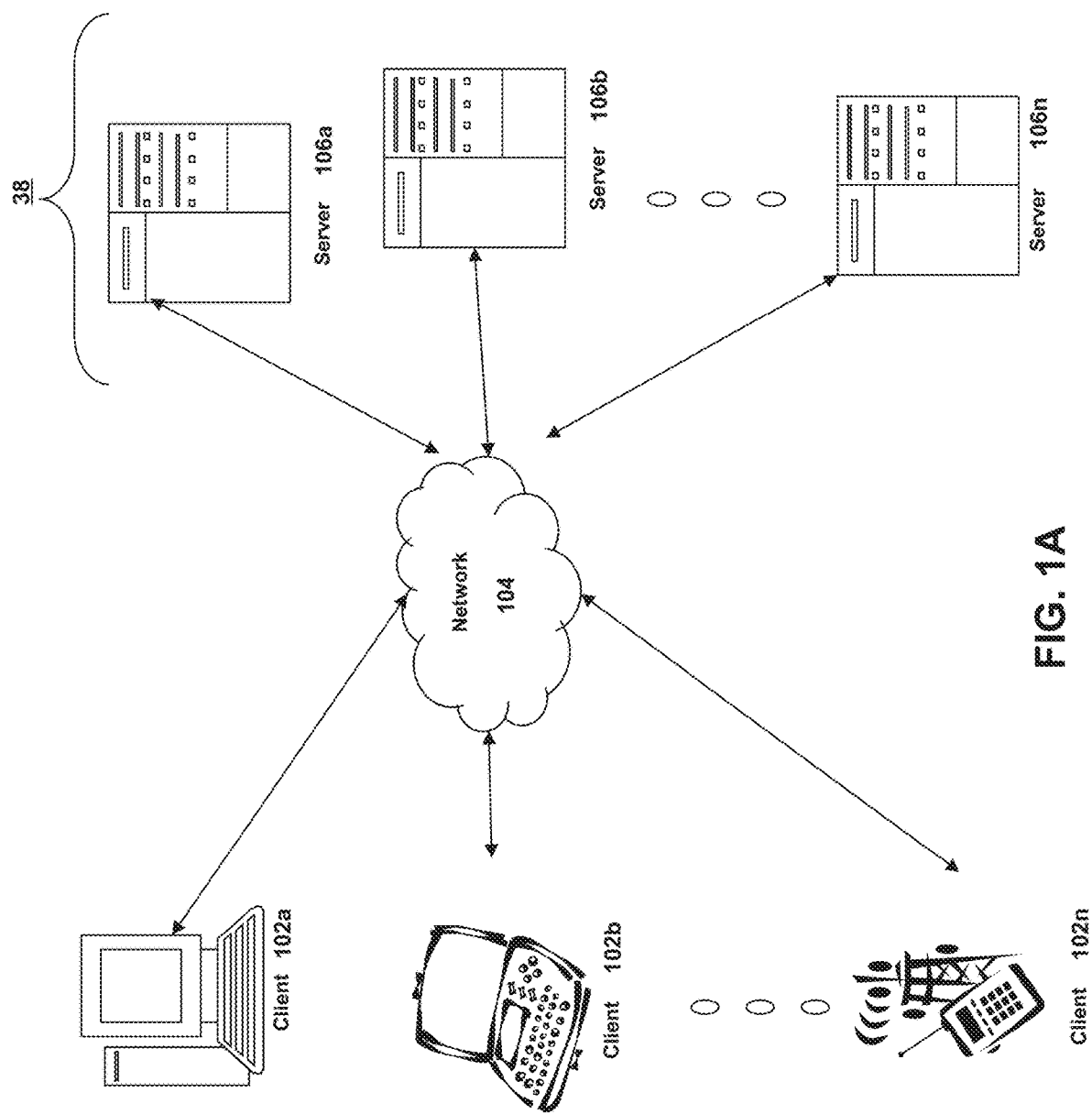
FIG. 1A is a block diagram of an embodiment of a network environment for a client to access servers.

Prior to discussing the specifics of embodiments of the systems and methods of server and/or client, it is helpful to discuss the network and computing environments in which such embodiments may be deployed. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be any type and/or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the Xen hypervisor, an open source product whose development is overseen by Citrix Systems, Inc.; the Virtual Server or virtual PC hypervisors provided by Microsoft or others.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
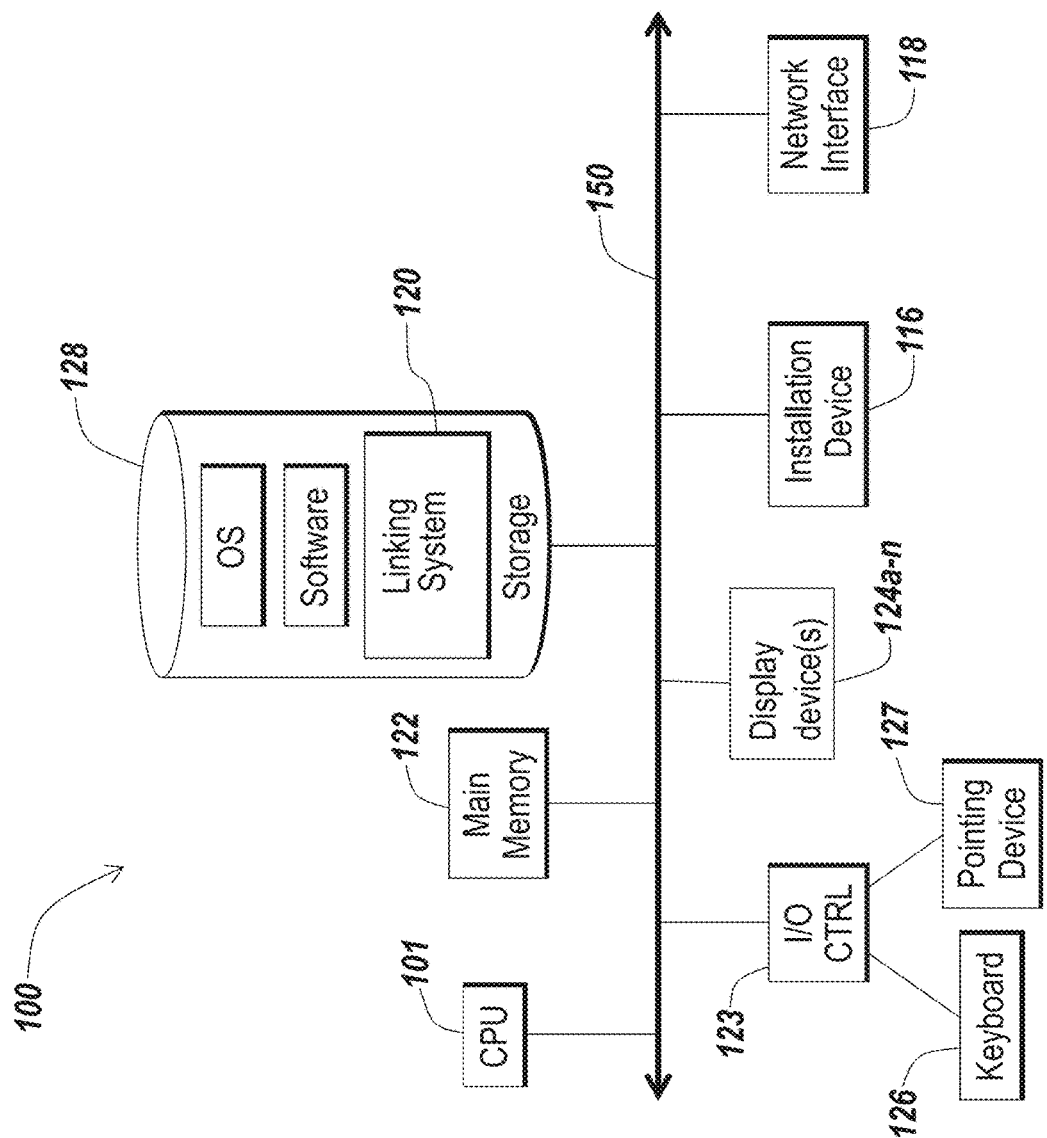

The client 102 and server 106 may be deployed as and/or executed as any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a server 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-102n, a keyboard 126 and a pointing device 127, such as a mouse. The storage device 128 may include, without limitation, an operating system, software, and software for sharing, tracking and analyzing links 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, a flash memory drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the software 120 for sharing, tracking and analyzing links. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS MOBILE, WINDOWS XP, WINDOWS VISTA, and WINDOWS 7, all of which are manufactured by Microsoft Corporation of Redmond, Wash.; MAC OS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPOD, IPHONE, or APPLE TV family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED, NINTENDO REVOLUTION, or a NINTENDO WII device manufactured by Nintendo Co., Ltd., of Kyoto, Japan, an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, and IPOD NANO lines of devices, manufactured by Apple Computer of Cupertino, Calif. In another of these embodiments, the digital audio player may function as both a portable media player and as a mass storage device. In other embodiments, the computing device 100 is a digital audio player such as the DigitalAudimpression opportunity layer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the communications device 102 includes a combination of devices, such as a mobile phone combined with a digital audio player or portable media player. In one of these embodiments, the communications device 102 is a smartphone, for example, an iPhone manufactured by Apple Computer, or a Blackberry device, manufactured by Research In Motion Limited. In yet another embodiment, the communications device 102 is a laptop or desktop computer equipped with a web browser and a microphone and speaker system, such as a telephony headset. In these embodiments, the communications devices 102 are web-enabled and can receive and initiate phone calls. In other embodiments, the communications device 102 is a Motorola RAZR or Motorola ROKR line of combination digital audio players and mobile phones.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. System for Shortening, Sharing and Tracking Links

Figure 2:
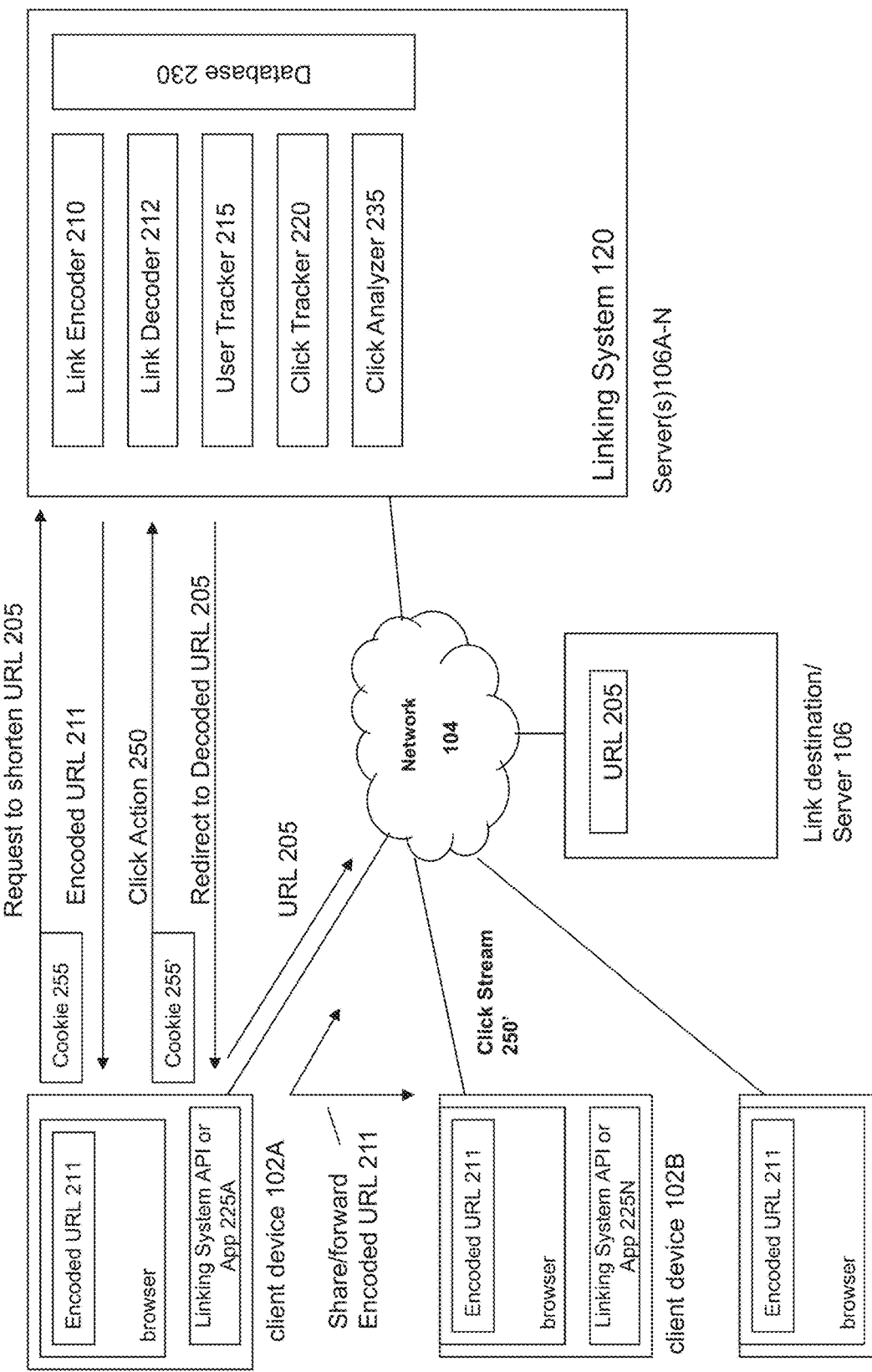
FIG. 2 is a diagram of an embodiment of a system to shorten, share and track links.

Referring now to FIG. 2, embodiments of a system 120 for shortening, sharing and tracking links is depicted. In brief overview, a linking system 120 executes on one or more server(s) 106A-N and may be accessed by a plurality of clients 102a-102N via a network 104. The linking system 120 may include a link encoder 210 that shortens a link, such as a uniform resource locator (URL) 205 to a resource on a destination server 106. The link encoder may encode (e.g., shorten) the link responsive to a request to shorten the URL 205. The client may include a link system API or application 225A-225N to interface with the linking system 120 and request to shorten the link. The request may include a cookie 255 identifying user and client information. The link encoder 210 may generate or otherwise provide an encoded URL 211 to a client. The link encoder may store in a database 230 information about the encoding of the URL and the URL 205. The user tracker 215 may track information about the user, such as via the cookie 255 and store the information in the database 230.

Via the browser of the client, a user may click on or otherwise activate 250 the encoded URL 211 which directs the browser to the linking system 120. The click action 250 may be a request to decode the URL. The click action or request thereof may include a cookie 255' which provides user and client information. The link decoder 212 may decode the encoded URL 211, such as via database 230. For example, the link decoder may perform a lookup of the URL corresponding to the shortened or encoded URL. The linking system, such as via decoder 212, may send a redirect, such as an Hypertext Transfer Protocol (HTTP) redirect (e.g., 301 redirect), to the client to the decoded URL 205. The browser of the client may access or be directed to the URL 205 of the link destination server 106. The click tracker 220 may track user actions on the encoded URL, such as when the encoded URL was clicked, from what source and by what user and store such tracking in the database 230. The click tracker and/or user tracker may track user information from the cookies 255' in connection with or associated with the click action 250. The click tracker and/or user tracker may track and store user the referrer information from the request.

A user of client 102a may share via email, web-site posting, social networking, etc. the encoded URL 211 to any one or more other users, such as users of clients 102b-102N. Any of these users may click on or activate the encoded URL 211. The plurality of click actions on the encoded URL provide a stream of requests from user click actions to decode the encoded URL, which may be generally referred to as a click stream 250'. The linking system via link decoder 212 may decode the encoded URL and redirect each of the clients to the URL 205. The user tracker and click tracker may track information on the user and the click actions of the client stream 250' in the database. The click analyzer 235 may provide metrics on the click actions of the encoded URL, such as the number of clicks, the times of clicks and the sources of the clicks.

In further details, the linking system 120 may comprise an application, program, library, process, service, script, task or any type and form of executable instructions executable or executing on a device. The linking system may operate on a plurality of servers 106A-106N. The linking system may comprise logic, function, and operations for shortening, sharing and tracking links, such as URLs. The linking system may comprise application programming interfaces, such as web services, XML, Jason (JSON), etc. for accessing the functionality, operations and/or data of the linking system. The linking system may include one or more modules, components or executables for providing these APIs and performing the function and operations described herein. For example, in some embodiments, the linking system may include a link encoder 210, a link decoder 212, a user tracker 215, a click tracker 220 and a click analyzer 235. The modules, components or executables of the linking system may operate in a client/server architecture. The modules, components or executables of the linking system may operate in a distributed manner across multiple devices.

The linking system may include, operate, communicate or interface with a linking system API or application 225A-225N (generally referred to as 225). In some embodiments, an application 225 may execute on the client that communicates with or interfaces to the linking system to encode and decode URLs. In some embodiments, an application 225 may include any portion of the linking system. In some embodiments, the application may be a mobile application, generally referred to as an app, executing on a mobile device, such as a smart phone or tablet device. In some embodiments, the application may include an add-on, extension, script, ActiveX control, applet, widget or other types and forms of executable instructions executed by or in a browser. In some embodiments, the application may include, use or call one or more APIs to the linking system. The application may be programmed to programmatically integrate the linking system, or interface thereto, into the application. Via the one or more APIs, the application may access data from the linking system. Via the one or more APIs, the application may perform or execute any of the functions or operations of the linking system. Via the one or more APIs, the application may perform or execute any of the systems and methods described herein.

The link encoder may include an application, program, library, process, service, script, task or any type and form of executable instructions for encoding a link. The link encoder may shorten a URL. The encoded URL may be referred to or be a shortened URL. Creating a shortened link may be referred to as encoding. The link encoder may shorten the URL to a predetermined string length or to a predetermined number of characters. The link encoder may shorten the URL to a length determined responsive to the length of the URL to be encoded. The link encoder may encode the URL into an encoded URL using an encoding scheme. In some embodiments, the link encoder applies a hash to the URL to generate or produce the encoded URL. In some embodiments, the encoded URL is a hash or hash code. In some embodiments, the link encoder transforms the URL using a transformation function, such as a reversible transformation function. In some embodiments, the link encoder removes a portion of the URL. In some embodiments, the link encoder rewrites a portion of the URL with a portion of another URL. In some embodiments, the link encoder encrypts the URL or a portion of the URL using one or more encryption keys. In some embodiments, the link encoder generates a unique identifier for the encoded URL in which the unique identifier uniquely identifies the URL. In some embodiments, the link encoder obfuscates information from the original URL, such as information relating to a directory structure of the server from the URL. The link encoder may encode the URL into an encoded URL that comprises a domain name hosted by or recognized by the linking system or any server thereof. The link encoder may encode the URL into an encoded URL that comprises a domain name configured, specified or identified by a user, such as a domain name of an entity that is a user of the linking system. The link encoder may encode the URL to identify a URL of the linking system, such as a landing page or intermediate page of the linking system. In some embodiments, the link encoder may encode the URL to be resolved to an intermediate URL or page of the linking system prior to being redirected by the linking system to the URL after decoding.

The link decoder may include an application, program, library, process, service, script, task or any type and form of executable instructions for decoding an encoded link. The link decoder may be designed and constructed to decode, un-shorten, generate, produce or otherwise provide the original URL corresponding to the encoded URL. Clicking on a shortened link may be referred to or called decoding. In some embodiments, the link decoder determines the URL from the encoded URL via lookup in the database. In some embodiments, the link decoder uses the encoded URL as an index to look up the URL in the database. In some embodiments, the link decoder uses the encoded URL as a hash index into a has table of the database. In some embodiments, the link decoder users the encoded URL or a portion thereof as a unique identifier to the URL stored in memory, storage of database of the linking system. In some embodiments, the link decoder uses a decoding scheme designed and constructed to perform the reverse of the encoding scheme or otherwise produce or generate the original input (e.g., the URL) to the encoding scheme. In some embodiments, the link decoder applies a reverse transformation function to the encoded URL. In some embodiments, the link decoder replaces a portion of the encoded URL with a portion of the URL. In some embodiments, the link decoder un-obfuscates information in the encoded URL to a portion of the original URL. In some embodiments, the link decoder replaces a domain name of the encoded URL with a domain name of the URL.

In some embodiments, the linking system, such as via link decoder, generates, issues or communicates a redirect responsive to receipt of an encoded URL and/or decoding the encoded URL. In some embodiments, the linking system issues any type of 3XX HTTP redirect. In HTTP, a redirect is a response with a status code beginning with a 3XX that induces a browser to go to another location. In some embodiments, the response or status code includes an annotation describing the reason, which allows for the correct subsequent action (such as changing links in the case of code 301, a permanent change of address). In some embodiments, the linking system issues a 301 type of HTTP redirect. In some embodiments, the redirect response comprises or uses a technique for making a webpage available under many URLs. In some embodiments, the linking system uses scripting for redirection. In some embodiments, the linking system uses a refresh meta tag or HTTP refresh header technique for redirection.

In some embodiments, when the user clicks on or activates the shortened link 211 the user or browser is taken to an interstitial page of the linking system, and then using an HTTP redirect page, an intermediate website of the linking system refers the user to the final destination site of URL 204. While doing so, the intermediate website may track from which website the user clicked on the short link, stores various user specific data, and notes any related cookies, or if there are no cookies, stores a new cookie on the user for the future.

A user of one device, such as client device 102, may share the encoded URL 211 with a plurality of users, such as users on client devices 102*b*-102N. A user or application may share the encoded URL by emailing the encoded URL to a user. A user or application may share the encoded URL by posting or publishing the encoded URL to a web-site. A user or application may share the encoded URL by posting, publishing or forwarding the encoded URL to a social networking site, such as but not limited to LinkedIn or Facebook. A user or application may share the encoded URL by texting the encoded URL. A user or application may share the encoded URL by posting or communicating the encoded URL via a communication tool, such as Skype or Instant Messenger. A user or application may share the encoded URL by serving the encoded URL in content served by a web-site. A user or application may share the encoded URL by serving the encoded URL in an advertisement or impression opportunity served by an ad server. A user or application may share the encoded URL via the linking system API or app 225, such as via a linking system bookmark applet on a browser. Any user receiving the encoded URL from any device may click on or activate the encoded URL to communicate with the linking system and be directed to the URL decoded from or corresponding to the encoded URL.

A click tracker 220 may include an application, program, library, process, service, script, task or any type and form of executable instructions for tracking actions regarding an encoded URL and/or decoding the encoded URL. In some embodiments, the click tracker identifies each instance of a user clicking on an encoded URL and tracks the number of clicks for the URL via the encoded URL in the database 230. In some embodiments, the click tracker identifies each instance of a user clicking on any of a plurality of encoded URLs that correspond to a URL and tracks the number of clicks for the URL via any encoded URL in the database 230. In some embodiments, the click tracker may identify and track via the database any temporal information regarding the clicks on the encoded URL, such as date and time of the click action 250. In some embodiments, the click tracker may identify and track via the database any source information regarding the clicks on the encoded URL, such a source internet protocol (IP) address, source port and Machine Access Control (MAC) identifier of the device from which the user clicked on the encoded URL. In some embodiments, the click tracker may identify and track via the database any header, field or other information via any application layer payload, such as the HTTP payload of the packet(s) carrying the click action or request to decode the URL. In some embodiments, the click tracker may identify and track via the database the HTTP header field of referrer to identify and track the URL or webpage from which the click action or request was referred or originated.

A user tracker 215 may include an application, program, library, process, service, script, task or any type and form of executable instructions for tracking and managing information regarding users of the linking system and/or users interacting with encoded and decoded URLs. The user tracker may include an interface, such as a web page, to have users register as users of the linking system. The user tracker may collect via registration authentication information of the user, such as a user identifier and a password. The user tracker may identify and collect information from any type and form of cookie 255. The user tracker may receive the cookie via a request to shorten a URL. The cookie may be any third-party cookie. The cookie may be a cookie generated by, provided by or tracked for the linking system. The user tracker or linking system may insert, modify or provide any data, information or attributes in the cookie for the linking system. The user tracker or linking system may include or provide a cookie 255' in communicating the redirect response for a click action that decodes the encored URL. The cookie may comprise information, data or attributes that identify the user, any user's actions, preferences of the user and/or history of user activity or behavior. The cookie may comprise information, data or attributes that identify any click actions. The cookie may comprise information, data or attributes that identify the URL and/or any encoding and/or decoding of the URL. The cookie may comprise information, data or attributes of redirection or the redirect response by the linking system. The user tracker may identify and track any user activity in encoding URLs. The user tracker may identify and track any user activity in decoding URLs. The user tracker may identify and track any user activity in sharing encoded URLS. The user tracker may store tracked information, data and attributes to the database.

In some embodiments, the click tracker comprises the user tracker or a portion thereof. In some embodiments, the user tracker comprises the click tracker or a portion thereof. In some embodiments, a tracker 215 or 220 comprises both the click tracker and user tracker. In some embodiments, the user tracker is integrated with, interfaced to or communicates with the click tracker. The user tracker and click tracker may be designed and constructed to track and store to the database information about encoding URLs, decoding URLs and clicks of encoded URLS in association with users connected to the encoding of the URLs, decoding of the URLS and clicking on the encoded URLs.

The database 230 may include an application, program, library, process, service, script, task or any type and form of executable instructions for tracking and managing information and data stored by, accessed by and/or used by the linking system or any modules or components thereof. The database may be any type and form of Structured Query Language (SQL) database. The database may be any type and form of object oriented or object based database. The database may be any type and form of in-memory or real-time memory database. The database may comprise any type and form of graphical database. The database may comprise any type and form of data warehousing and/or analytical database. The database may comprise any type and form of multi-dimensional database. The database may store any data and information from any of the functions, operations, systems and methods described herein.

A click analyzer 235 may include an application, program, library, process, service, script, task or any type and form of executable instructions for analyzing, searching and/or reporting any of the information, data and metrics stored by the linking system in the database 230. The click analyzer may include any type and form of online analytical processing (OLAP). The click analyzer may analyze click and user data stored in the database to determine a number of clicks to a URL per encoding of the URL. The click analyzer may analyze click and user data stored in the database to determine a number of clicks to a URL for all encodings of the URL across a plurality of users. The click analyzer may analyze click and user data stored in the database to determine a location of users who clicked on an encoded URL, such as what countries the clicks originated from. The click analyzer may analyze click and user data stored in the database to determine the different referring sites from which users clicked on an encoded URL. The click analyzer may analyze click and user data stored in the database to determine the different types of clients or client applications from which users clicked on an encoded URL. The click analyzer may analyze click and user data stored in the database to determine a number of clicks over a predetermined time period or a frequency of clicks. The click analyzer may analyze click and user data stored in the database to determine a number of conversations across different social media networks regarding or in connection with an encoded URL. The click analyzer may provide any data, information and/or analysis in a graphical format, such as any type and form of statistical charts or diagrams.

A plurality of users may click on 250 the same encoded URL 211. Each of these users may also click on a plurality of different encoded URLs to the same URL or to different URLs. The plurality of click actions 250 may generate and/or provide data that is tracked and stored via the linking system. The set of data resulting from a click action and/or data associated with the click and/or collected, tracked, and analyzed either statically or in real-time by the linking system may be referred to as a clickstream 250' or click stream 250'. The click stream may include any data tracked by the user tracker. The click stream may include any data tracked by the click tracker, such as any network traffic data. The click stream may include any data provided by the browser. The click stream may include any data provided via the HTTP request. The click stream may include any data analyzed by the click analyzer. The click stream may include any data traversing the linking system.

C. Systems and Methods for Scoring Digital Resources

Figure 3A:
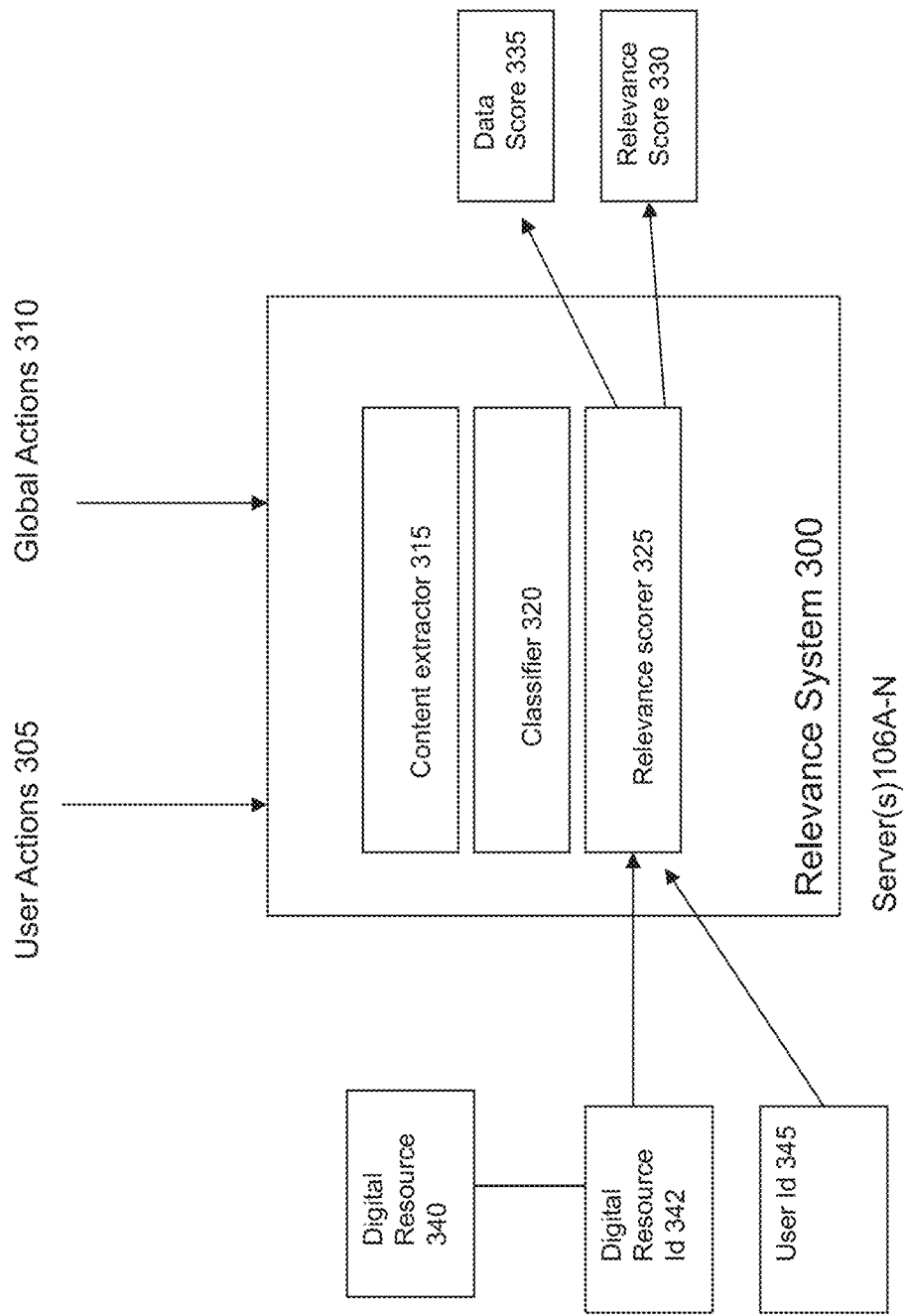
FIG. 3A is a block diagram of an embodiment of a system for relevance scoring of a digital resource.
Figure 3B:
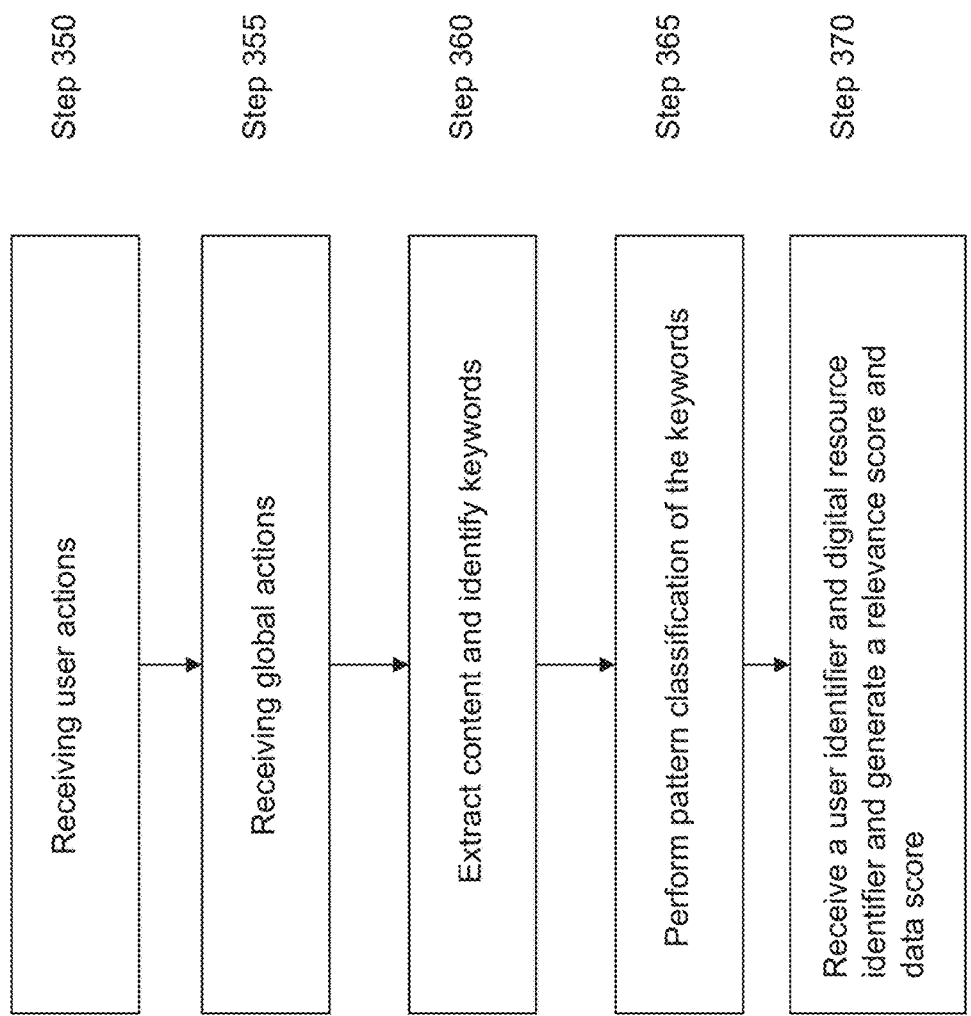
FIG. 3B is a flow diagram of an embodiment of a method for relevance scoring of a digital resource.

Referring now to FIGS. 3A and 3B, systems and methods for scoring a digital resource, such as content is depicted. These systems and methods score content, URLs, domains, phrases or any entity (all of which are examples of digital resources) based on an expected relevance to an individual user which may be based on that user's previous engagement with digital resources. Relevance is from the perspective of a user to a digital resource. By tracking what digital resources a user has interacted with and analyzing and classifying those digital resources, these systems and methods generate a score that identifies how similar a presented or identified digital resource is to other digital resources the user has engaged with For example, by tracking what content a user has clicked on, and by analyzing and classifying that content, the systems and methods of the present solution, when shown a new set of content, may generate a score determining how similar that content is to other content the user has engaged with. The relevance score produced by these systems and methods provide an indicator of relevance of identified digital resource is to a particular user.

Embodiments of the system of the present solution may take as input: (i) a list of actions associated with a given user (user actions) and (ii) a list of actions associated with entities (global actions). For user actions, the system may identify users via a cookie or a set of cookies. For example, a typical user may have actions associated with a set of cookies, all associated with an individual user. In some embodiments, a cookie-classifier can be used to associate multiple cookies with a specific individual. A list of actions associated with users may be obtained outside of cookies, such as importing web logs or user activity databases.

Global actions may include sharing a link, or sharing a piece of content. Typical examples may include a user forwarding a link via email to another user (e.g., the link is the entity, the forwarding is the action). In another example, a global action may include sharing a paragraph of content on a social media platform like a Facebook update (e.g., the update content is the entity, and "shared on Facebook" is the action). Embodiments of the system of the present solution may use click stream 250' data.

In example operation, the system processes the global actions through a content extractor, which extracts meta-data, phrases, keywords that are specific to the entity. The system may provide the global actions and extracted content as input to a pattern classifier. The system may also provide user actions to the pattern classifier. The pattern classifier may classify the global actions, the user actions and the extracted content into a plurality of classes that is stored by the system. The system may receive a request to score a digital resource for a specific user. For example the digital resource may include piece of data, a keyword, phrase, URL, or domain name, and the user may be identified by a user ID such as the user's cookie ID. The system matches the digital resource and user identifier with the classified data from the classifier, and the output is a content or relevance score and a data score. The relevance score identifies how closely the digital resource (e.g., new piece of data) matches the digital resources associated with that user. The data score estimates or identified how valid the relevance score is. The data score may be based on how much data was associated with the intersection of the user action and the global actions.

Referring now to FIG. 3A, an embodiment of a system for scoring digital resources 340 is depicted. In brief overview, embodiments of the linking system 120 may receive or obtain user actions 305 and global actions 310, such as via a click stream 250'. The linking system may include a content extractor 315 to identify keywords, meta-data and phrases from content identified by any of the user actions and/or the global actions. The linking system may include a classifier 320 that classifies patterns from the user actions, global actions and the keywords, meta-data and/or phrases from the content extractor. A relevance scorer 325 receives a request to generate a score for a user id 345 and a digital resource identifier 342 that identifies a digital resource 240. The relevance scorer matches the user id and digital resource identifier via the classification data of the classifier and generates a relevance score 330 to identify the relevance of the identified digital resource for the identified user based on what digital resources the user has previously interacted with. The relevance scorer may generate a data score that identifies or estimates the validity or quality of the relevance score.

In further details, a digital resource 340 may comprise any type and form of electronic, digital or web based resource (sometimes referred to as an entity or digital entity). The digital resource may be a domain name. The digital resource may be a web-site. The digital resource may be a URL. The digital resource may be an encoded URL. The digital resource may be a web page. The digital resource may be a keyword in digital content. The digital resource may be a phrase in electronic content. The digital resource may be meta-data in or of digital content. The digital resource may be digital content. The digital resource may be a file. The digital resource may be a portion, copy or snippet of digital content or a file. The digital resource may be an advertisement. The digital resource may be a text or SMS message. The digital resource may be an email. The digital resource may be an IM or chat message. The digital resource may be an IP based audio and/or video communication. The digital resource may be a posting on a web-site. The digital resource may be a discussion or conversation, or portion thereof, on a web-site. The digital resource may be a message, posting or content on a social networking site. The digital resource may be digital audio, such as an audio file. The digital resource may be music or music file. The digital resource may be a video. The digital resource may be an image. The digital resource may be a graphic file. The digital resource may be an application, program, library, program or script. The digital resource may be a device.

The digital resource identifier or id 342 may comprise any type and form of identifier associated with, corresponding to or that otherwise identifies a digital resource. The digital resource id may be a unique identifier. The digital resource id may be a hash code. The digital resource id may be a hash of the digital resource. The digital resource id may be a name of the digital resource. The digital resource id may be a URL of or to the digital resource. The digital resource id may be a memory location of the digital resource. The digital resource id may be a storage location of the digital resource. The digital resource id may be a name of a file corresponding to the digital resource. The digital resource id may be the digital resource itself, such as a URL identifying the digital resource of the URL itself or a domain name identifying the digital resource of a domain.

The user actions 305 may comprise any type and form of actions of a user. In some embodiments, the user actions may comprise any actions of a user to interact or interacting with a digital resource. the user actions may comprise any actions of a user to request, access, obtain, view, print, edit, user or otherwise process a digital resource. In some embodiments, a user action comprises registering and/or logging in to the linking system. In some embodiments, a user action comprises registering and/or logging in to a web-site. In some embodiments, a user action comprises encoding a URL or requesting the linking system to encode the URL. In some embodiments, a user action comprises clicking or activating by a user a URL. In some embodiments, a user action comprises clicking or activating by a user an encoded URL. In some embodiments, a user action comprises requesting a browser to go to a URL or web-page. In some embodiments, a user action comprises a pointer over or mouse over of a keyword, phrase or URL on a web page. In some embodiments, a user action comprises a selection of a keyword, phrase or URL on a web page. In some embodiments, a user action comprises a traversal between URLS or web-links, such as clicking on a hyperlink of one page to get to another page of a web-site. In some embodiments, a user action comprises launching, executing or using a browser, such as a browser of a certain type. In some embodiments, user actions comprise a history of activity of a user on a computer, browser or web-site, including date and time of such activity. In some embodiments, user actions comprise a log or file of activity of a user on a computer, browser or web-site, including date and time of such activity. User actions may comprise the click stream or any portion thereof.

The global actions 310 may include any type and form of actions regarding sharing, forwarding, propagating or otherwise providing a digital resource to another entity, user or another digital resource. In some embodiments, a global actions comprises a user electronically communicating a digital resource or digital resource identifier to an entity, user or digital resource. In some embodiments, a global action comprises a user emailing a digital resource or digital resource identifier. In some embodiments, a global action comprises a user texting or sending an SMS message comprising a digital resource or digital resource identifier. In some embodiments, a global action comprises a user instant messaging a digital resource or digital resource identifier. In some embodiments, a global action comprises a user posting a digital resource to a web-site. In some embodiments, a global action comprises a user posting, sharing or provide a digital resource or digital resource identifier via, in or to a social networking site. In some embodiments, a global action comprises a user cutting, copying and/or pasting a digital resource to another digital resource, such as copying and pasting a portion of content of a web-site to a social networking web-site. In some embodiments, a global action comprises a user forwarding, sharing or providing an encoded URL to another user, entity or digital resource. In some embodiments, a global action comprises a user transforming or processing a digital resource in one form or format to a digital resource in another form or format. Global actions may comprise the click stream or any portion thereof.

The content extractor 315 may comprise an application, program, library, process, service, script, task or any type and form of executable instructions for identifying, extracting, or processing keywords, phrases and data from content. The content extractor may be designed and constructed to identify, obtain or retrieve content from a digital resource, such as a web page identified by a URL. The content extractor may be designed and constructed to identify, determine, and/or extract keywords and/or phrases associated with, corresponding to from content of a digital resource. The content extractor may identify, determine, and/or extract keywords and/or phrases corresponding to or matching a predetermined list or enumerations of keywords and/or phrases. The content extractor may identify and retrieve content for a URL decoded from an encoded URL. The content extractor may identify and retrieve keywords and/or phrases from content identified by a URL decoded from an encoded URL. The content extractor may identify and retrieve content, and/or keywords and/or phrases, from a predetermined portion of a digital resource. The content extractor may identify and retrieve text areas of a digital resource. The content extractor may identify and retrieve keywords and/or phrases from text areas of the digital resource. The content extractor may identify and retrieve meta-data from or about a digital resource. The content extractor may identify and retrieve keywords and/or phrases from the meta-data. In some embodiments, the content extractor may identify and retrieve content, and/or keywords and/or phrases, from user selected or defined portions of the digital resource. In some embodiments, the content extractor may identify a keyword in the digital resource. In some embodiments, the content extractor may identify a phrase in the digital resource. The content extractor may identify one or more URLs on a web page. In some embodiments, the content extractor may identify URLs from predetermined portions of the page. In some embodiments, the content extractor may identify URLs from user selected or defined portions of a page. The content extractor may retrieve content from the identified one or more URLs and identify or retrieve keywords and/or phrases from such content.

In view of any media content, such as video and/or audio files, the content extractor may be designed and constructed to analyze the content of such media to determine any text, phrases or meta-data contained therein or related thereto. In some embodiments, the content extractor may include any type and form of voice or audio recognition technology to identify audio content in the media, such as spoken words, music or sounds. In some embodiments, the content extractor may convert any of the audio content into corresponding text. In some embodiments, the content extractor may identify text or phrases from the text converted from and corresponding to the audio content. In some embodiments, the content extractor may include any type and form of video processing and analysis technology that identifies persons, location, objects or things in a video. From such video processing and analysis, the content extractor may provide a description, such as in text format, of the subject matter of or the persons, location, objects or things in the video. In some embodiments, the content extractor may identify text or phrases from the description determines from and corresponding to the video content.

The classifier 320 may comprise an application, program, library, process, service, script, task or any type and form of executable instructions for performing or providing pattern classification of a set of data. The classifier may use any type and form of classification scheme or algorithm to identify a sub-population, class or category to which a new observation or item belongs in which the identity of the sub-population, class or category for the new observation or item is not known. The classifier may perform pattern recognition, which is the assignment of some sort of output value (or label) to a given input value (or instance), according to some specific algorithm. Via pattern recognition, the classifier attempts to assign each input value to one of a given set of classes (for example, determine whether a given email is "spam" or "non-spam"). Classifier may classify based on a training, learning or established set of data containing observations or items with a known sub-population, class or category. The classifier may comprise any type of classifier, such as a neural network, support vector machines, k-nearest neighbors, Gaussian mixture model, Gaussian, naive Bayes, decision tree and/or Radial Basis Function (RBF) classifier.

The classifier may take as input any one or more of the following: a digital resource, a digital identifier, user actions and global actions. The classifier may take as input any one or more of the keywords and/or phrases identified by the content extractor. The classifier may classify this input to assign or designate a sub-population, class or category to each input or sets of input. The classifier may perform this classification on a per user basis. The classifier make take input associated with a user, such as user actions and global actions for a particular user, and classify such input into classes or categories and store such classification in association with the user. The classifier make take input associated with a user, such as user actions and global actions for a particular user, identify keywords from the input and classify the keywords into classes or categories and store such classification in association with the user.

The classifier may classify the input into categories or classes based on keywords and/or phrases identified from the digital resource and/or from content of, identified by or associated with the digital resource. The classifier may classify the input into categories or classes based on subject matter. The classifier may classify the input into categories or classes based on topics. The classifier may classify the input into categories or classes based on context. The classifier may classify the input into categories or classes based on areas of interest. The classifier may classify the input into categories or classes based on preferences of the user. The classifier may classify the input into categories or classes based on favorites of the user. The classifier may classify the input into categories or classes based on an affinity or affinities of the user. The classifier may classify the input into categories or classes based on type of digital resource. The classifier may classify the input into categories or classes based on source of the digital resource. The classifier may classify the input into categories or classes based on digital resource identifier. The classifier may classify the input into categories or classes based on type of action. The classifier may classify the input into categories or classes based on encoded URLs. The classifier may classify the input into categories or classes based on decoding URLs. The classifier may classify the input into categories or classes based on URLs. The classifier may classify the input into categories or classes based on domain names. The classifier may classify the input into categories or classes based on temporal information, such as time and/or date of interaction with the digital resource.

The classifier may classify the input based on a cross-section, matching or association of user actions to global actions. The classifier may identify those URLs encoded by a user and the encoded URLs clicked on by the same user but encoded from and shared by other users. The classifier may match those URLs encoded by a user to those global actions in which the user's encoded URLS were shared. The classifier may classify these URLs into categories or classes. The classifier may classify keywords and/or phrases from these URLs or content associated therewith into categories or classes. The classifier may classify into categories or classes based time and/or date of interaction with encoded URLs.

The relevance scorer 325 may comprise an application, program, library, process, service, script, task or any type and form of executable instructions for generating and/or providing a score for a digital resource. The relevance scorer and/or classifier may perform any type and form of statistical analysis or modeling of the classification data. The relevance scorer may perform any type and form of fuzzy logic matching to match an input, such as a digital resource identifier, to the classification data and/or statistical analysis or model to generate or provide a relevance score 330. The relevance scorer may receive or process as input a digital resource identifier 342 and a user identifier 345. Based on this input, the relevance scorer may determine how relevant the digital resource identified by the digital resource identifier is to the user identified by the user id based on that user's previous interaction with digital resources as may be represented or reflected in the classification data and/or statistical analysis or model.

The relevance scorer may classify the digital resource identified by the digital resource identifier into an existing class or category of the classification data and/or statistical analysis or model for the user specified by the user id. In some embodiments, the relevance scorer determines whether the classification of the digital resource identified by the digital resource identifier fits into an existing class/category or a new class/category of the classification data and/or statistical analysis or model for the user specified by the user id. In some embodiments, the relevance scorer determines a number of classes or categories into which the digital resource identified by the digital resource identifier may be classified. In some embodiments, the relevance scorer determines a number of other digital resources previously classified in the class or category into which the digital resource identified by the digital resource identifier may be classified. In some embodiments, the relevance scorer determines temporal information (times and dates of interaction, velocity of rate of interaction, etc.) for digital resources previously classified in the class or category into which the digital resource identified by the digital resource identifier may be classified. For example, in some embodiments, the relevance scorer may classify or match the digital resource identified by the digital resource identifier based on classification data within a predetermined time period. In some embodiments, the relevance scorer may generate, extract or identify one or more keywords for or from the digital resource identified by the digital resource identifier and match these one or more keywords to keywords in the classification data and/or statistical analysis or model for the user specified by the user id.

The relevance scorer may generate or provide a relevance score 330 responsive to an analysis or classification of digital resource identified by the digital resource identifier to the classification data of the user identified by the user id. The relevance scorer may generate the relevance score by any statistical calculation of the classification of the digital resource identified by the digital resource identifier into or using the classification data of the user specified by the user id. The relevance scorer may generate the relevance score by any temporal weighting of temporal information of the classification data of the user specified by the user id. The relevance scorer may generate the relevance score using any of the scoring methods and techniques described elsewhere herein.

The relevance score 330 may comprise a value that provides an indication of or otherwise identifies how relevant the digital resource identified by the digital resource identifier is to the user specified by the user id. The relevance score may be generated for or on an absolute or relative scale. The relevance score may be generated for or normalized to a predetermined relevance range, such as for example −100 to 100, 0 to 100 or X to Y.

The relevance scorer may generate or provide a data score responsive to, in connection with or in conjunction to generating or providing the relevance score 330. The relevance scorer may generate or provide a data score by any statistical calculation of an amount of cross-section or matching in the classification data between user actions and global actions associated with the user. The relevance scorer may generate or provide a data score based on an amount or volume of data for the user in the classification data. The relevance scorer may generate or provide a data score based on an amount or volume of data of user actions for the user in the classification data. The relevance scorer may generate or provide a data score based on an amount or volume of data of global actions for the user in the classification data. The relevance scorer may generate or provide a data score based on temporal qualities of the data for the user in the classification data.

The data score 335 may comprise a value that provides an indication of or otherwise identifies a quality of data supporting or underlying the relevance score. The data score 335 may comprise a value that provides an indication of or otherwise identifies a validity of the relevance score based on a volume or quality of the classification data. The data score 335 may comprise a value that provides an indication of or otherwise identifies a validity of the relevance score based on a temporal quality of the classification data. The data score 335 may comprise a value that provides an indication of or otherwise identifies an amount of cross-section or matching between user actions and global actions associated with the user. The data score may be generated for or on an absolute or relative scale. The data score may be generated for or normalized to a predetermined range, such as for example −100 to 100, 0 to 100 or X to Y.

The linking system and/or relevance scorer may identify the user via the user identifier. The user identifier 345 may comprise any type and form of identification of a user, such a name, alias, an account name, a login name, or email address. The user identifier may be user identifier for the user for using or accessing the linking system. The user identifier may be user identifier for the user for using or accessing a social networking site. The user identifier may be user identifier for the user for using or accessing a third-party or partner web-site. The user identifier may be based on a cookie. The user identifier may be stored in a cookie. The linking system and/or relevance scorer may identify the user via one or more cookies.

Referring now to FIG. 3B, an embodiment of a method for scoring a digital resource 340 is depicted. In brief overview, at step 350, the linking system receives user actions and at step 355, the linking system receives global actions. At step 360, a content extractor extracts or identified keywords from content identified by or associated with a digital resource identified in any of the user actions and/or global actions. At step 365, the classifier performs classification on the input of user actions, global actions and keywords identified therein. At step 370, a relevance scorer receives a user identifier and a digital resource identifier and generates a relevance score and data score.

In further details, at step 350, a server, such as the linking system, receives user actions from a plurality of users. The server may receive user actions via click streams 250'. The server may receive user actions via or comprising a user interacting, user or accessing a digital resource. The server may receive users actions from the digital resource. The server may receive a user action via a user requesting to encode an URL. The server may receive a user action via a user clicking on an encoded URL. The server may receive a user action via a request to decode an encoded URL. The server may receive and track user actions over any period of time. The server may receive a user action via a client linking system API or application 225. The server may receive one or more user actions via a log file or activity log from an application, system, device or server. The click tracker may identify clicks of user on encoded URLs. The user tracker may identify the user who clicked the encoded URL. The user tracker may identify the user who encoded the encoded URL. The server may store the user actions associated with or attributed to each user into a database 230 and associated with or identifiable via a user identifier.

At step 355, a server, such as the linking system receives global actions. The server may receive global actions via a plurality of click streams 250'. The server may receive global actions via a user clicking on an encoded URL, such as encoded URL shared on a social networking site. The server may receive global actions via or comprising a user sharing a digital resource. The server may receive global actions from the digital resource. The server may receive one or more global actions via one or more log files or activity logs from an application, system, device or server. The user tracker may identify the user who shared the encoded URL. The click tracker may identify clicks of users on encoded URLs that have been shared. The user tracker may identify the user who clicked the shared encoded URL. The server may store the global actions associated with or attributed to each user into a database 430 and associated with or identifiable via a user identifier.

In some embodiments, steps 350 and 355 are provided or performed as a single step. In some embodiments, steps 350 and 355 are provided or performed in conjunction during the same step or sets of steps. For example, in some embodiments, the server may receive user actions and global actions via click streams received by the server. The server may track, manage and store any user and global actions on a per user basis in a database.

At step 360, a content extractor may identify keywords and/or phrases from a digital resource, content identified by the digital resource or content otherwise associated with or corresponding to the digital resource. The content extractor may operate responsive to receipt of user actions and/or global action. As the server receives a click stream, the content extractor may identifier keywords or phrases from the click stream. In some embodiments, the context extractor obtains or fetches content corresponding to the digital resource. In some embodiments, the content extractor uses a predetermined list of phrases and/or keywords to identify those phrases and/or keywords in the digital resource, content identified by the digital resource or content otherwise associated with or corresponding to the digital resource. In some embodiments, the content extractor identifies keywords and/or phrases from predetermined locations or portions of a digital resource or content associated with the digital resource. In some embodiments, the content extractor identifies keywords and/or phrases from user actions. In some embodiments, the content extractor identifies keywords and/or phrases from global actions. In some embodiments, the content extractor identifies keywords and/or phrases on a per user basis or for each user.

At step 365, a classifier performs classification or otherwise classifies the keywords and/or phrases. The classifier may operate responsive to the content extractor. As the content extractor identified keywords or phrases, the classifier may receive these keywords or phrases and perform classification. The classifier may classify any combination of keywords and/or phrases from the digital resource identifier, digital resource, content identified by the digital resource or content otherwise associated with or corresponding to the digital resource, user actions and global actions. The classifier may store classification data for each user. The classification data may represent a classification of the user's interactions with digital resources into categories or classes. The classifier may generate classification data that represent a classification of the user's interactions with the digital resources based on subject matter, interests or topics.

At step 370, the relevance scorer may receive a digital resource identifier and a user identifier. The relevance scorer may receive a request to provide a relevance score for a digital resource or entity identified by the digital resource identifier for a user identified by the user identifier. Responsive to the request for a relevance score or receipt of a digital resource identifier and a user identifier, the relevance scorer may generate, communicate or otherwise provide a relevance or content score. The relevance scorer may receive a request to provide a data score for a digital resource or entity identified by the digital resource identifier for a user identified by the user identifier. Responsive to the request for a data score or receipt of a digital resource identifier and a user identifier, the relevance scorer may generate, communicate or otherwise provide a data score. In some embodiments, responsive to generating, communicating or providing a relevance or content score, the relevance score may also generate, communicate or otherwise provide a data score.

The relevance scorer may receive a digital resource identifier and a user identifier or a request from any application, system or server. In some embodiments, a third party web site serving content may transmit the request and/or digital resource identifier and a user identifier to the linking system or relevance scorer. In some embodiments, an ad server serving advertisement or matching content to impression opportunities may transmit the request and/or digital resource identifier and a user identifier to the linking system or relevance scorer. In some embodiments, a client application may transmit the request and/or digital resource identifier and a user identifier to the linking system or relevance scorer.

D. Systems and Methods For Providing Search Results Based on User Interaction with Content In some embodiments, the present disclosure is directed to systems and methods for providing relevant real-time or static search results. These real-time or static search results may be provided based on user activity and/or engagement measurement from users with respect to particular content and websites. In some embodiments, the linking system 120 may provide or support interactive search based on global engagement patterns of users, for example, across large internet platforms or across multiple platforms. The search results may rank available content based on popularity of the content, which may be determined by user visits and/or referring websites. These results may be determined based on actual interactions between people and content. Such methods, when incorporated into searches, may yield significant improvements over those using typical link crawling and ranking based on links that reside on a page.

Figure 4A:
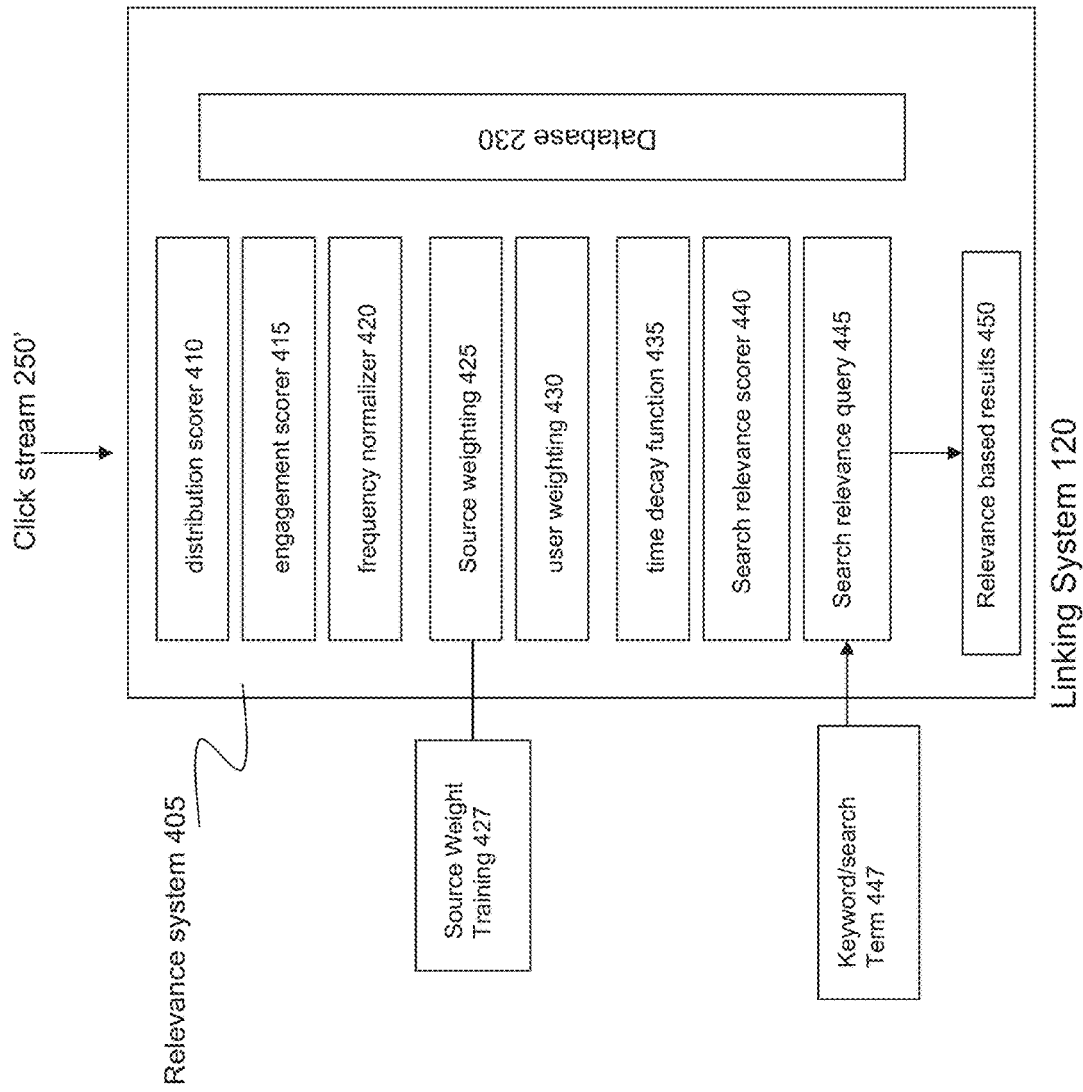
FIG. 4A is a block diagram of an embodiment of a system for providing search results based on user interaction with content.

Referring to FIG. 4A, one embodiment of a system for providing search results based on user interaction with content is depicted. In brief overview, the system includes a linking system 120 that incorporates a relevance system 405 for facilitating a search request. The relevance system 405 may receive a click stream 250', as well as keywords or search terms 447 from a search request. In some embodiments, the relevance system 405 includes one or more of the following modules: distribution scorer 410, engagement scorer 415, frequency normalizer 420, source weighting module 425, user weighting module 430, time decay function 435 and search relevance scorer 440. The relevance system 405 may determine a relevancy score for each document identified in a clickstream, for ranking documents during a search.

In certain embodiments, the linking system 120, via a click tracker, may collect, track or otherwise monitor information about links or content accessed by one or more users. The linking system 120 or the click tracker may determine the content that users selected via encoded links, and may analyze the selected content to facilitate interactive search. By way of illustration, and in one embodiment, the linking system 120 may prioritize content and/or links based on one or more of: (i) the identity or other information of the user clicking on the link, (ii) the identity or other information of the website providing the content or link to the content, and (iii) the timing and/or number of users accessing the content via a certain link. In certain embodiments, this prioritization may be determined or computed based on one or more mathematical and/or computer techniques, which may be custom or proprietary to the linking system 120. The linking system 120 may establish, maintain and/or update a database of content or links based on the above determination, analysis and/or prioritization.

The database 230 may include any information or data associated with a click on an encoded link. The database 230 may include data collected, tracked, and analyzed either statically or in real-time, and associated with the click. The linking system, via the click tracker, may analyze and/or parse a clickstream for data to extract and store in the database 230. In some embodiments, the database 230 may store data collected, tracked, and analyzed by the linking system 120 in response to a mouse-over, copy or paste of an encoded link. The linking system may store any portion of the collected data in a record of the database. In some embodiments, a stored record may correspond to a click or other user action. The record may include any user and/or traffic data provided by a web browser, such as those described above in connection with FIGS. 2, 3A and 3B.

In some embodiments, a search engine or system is supported by the linking system 120 in real time or substantially in real time. The search system may change or update the relevancy of content for a user as that user and/or other users click on or navigate links (e.g., encoded links) on a page. The relevancy of a content may be determined in relation to keywords or search terms, user activity and/or activity from various websites. The search system may communicate with or rely on the linking system 120 to process the clickstreams in real time or substantially real time. In some embodiments, the linking system includes a clickstream processing module, which may be referred to as a relevance system 405 or omniflector. The linking system 120 may process or decode a clickstream in real time, and may dissect, organize, buffer and/or store the processed information to the database 230.

In some embodiments, the database 230 may be referred to as a redistribution database or a sharded redis cluster database. The database 230 may comprise one or more sharded redis cluster databases, e.g., in a storage area network (SAN). In certain embodiments, the relevance system 405 may receive and/or process a portion of the clickstream to obtain a social score for each content or document (hereafter sometimes generally referred to as "document" or "content"). The relevance system 405 may perform calculations on a portion of the decoded stream, to generate the social score and/or other data. The linking system 120 may store the social score and/or other data to the database 230. In some embodiments, the linking system, e.g., via the relevance system 405, may receive or access a portion of the stored or buffered information. The linking system 120 may use this information to generate, create, calculate or otherwise determine a social score for each document.

In some embodiments, a social score indicates, describes or represents how popular or in demand a certain document is. In some embodiments, a social score is a weight to be applied to the relevancy scoring. A social score may be determined based on the number of times a document is "clicked" or accessed, and/or how widely the document is being shared or referred (e.g., a corresponding encoded link is forwarded or copied). The social score may be tempered by, or incorporate, a decay function to allow old content to decay, and new content to gain traction, prominence or relevance in searches. The linking system 120 or relevance system 405 may include a decode processor, which may comprise or execute any application, algorithm, program, library, process, service, script, task or any type and form of instructions for determining social scores. In some embodiments, the decode processor includes a chip or a chipset, e.g., a CPU, an application specific integrated circuit (ASIC), a field-programmable gate array (FPGA), or any other hardware for determining the social score.

By way of illustration, and not intended to be limiting in any way, the social score may be any real number or integer ranging between 1 and 100 (or any other range). A maximum of 80 points for example, may be mapped, derived, or contributed from a raw social score. A maximum of 10 points, for example, may be mapped, derived, or contributed from a count of the total number of social referrers. A maximum of 10 points, for example, may be mapped, derived, or contributed from a count of the total number of other referrers. The raw score may indicate the reach of a web site or a document online, and may include a number of components, including a distribution score, an engagement score, etc. The raw score may have any value larger than one (or zero, in some embodiments). A raw score falling within certain predefined range may be mapped to a value that makes up a portion (e.g., 80%) of the social score. The total number of social and/or other referrers may similarly yield component value(s) that contribute to the final value of the social score. By way of example, one embodiment of a pseudo code or algorithmic description of the determination of a social score is depicted below:

a=raw social score [e.g., weighted number of clicks, weight may indicate the reach of a site on the internet]

b=total count of social referrers c=total count of other (e.g., non-social) referrers d=mapped social score [a: 1-400→buckets 1-70; a: 401-2000→buckets 71-80, >2000=80]

e=mapped social referrers [b*3, may be bounded between 0 and 10]

f=mapped other referrers [c/2, may be bounded between 0 and 10].

In some embodiments, the raw social score may contribute the largest component of the social score. However, various different attribution weights may be implemented in various embodiments, and applied to each of the social score components. In one embodiment, the linking system 120 (e.g., via a source weighting module 425) may assign a weight (e.g., ranging between 1 and 10) to certain websites (e.g., top sites) or documents in accordance with the reach they have on the web. Sites with high or broad reach, such as Facebook and Twitter, may be assigned a weight of 10 or some large value. Lower reaching sites, such as Xing.com, may be assigned a 1 or some small value. In some embodiments, when a social click is identified or detected, the raw social score for a corresponding document is adjusted according to the appropriate, assigned weight. By way of example, a click from Facebook may be worth 10 times as much as a click from Xing, and correspondingly represented by their assigned weights.

The raw social score of a document may continue to increase in value as the document's link receives more clicks. In one illustrative embodiment, the raw score may be mapped to a number between 1 and 80, e.g., with the bottom 70 points mapped to lower raw score ranges, and the last 10 points mapped to higher raw score ranges. In some embodiments, the source weighting module 425 may receive source weight training data 427 to generate an initial social score, or to test the social scoring system. The source weight training data 427 may include weights to assign to certain sites, and these weights may be adjusted or updated as sites are ranked and re-ranked. In some embodiments, the source weight training data 427 may include clickstreams (e.g., simulated, historical, or received in real time) for evaluating source weighting and social scores.

In some embodiments, the relevance system 405 identifies users that triggered the clickstreams and includes a user weighting module 430 configured to weight the social score based on the identified users. The user weighting module 430 may assign specific weights to particular users, such as those identified as influencers (e.g., showing significant social networking reach in sharing content, etc.) and/or power users (e.g., performing significant number of searches, which may influence search relevancy in a positive or negative way for other users). By way of example, the user weighting module 430 may measure the value of particular users (e.g., a leading social networker on shoe fashion trends) on specific keywords, search terms or search strings (e.g., "lace up boots", "tasseled leather pumps"), and may categorize such users as influencers. The user weighting module 430 may weight search results based on identifier influencers, for example boosting search results for content that is either encoded or decoded by influencers. In certain embodiments, the user weighting module 430 assigns weights to clicks associated with certain user data or characteristics (e.g., gender, age group, or users whose online history include visits to websites catering to specific subject matter).

In certain embodiments, the total number or count of social referrers represents the total number of unique referring domains for a certain document or content. These referring domains may be social websites or online social networks. The total number of other referrers may represent the total number of unique referring domains that are not social sites, for a certain document or content. In the above example, the total number of social referrers may be multiplied by three, and the result bounded between 0 and 10. The linking system 120 may divide the total number of other referrers by 2 (or some other number), and bound the result between 0 and 10. Either of these referrer counts may be adjusted by some other predetermined multiplication (or division) factor before contributing to the social score. In addition, either of these referrer counts may be capped or bounded by other ranges (e.g., 0-100) after adjustment.

Any of the above information may be used to determine the social score and/or to determine which documents get indexed within search lists. Once a document is indexed, the relevancy score for a document is determined by a relevance system of the linking system 120 using a combination of word relevancy and the document's social score. The social score may indicate that a document is relatively more important, or is more relevant to a search if the document has been accessed by users and/or from domains (e.g., via encoded links) that have a lot of influence or reach on the web. It may be expected that documents accessed from popular sites may be more popular and relevant to a user in a search. The linking system 120 may index each document identified in a clickstream. The linking system 120 may index or store the document in the database 230 with or against a corresponding social score. This social score of a document may be updated in real time, according to a schedule, or in response to a triggering event (e.g., a search). In certain embodiments, the relevance system 405 and/or search system may access, compare and/or use the social score of a document during a search.

In some embodiments, the social score of a document is determined based on social clicks that access the document via encoded links. In other embodiments, the social score may incorporate one or more types of clicks, which may include non-social clicks. In some embodiments, social clicks include clicks on document links from identified top websites. In some of these embodiments, social clicks include clicks on links from top social sites. The linking system may identify, maintain or track a number of top sites, e.g., 1000 top sites, which may be provided by partners, market research providers (e.g., Doubleclick), analytics (e.g. BlueKai and Exelate) or search providers (e.g., Yahoo, Google and Bing). In some embodiments, the top sites may comprise, exclusively or non-exclusively, major social sites (e.g., Facebook, Twitter, Google+, LinkedIn, etc). The linking system 120 may determine that a click referred, redirected or consummated from one of these top sites or domains may be considered a social click. As an illustration of the relative importance or relevance of social clicks, consider the following: a linking system that focuses on social clicks from the top 1000 sites may be able to index less than 1% of the domains being clicked, but such clicks may account for over 38% of all online clicks. Thus, social clicks may be useful for determining social scores for online content. In certain embodiments, the linking system 120 may dynamically monitor click counts from domains and determine top sites based on the distribution of click counts. The linking system may dynamically identify top sites, e.g., in lieu of a static list of top sites provided by a third party.

In certain embodiments, the linking system may classify or group two or more clicks on a social site for the same document, occurring within a certain time period (e.g., 2 or 5 minutes), as a social click. In some embodiments, the linking system may group multiple clicks from other types of web sites as a single social click. Documents identified by a social click may be included in a directory, database, search list, index or application programming interface to index the document for search. In some embodiments, such documents are placed in a publisher/subscriber (pubsub) index or stream that can be pulled during searches. A search engine may pull the social clicks pubsub stream and may continuously index global hashes within the pubsub. Documents that are popular may tend to be clicked over and over again. Such documents may get indexed again and again corresponding to the clicks. As documents' links are clicked, the linking system 120 may update the documents' social scores. As the documents get re-indexed, their corresponding social scores may be higher, resulting in higher rankings within search results.

In certain embodiments, the number of social clicks may contribute to a social score in a linear or non-linear fashion. For example, a social score of a document may be configured such that it is directly proportional to the number of social clicks detected. In some other embodiments, the first clicks (click number 1-80) from a social website may be weighted more than later clicks (click number 81 to 100) in determining a social score. In one embodiment, and by way of illustration, the number of social clicks may be represented as follows:

$$sc_{i,j} = \sum_{1,80} \frac{s(i)}{10} + \sum_{81,100} \frac{s(i)}{100}$$

In some embodiments, s(i) may represent the click count for term i within the respective click count ranges for document j. Additional clicks (e.g., beyond 100) may be weighted less or differently, or disregarded after a certain threshold (e.g., 100 clicks). In certain embodiments, the number of social clicks, $sc_{i,j}$, may be referred to as an engagement score. An engagement scorer 415 of the linking system may rank, score or rate content based on how many clicks are received. An engagement scorer 415 may include or execute any application, program, library, process, service, script, task or any type and form of executable instructions for generating and/or updating an engagement score. The engagement scorer 415 may apply the above function, or some other nonlinear function, such that initial clicks are weighted more than later clicks. The engagement scorer 415 may emphasize initial clicks so that new content may promoted over older content with the same frequency of clicks. The linking system 120 may, for example, promote new content by leveraging on a time decay function in conjunction with the engagement score. The linking system 120 may include or incorporate the engagement score in a social score.

As described, the linking system 120 may calculate the social score for each document, and may store the social score in an index. The social score may be decayed, reduced or de-emphasized in time for use in searches, e.g., from the time the document is first indexed. A social score may decay down to half of its original score over a configured period of time, such as 72 or 168 hours. In some embodiments, a social score may be decayed as a function of $e^x$ (e.g., $f(e^x)$), where x represents time. The linking system 120 and/or search system may use the social score to determine a relevancy score. The linking system 120 may include a search relevance scorer 440 for determining and/or updating the relevancy score of a document. The search relevance scorer 440 may include and/or execute any application, program, library, process, service, script, task or any type and form of executable instructions for generating and updating the relevancy score of a document. The search relevance scorer 440 may communicate or interoperate with one or more modules (e.g., distribution scorer 410, engagement scorer 415, frequency normalizer 420, time decay function 435) in determining and/or updating a relevancy score. A relevancy score may sometimes be referred to as a search score or a relevance score. The social score may be one of several factors that determines the relevancy score of a document as pertains to search (e.g., interactive search).

In some embodiments, a relevancy score is based on one or more of weights, factors or components, for example: (i) Social score (e.g., how popular a document is), (ii) time decay (e.g., how long a document has been in the index), and (iii) normalized frequency (e.g., how relevant certain terms are to the text of a document). Other weights, factors or components may include (iv) a distribution score and (v) an engagement score. In certain embodiments, the social score for a document may incorporate one or more of the above components, e.g., time decay, distribution score and/or engagement score. For example, the social score may be subject to time decay prior to being used by the linking system 120 to determine a relevancy score. In other embodiments, the social score may be combined with other factors before being subject to time decay to establish the relevancy score. As discussed, time decay may incorporate an $e^x$ function with respect to time (x), or any log-linear time decay function. With the time decay function, new documents with links that are more recently clicked may have a higher social and/or relevancy score.

A distribution scorer of the relevance system may calculate or determine the distribution score or weight for a document. The distribution scorer 410 may include any application, program, library, process, service, script, task or any type and form of executable instructions for monitoring or tracking clicks arising from various websites. The distribution scorer 410 may determine that a document is ranked higher or more relevant in a search if clicks to access such a document arise from a broader set of source web sites. The distribution scorer 410 may determine the distribution of clicks (e.g., counts of social clicks or normal clicks) for the same document across a plurality of sites. In some embodiments, the distribution scorer 410 may determine the number of source sites (e.g., specific social sites) that referred clicks for a certain document. In certain embodiments, the distribution score may be referred as "social distribution". The distribution score may be calculated, expressed or represented in one embodiment by the following formula:

$$sd_{ij} = \max\left(\sum_k n, \text{Max\_SD}\right) \text{ where } \sum_k n$$

can represent the number of source sites that have been referring clicks for a document. In some embodiments, $$\sum_k n$$

represents the summation of website counts, e.g., over k categories of clicks or k types of websites. Max_SD may be an upper bound or cap for the distribution score (e.g., 100 websites). In some embodiments, Max_SD is optional, and may be set to 0. Where Max_SD is specified, the distribution score may take the larger of Max_SD or the number of source sites referring clicks for the document.

In some embodiments, the linking system 120 includes a frequency normalizer 420. A frequency normalizer 420 may include any application, program, library, process, service, script, task or any type and form of executable instructions for processing a term or word's frequency of occurrence in a document. Once enough traffic has been monitored for clickstream activity, the linking system 120 may retrieve a document identified in the clickstream, using the corresponding long URL. The linking system may extract content that is appropriate for text-based, keyword search. The frequency normalizer 420 may extract key words from the extracted content, and may normalize some of these keywords. In some embodiments, the frequency normalizer 420 may insert or store the keywords and their normalization values into the database 230.

In some embodiments, the frequency normalizer 420 uses a term frequency-inverse document frequency (tf/idf) ratio or metric to obtain the normalization values. This metric may be used as a statistical measure to evaluate the importance of a term or word within a document. The importance of a term may increase proportionally to the number of times the term appears in the document. The importance of the term may be offset by the frequency of the word within a superset of documents (e.g., corpus) comprising the document. The linking system may use the tf/idf metric to score or rank a document's relevance in a given search query. The linking system may use the tf/idf metric to normalize or diminish the weight of terms (e.g., "the", "of") that occur very frequently in the corpus and increase or normalize the weight of terms (e.g., "hibernation", "omnibus") that occur rarely.

In some embodiments, the tf/idf metric comprises a term frequency (tf) and the inverse document frequency (idf) components. The tf component may represent the occurrence count of a term in a document. The tf component may be determined from the number of times a given term appears in that document, normalized to prevent a bias towards longer documents to give a measure of the importance of the term i within the particular document j. For example, in a document containing 100 words wherein the word brown appears 3 times, the tf value for brown may be determined as (3/100)=0.03. In some embodiments, the tf value is expressed in logarithmic form, e.g., log(0.03). One embodiment of the tf value is presented as follows:

$$tf_{i,j} = \frac{n_{i,j}}{\sum_k n_{k,j}},$$

where k may represent the number of distinct terms in the document.

In some embodiments, the idf component is a measure of the general importance of a term. It may be obtained by dividing the total number of documents by the number of documents containing the term, and then taking the logarithm of that quotient. One embodiment of the idf may be represented as follows:

$$idf_{i,j} = \log\left(\frac{|D|}{|\{j:t_i \in d_j\}|}\right),$$

where D may represent the corpus or set of all documents, |D| may represent the cardinality of D, or the total number of documents in the corpus. $|\{j:t_i \in d_j\}|$ may represent the number of documents where the term $t_i$ appears. By way of example, if there are 10 million documents and the term brown appears in one thousand of these, the inverse document frequency may be calculated as log(10,000,000/1,000) =4.

The normalization frequency of a document term may be determined as the ratio of tf to idf, e.g., tf/idf. In one embodiment, this is represented as:

$$(tf/idf)_{i,j} = tf_{i,j}/idf_{i,j} = \frac{\frac{n_{i,j}}{\sum_k n_{k,j}}}{\log \frac{|D|}{|\{j:t_i \in d_j\}|}}$$

In some embodiments, the search relevance scorer 440 may use the tf/idf normalization frequency to determine the relevancy score. However, in some other embodiments, the search relevance scorer 440 may use a different document frequency or a variant of the tf/idf normalization frequency. For example and in one embodiment, the search relevance scorer 440 may use a td.idf weight, which may be represented as:

$$(tf \cdot idf)_{i,j} = tf_{i,j} \times idf_{i,j} = \frac{n_{i,j}}{\sum_k n_{k,j}} \times \log \frac{|D|}{|\{j:t_i \in d_j\}|}$$

In certain embodiments, the frequency normalizer 420 may compute or determine a td-idf value using Lucene scoring methods. A Lucene score, may, for example, be expressed in the following embodiment:

$$\text{score} = td - idf \text{ value} = coord \cdot queryNorm \cdot \sum_{i \text{ in } q}(td \cdot idf^2 \cdot \text{Boost} \cdot norm)$$

where coord may be a score factor based on how many of the query terms are found in the specified document. A document that contains more of the query's terms may receive a higher score than another document with fewer query terms. queryNorm may be a normalizing factor for making scores between queries comparable. Boost may represent a search time boost of one or more terms in the query as specified in the query text. Boost may be used to access a boost of one or more terms in a multi term query. norm may include one or more boost and length factors, such as boost factors for specific documents, fields in a document, field length, etc.

In various embodiments, the relevancy scorer 440 may apply different variants of Lucene scoring and the td-idf value in determining the relevancy score. In certain embodiments, for example, different fields in a document may carry different weights. The relevancy scorer 440 may configure these weights as custom properties for a search, a document index, the relevancy scorer 440 and/or frequency normalizer 420 for example. In one embodiment, the relevancy scorer 440 may confer weights or boosts to the following content fields: title=5, meta keywords=3, meta description=4, meta site=4, domain=4, url=3, page=1, globalhash=5, h1=7, h2=5, h3=3, h4=2, cities=3. These may be configured by an administrator and/or determined based on search activity. In some embodiments, arbitrary weights may be assigned and updated based on search activity. By way of illustration, the following is a listing of configured document field boosts:

```
<entry key="boosts.site">4.0</entry>
<entry key="boosts.domain">4.0</entry>
<entry key="boosts.url">3.0</entry>
<entry key="boosts.globalhash">5.0</entry>
<entry key="boosts.phrase">5.0</entry>
<entry key="boosts.title">5.0</entry>
<entry key="boosts.description">4.0</entry>
```

-continued

```
<entry key="boosts.keywords">3.0</entry>
<entry key="boosts.lang">2.0</entry>
<entry key="boosts.h1">7.0</entry>
<entry key="boosts.h2">5.0</entry>
<entry key="boosts.h3">3.0</entry>
<entry key="boosts.h4">2.0</entry>
<entry key="boosts.cities">3.0</entry>
```

Certain variants of Lucene scoring may incorporate boosts values for each document field. For example, Lucene scoring may apply a configuration in which text in h1 tags are more important than those in h2 tags and the title field, which may be more important than the domain field, etc. A document or content may be configured for a relative boost. In certain embodiments, a document or content may not be configured for a boost, although it may incorporate a score or weight in the Lucene scoring method based on the length of text, number of terms in the document and other factors, for example.

In some embodiments, the search relevancy scorer 440 determines the relevancy or search score with the following computation: time-decayed social score*tf-idf value. In another embodiment, the search relevancy scorer 440 may determine the relevancy score using the following formula:

Σ(decay time·Πtd–idf·social distribution score·social score), where Π may represent a direct or Cartesian product of td-idf values. Yet other embodiments may incorporate any of the components described, e.g., engagement score, user weighting, source weighting, etc. The relevancy scorer may rank or index documents based on any variant or combination of relevancy scores, and the highest scoring documents may be returned first in a search.

By way of illustration, a retrieval mechanism may be used to query the database, apply the relevancy score (or a combination of scores described above), and provide a set of search results 450 ordered by how relevant they are in the clickstream. The relevance system 405 may receive keywords or search terms 447 from a search and may process these into a search relevance query 445. Search terms may include one or more parameters that identify or define audience or user segments. These one or more parameters may break down, identify or define users into sub-groups, such as by demographics, communication behavior and media use. In some embodiments, a search term may identify a geography scope or limitation, such as limiting the search to users who live in Italy. In some embodiments, a search term may identify a language scope or limitation, such as limiting the search to users who read content in Italian or interacted or clicked on content in Italian. In some embodiments, a search term may identify an influence rating.

The search relevance query 445 may for example, comprise scores for keywords, indexes into specific groups of documents and/or information about the user. The relevance system 405 may apply the search relevance query 445 against the indexed documents, which are ranked by their relevance scores. By matching document relevance against the query 445, the relevance system 405 may return one or more documents in the search results. The system 405 may return search results limited to or based on any of the audience or user segmentation terms. For example, if a geography term of Italy and a language term of English, the system may return search results based on English based content interacted with, encoded or clicked on by users locating in Italy.

Although some components or factors may be generally referred to or described herein as scores or scoring, these components or factors may be considered weights to be applied to the relevancy calculation or algorithm. For example, a social score, a distribution score, an engagement score, a frequency normalization and/or a time decay function may be considered weights or weighting factors for the relevancy system and may be applied to weight the relevancy score or provide a weight to other components or inputs of the relevancy system.

Figure 4B:
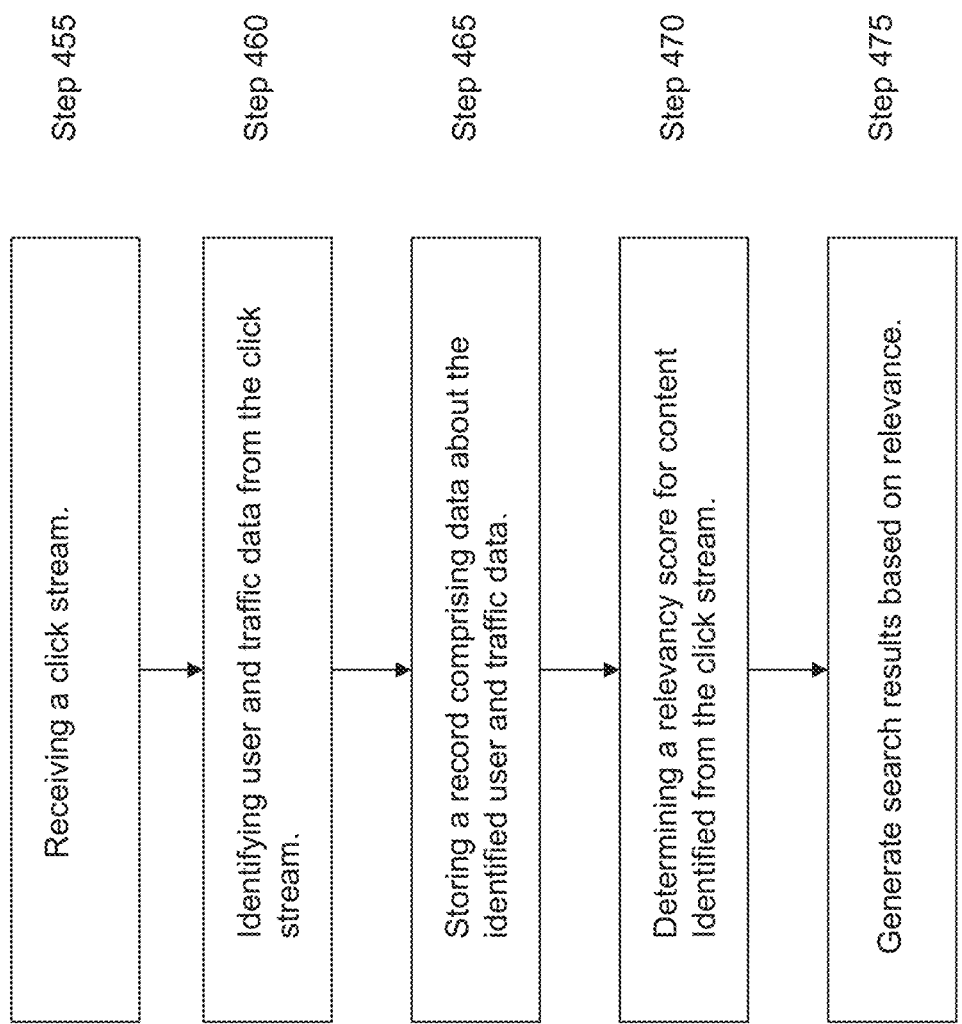
FIG. 4B is a flow diagram of an embodiment of a method for providing search results based on user interaction with content.

Referring to FIG. 4B, one embodiment of a method for providing search results based on user interaction with content is depicted. In brief overview, the method includes receiving, by a server, identification of a plurality of clicks of encoded uniform resource locator (URL) links (455). The server may identify, for each of the plurality of clicks, data about a user who clicked an encoded URL link and traffic data associated with a device from which the user clicked the encoded URL link (460). The server may store a record for each click of the plurality of clicks, the record comprising data about the user and traffic data associated with each click (465). The server may determine, based on the records, a relevancy score for each content identified from decoding the encoded URL links (470). The server may communicate, responsive to receiving a request to search content based on a keyword, a set of search results based on the keyword and the relevancy score (475).

Referring now to (455), a server may receive an identification of a plurality of clicks of encoded uniform resource locator (URL) links. The server may comprise any embodiment of the linking system 120 described above in connection with FIGS. 2, 3A and 4A. The server may decode each of the encoded URL links, for example, as described above in connection with FIG. 2. The server may decode an encoded URL link in real time. The server may redirect the click to access a document from another URL.

In further details of (460), the server may identify, for each of the plurality of clicks, data about a user who clicked an encoded URL link and traffic data associated with a device from which the user clicked the encoded URL link. In some embodiments, the server may identify data about the user from a cookie communicated via a click by the user on the encoded URL link. The server may identify, for example, traffic data comprising one or more of a browser type, a referring web site, a source internet protocol address, a destination internet protocol address, a time instance of a click, a document accessed.

The server may identify any other data about the user and/or traffic data as described above in connection with FIGS. 2 and 4A. For example, the server may determine if a user is an influencer or meets certain criteria for increased weighting. The server may assign an appropriate weight to this user's social clicks, e.g., in determining a document's social score. In some embodiments, the server may determine, based on traffic data, if a number of clicks are social clicks that may contribute to a social score, or if a click is triggered from a website identified as a top site and/or a social website. The server may assign a greater weight to social clicks arising from a top site and/or a social website. In certain embodiments, the server may track the number of corresponding clicks from a document, and the distribution of source websites that triggered the clicks.

Referring now to (465), the server may store a record for each click of the plurality of clicks. The server may store the record in any embodiment of the database 230 described above in connection with FIGS. 2 and 4A. The record may comprise any form of data structure such as a database or hash entry, a table item, or any collection of data associated with a click, document/content, user and/or source website. The record may comprise data about the user and traffic data associated with each click. In some embodiments, the server may store an index of a document identified by a click or clickstream. The server may store, maintain and update an index of documents to facilitate searches for content. The server may, in some embodiments, retrieve and store a document identified via a clickstream in the database 230. In certain embodiments, the server may determine, rank and store a list of top websites based on where the clickstreams arose. The record may include fields or memory space for storing one or more scores, such a social score and/or a relevancy score for a document.

Referring now to (470), the server may determine, based on the records, a relevancy score for each content identified from decoding the encoded URL links. The server may determine the relevancy score via one or more modules, for example, a search relevancy scorer 440, a frequency normalizer 420, a distribution scorer 410 and an engagement scorer 415. In some embodiments, a distribution scorer 410 of the server may determine a distribution score for each content based on a number of clicks from different sources via one or more encoded URL links to the content. The distribution scorer 410 may determine that a document has a higher distribution score, or is more relevant to a search if clicks to access such a document arise from a broader set of source web sites. The distribution scorer 410 may determine the distribution of clicks for the same document across a plurality of sites. The distribution scorer 410 may track or evaluate the number of source sites that referred clicks for a certain document.

In certain embodiments, the server may determine, via an engagement scorer 415, an engagement score for each content based on a number of clicks received via one or more encoded URL links to the content. Each of the number of clicks may be weighted based on when the click was received. The engagement scorer 415 may determine the engagement score of a document based on the number of social clicks made to access the document. The engagement scorer 415 may rank content based on how many corresponding clicks are received. In certain embodiments, the engagement scorer 415 applies a nonlinear function to click counts such that initial clicks are weighted more than later clicks.

In some embodiments, the server may determine, via a frequency normalizer 420, a frequency normalization value for each content. The frequency normalizer 420 may extract keywords from the content, normalize the keyword counts and may store the keywords and corresponding normalization values into a database (e.g., database 230). The frequency normalizer 420 may extract content from a document, such as text-based content, suitable for text-based keyword searches. The frequency normalizer 420 may determine each term or word's frequency of occurrence in the extracted content. The frequency normalizer 420 may normalize the counts of these terms or words. In some embodiments, the frequency normalizer 420 may use td-idf normalization, such as Lucene scoring, to perform the keyword normalization. The frequency normalizer 420 may provide a td-idf value for each document, to determine the relevancy score of the document.

In certain embodiments, the server may apply a time decay function to the relevancy score based on the length of time a content has been stored in a record after being identified from decoding the encoded URL links. In some embodiments, the time decay function is incorporated into the calculation or formula for determining the social score or the relevancy score, for example, as described above in connection with FIG. 4A. The time decay function may incorporate a log-linear time function in certain embodiments. The time decay function may enable a document with links that are more recently clicked to have a higher social and/or relevancy score.

The server may determine, via a search relevance scorer, the relevancy score of a document by a combination of two or more of a social score, a distribution score, an engagement score, a frequency normalization value, a time decay function, a source weighting component and a user weighting component. The search relevancy scorer may rank or index documents based on any one or a combination of these scores or values. For example, the search relevancy scorer may use relevancy scores to return the highest scoring documents in a search, e.g., based on the closest matching keywords.

In further details of (475), the server may communicate, responsive to receiving a request to search content based on a keyword, a set of search results based the keyword and the relevancy score. The server may receive one or more keywords or search terms from a user or application based on a search. In some embodiments, the server The server may process the one or more keywords or search terms into a search relevance query 445, which may include a processed set of terms and/or priority applied to each of the processes terms. The search relevance query 445 may comprise scores for keywords, indexes into specific groups of documents and/or information about the user. In some embodiments, the server may receive the search relevance query 445 from a search engine or an application. The server may apply or match one or a combination of keywords or terms against a listing, database or index of documents. The listing, database or index of documents may be ordered, ranked or indexed based on the documents' relevancy scores and/or document terms. The server may return a set of search results or documents based on the relevancy scores and/or closest matching terms of the documents. In some embodiments, the server may order the set of search results based on relevancy score of the documents.

In certain embodiments, the server may match a plurality of documents against one or a combination of keywords or terms without using the relevancy scores. The server may identify a subset of documents that most closely matches the one or a combination of keywords or terms. The server may rank this subset of documents based on the how closely the documents matches the one or a combination of keywords or terms. In some embodiments, the server combines this ranking with the relevancy score of these documents, to order the set of search results. The server may, for example, reorder the set of search results based on the relevancy scores or by applying a weighted preference based on the relevancy scores. Using embodiments of the above processes, the server may generate and/or order search results based on the relevance of the documents, e.g., as determined by user interaction, user feedback, and/or based on the popularity of particular content in connection with social media.

E. Systems and Methods for Identifying Trends in Phrases of Content

Figure 5A:
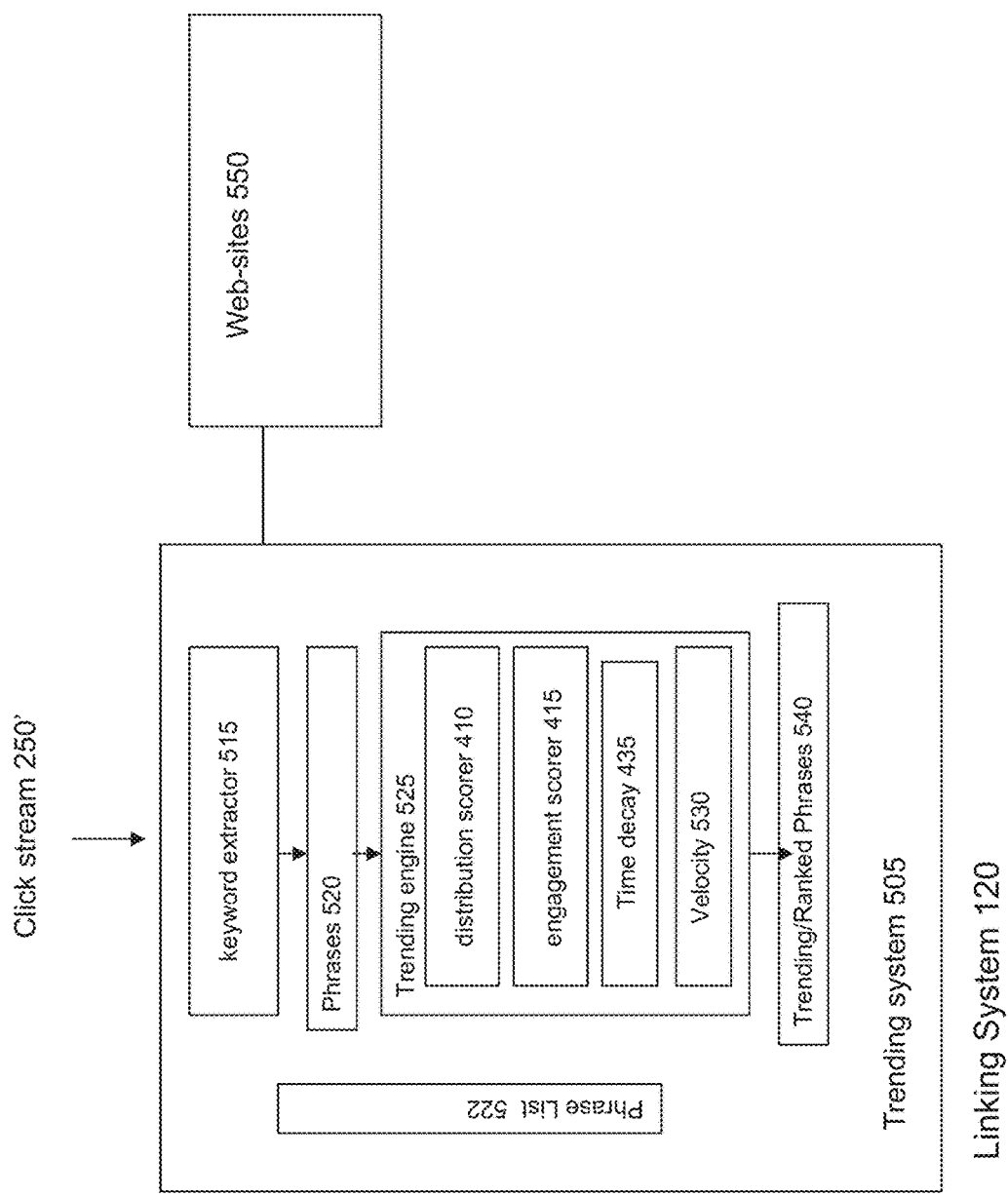
FIG. 5A is a block diagram of an embodiment of a system for identifying trends in phrases of content.
Figure 5B:
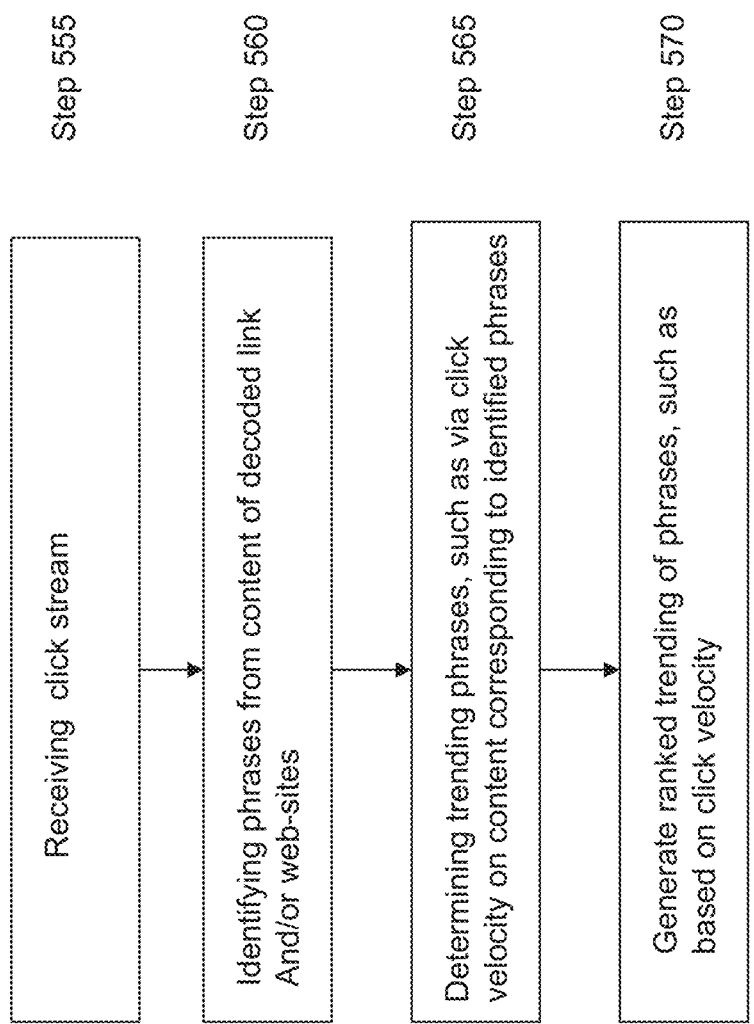
FIG. 5B is a flow diagram of an embodiment of a method for identifying trends in phrases of content.

Referring now to FIGS. 5A and 5B, systems and methods for identifying trends in phrases in content is depicted. These systems and methods may determine trending or popular phrases from user interactions with web content containing, related to or associate with such phrases. These systems and methods identify trending or temporally popular phrases based on aggregating multiple users' interactions with an aggregate of content. Using click stream data and any list of phrases, ontology, or dictionary, systems and methods of the present solution can score web content based on users level of engagement with such content, and deduce the most popular phrases being viewed across a large set of content. These systems and methods may be applied in real-time or statically. These systems and methods may generate or provide a list of phrases or topics that are trending upwards and/or downwards.

Referring now to FIG. 5A, an embodiment of a trending system 505 for identifying trends in phrases related to, contained in, describing or otherwise associated with content for which users interact with or click on is depicted. In brief overview, the system 505 includes a keyword extractor 515 that identifies phrases 520 from content identified via a click stream 250'. The keyword extractor may also identify phrases 520 from a predetermined set of web-sites 550. The keyword extractor may operate responsive a predetermined phrases list 522 by matching phrases found in content to this list. A trending engine 525 may receive these phrases 520 as input and determine which phrases are trending up and/or down or which phrases or topics are most popular. The trending engine may include a velocity engine or component 530. The velocity engine may determine a number of clicks over a predetermined period of time for any one or more phrases across any one or more sites. The trending engine may generate an enumeration or list of phrases 540 that are trending upwards and/or downwards. The list of phrases may be ranked according to the change in trending, popularity or other criteria.

In further detail, the keyword extractor 515 may comprise an application, program, library, process, service, script, task or any type and form of executable instructions for identifying, extracting, or determines keywords and/or phrases from, in, related to, describing or associated with content, such as content the user clicked on an encoded URL link. The keyword extractor 515 may comprise any embodiments of the content extractor 315 described above in connection with FIG. 3A. The keyword extractor 515 may operate responsive to a phrases list 522. In some embodiments, the keyword extractor may be configured with the phrases list. In some embodiments, the keyword extractor may read or process the phrases list from a file, data object or table of a database. The keyword extractor may be designed and constructed to identify or detect keywords and/or phrases from the phrases list in content from or of a digital resource, such as a web page identified by a URL.

The phrases list 522 may comprise any data and information identifying a predetermined set of phrases and/or keywords. The phrases list may comprise a dictionary. The phrases list may comprise an ontology. The phrases list may comprise an enumerated list of phrases and/or keywords. The phrases list may comprise an enumerated list of phrases and/or keywords ranked in order of priority or otherwise having an identified priority. The phrases list may comprise an enumerated list of phrases and/or keywords ordered based on ranking or otherwise having an identified ranking. The phrases list may comprise an enumerated list of phrases and/or keywords with assigned weights or weighting. The phrases list may identify a predetermined list of topics, interests or subject matter. The phrases list may identify a predetermined set of keywords related to or making up a topics, interests or subject matter. The phrases list may be generated from a third-party source, such as a web-site or URL. The phrases list may be generated by the trending engine based on a count of phrases and/or keywords identified in the predetermined list of web-sites. The phrases list may be generated from previous versions of the phrases list. The phrases list may be generated based on learning or intelligence of the trending engine.

The keyword extractor may identify keywords responsive to one or more click streams 250'. In some embodiments, the keyword extractor operates responsive to receipt of a click stream or click action. In some embodiments, the keyword extractor operates in real-time as a click-stream or portions thereof are received by the system 120. In some embodiments, the keyword extractor operates responsive to receipt of a batch of click streams or click actions. In some embodiments, the keyword extractor operates responsive to a predetermined frequency, which may be configurable. In some embodiments, the keyword extractor operates independently from the click stream and identifies keywords from a predetermined set or list of web-sites 550. In some embodiments, the keyword extractor identifies keywords from a predetermined set or list of web-sites 550 on a predetermined frequency. In some embodiments, the keyword extractor identifies keywords from a predetermined set or list of web-sites 550 responsive to an event, such as a user request. In some embodiments, the keyword extractor operates responsive to a click-stream while identifying keywords from a predetermined set or list of web-sites 550.

The list or set of web-sites 550 may include an enumeration or configuration of a predetermined set or list of URLs, web-sites or digital resources. The list or set of web-sites 550 may include a list of the most popular web-sites or URLs. The list or set of web-sites 550 may include a list of the most visited web-sites or URLs. The list or set of web-sites 550 may include a list of the frequently visited web-sites or URLs. The list or set of web-sites 550 may include a list of the highest ranked web-sites or URLs. The list or set of web-sites 550 may include a list of the most searched web-sites or URLs. The list or set of web-sites 550 may include a list of web-sites or URLs selected by a user. The list or set of web-sites 550 may change based on changes in the ranking of any of these web-sites or URLs. The keyword extractor may be configured with the predetermined set or list of web-sites. The keyword extractor may be designed and constructed to read or process a data file, object or table of a database with the predetermined set or list of web-sites. In some embodiments, the list of web-sites 550 comprises a list of N (e.g. 1000) top sites on the internet by reach. This may be identified or pulled from Doubleclick's Top Sites [http://www.google.com/adplanner/static/top1000/] and may include all of the major social sites such as Facebook, Twitter, etc.

The keyword extractor may be designed and constructed to inspect, read or otherwise process any portion of content and match such portions to the phrases list. The keyword extractor may strip images and/or other non-textual elements from the content. The keyword extractor may subtract common words from the textual portions of the content. The keyword extractor may be designed and constructed to inspect, read or otherwise process any text of content and match such text to the phrases list. The keyword extractor may be designed and constructed to inspect, read or otherwise process any meta-data of content and match any strings or text such meta-data to the phrases list. The keyword extractor may be designed and constructed to inspect, read or otherwise process any tags, scripts or mark-up language of content and match any strings or text of such tags, scripts or mark-up language to the phrases list. The keyword extract may be designed and constructed to identify which phrases deviate from a norm relative to other phrases in the content.

The keyword extractor may be designed and constructed to generate, output or provide a set of phrases 520. The keyword extractor may be designed and constructed to interface to or communicate with the trending engine 525. The keyword extractor may enumerate a set of phrases and/or keywords based on a number of instances of the phrase and/or keyword. The keyword extractor may enumerate a set of phrases and/or keywords based on a number of instances of the phrase and/or keyword in the click stream. The keyword extractor may enumerate a set of phrases and/or keywords based on a number of clicks related to the phrase and/or keyword in the click stream. The keyword extractor may enumerate a set of phrases and/or keywords based on a velocity of clicks related to the phrase and/or keyword in the click stream. The keyword extractor may enumerate a set of phrases and/or keywords based on a number of instances of the phrase and/or keyword in the web-sites 550. The keyword extractor may enumerate a set of phrases and/or keywords based on a number of instances of the phrase and/or keyword in both the click stream and in the web-sites. The keyword extractor may enumerate a set of phrases and/or keywords based on an order or ranking from the phrases list 522. The keyword extractor may enumerate a set of phrases and/or keywords based on a corresponding weighting from the phrases list 522. The keyword extractor may enumerate a set of phrases and/or keywords based on temporal information. The keyword extractor may enumerate a set of phrases and/or keywords on a real-time basis as they are generated. The keyword extractor may enumerate a set of phrases and/or keywords on a predetermined basis, such as on a predetermined schedule or at a predetermined frequency.

The keyword extractor may filter the list of phrases based on ranking, priority or weighting, such as may be specified by the phrases list. The keyword extractor may filter the list of phrases based on a predetermined threshold, such as a number of instances of identification of the phrase across content. The keyword extractor may filter the list of phrases based on temporal information and thresholds, such as a number of instances of identification of the phrase across content over a predetermined time period. The keyword extractor may filter the list of phrases based on geography. The keyword extractor may filter the list of phrases based on user profiles. The keyword extractor may filter the list of phrases based on source, such as via click streams or via the predetermined web-sites.

The trending engine 525 may comprise an application, program, library, process, service, script, task or any type and form of executable instructions. The trending engine may comprise functions, operations or logic to identify trends in phrases and/or keywords across digital resources interacted with by users, such as via clicking on encoded links to content related to, described by or containing the phrases and/or keywords. The trending engine may be designed and constructed to process the phrases 520 from the keyword extractor and to determine which of those phrases are trending up and/or down based on user interactions, such as clicking, with digital resources associated with, connected to or comprising those phrases. The trending engine may be designed and constructed to identify which phrases deviate from a norm. The trending engine may be designed and constructed to process the phrases 520 from the keyword extractor and to determine which of those phrases are most popular. The trending engine may be designed and constructed to process the phrases 520 from the keyword extractor and to determine which phrases a user or set of users interact with the most and/or the least. The trending engine may be designed and constructed to process the phrases 520 from the keyword extractor and to determine which of those phrases are from content of an encoded URL that users have clicked on the most and/or the least. The trending engine may be designed and constructed to process the phrases 520 from the keyword extractor and to determine which of those phrases are from content of an encoded URL that users have shared the most and/or the least. The trending engine may be designed and constructed to process the phrases 520 from the keyword extractor and to determine which of those phrases are from content of a URL or web page that has been visited or served the most and/or the least.

The trending engine may comprise any embodiments of the relevance system 405 described in connection with FIGS. 4A and 4B. For example, the trending engine may comprise any embodiments of the distribution scorer 410, engagement scorer 415 and/or time decay function 435 described in connection with FIGS. 4A and 4B. Any embodiments of distribution scorer 410, engagement scorer 415 and/or time decay function 435 may be applied to content associated with or comprising the phrases and based on the results the trending engine determines the trending phrases. For example, in some embodiments, the trending engine determines those phrases from or associated with content with the highest raw social score. In some embodiments, the trending engine determines those phrases from or associated with content with the raw social score greater than a threshold. In some embodiments, the trending engine determines those phrases from or associated with content with the mapped social score greater than a threshold. In some embodiments, the trending engine determines those phrases from or associated with content with the total social score greater than a threshold. In some embodiments, the trending engine determines those phrases from or associated with content with the highest number of social referrers or a total number of social referrers greater than a threshold. In some embodiments, the trending engine determines those phrases from or associated with content with the highest number of mapped social referrers or a total number of mapped social referrers greater than a threshold. Any of the scores from the trending engine, such as via the distribution and/or social scorer, may be decayed via the time decay function and the resulting score of content used to identify the trending phrases accordingly.

The trending engine may be designed and constructed to determine a velocity of interaction with content associated with, related to or containing the phrases. The trending engine may determine such velocity via a velocity engine or component. A velocity engine 530 may comprise an application, program, library, process, service, script, task or any type and form of executable instructions. The trending engine may include the velocity engine. In some embodiments, the velocity engine is separate from the trending engine and the trending engine may communicate with or interface to the velocity engine. The velocity engine may be designed and constructed to determine any change in the rate of interaction over time with content associated with, related to or contains with one or more phrases. The velocity engine may be designed and constructed to determine and/or track a number of clicks on an encoded URL over a predetermined time period in which the content from or of the encoded URL is associated with, related to or contains the phrase. The velocity engine may be designed and constructed to determine and/or track a number of clicks on a plurality of encoded URLs over a predetermined time period in which content from the plurality of encoded URLs is associated with, related to or contains the phrase. The velocity engine may be designed and constructed to determine and/or track the velocity of upward or downward trends of a phrase. The velocity engine may be designed and constructed to determine and/or track the velocity of popularity of a phrase. The velocity engine may be designed and constructed to determine and/or track the velocity of serving or visiting content comprising a phrase.

The trending engine may generate, output, communicate or otherwise provide a list or set of one or more trending phrases 540. The output 540 may be an enumerated list or ordered list. The output may be a report. The output may be a file. The output may be data stored in a database. The output may be a web page comprising the trending phrases. The output may be any digital resource comprising or identifying the trending phrases. The trending engine may output the set of trending phrases via an API call, event or function to an application, program or system. For example, the trending engine may output the set of trending phrases via XML. The trending engine may output the set of trending phrases via a web service call or response to a web service call. The trending engine may output the set of trending phrases via raising an event or calling a function.

The output may be an encoded URL identifying a digital resource comprising or identifying the trending phrases. In some embodiments, the trending phrases or output 540 comprises a list of phrases that are trending upwards. In some embodiments, the trending phrases or output 540 comprises a list of phrases that are trending upwards above, below or within a predetermined threshold. In some embodiments, the trending phrases or output 540 comprises a list of phrases that are trending downwards. In some embodiments, the trending phrases or output 540 comprises a list of phrases that are trending downwards above, below or within a predetermined threshold. The trending phrases or output 540 may be in ascending or descending order.

In the output 540, the trending engine may identify for each or some of the phrases in the phrases list a ranking or placement in the ranking. For each of the phrases from the phrases 520 and/or phrases list, the trending engine may determine a change in the ranking or the placement of the phrase from a previous instance of producing output 540 by the trending engine. In the output, for each of the phrases from the phrases 520 and/or phrases list, the trending engine may determine a change in the ranking or the placement of the phrase during a predetermined time period. For each of the phrases from the phrases 520 and/or phrases list, the trending engine may determine a percentage or degree change in the ranking or the placement of the phrase from a previous instance of producing output 540 by the trending engine. For each of the phrases from the phrases 520 and/or phrases list, the trending engine may determine a percentage or degree change in the ranking or the placement of the phrase over a predetermined time period.

Referring now to FIG. 5B, an embodiment of a method for identifying trends in phrases based on an aggregate of users interactions with an aggregate of content is depicted. In brief overview, the method, at step 555, a server, such as via linking system 120, receives a click stream. At step 560, the server identifies phrases from content of decoded links from the click stream. The server may also identify phrases from content of a predetermined list of web-sites. At step 565, the trending engine determined trending phrases, such as based on click velocity. At step 570, the trending engine generates a set of trending phases, such as responsive to determined click velocity.

At step 555, a server or system, such as linking system 120, receives one or more click streams. The server may receive user actions via click streams 250'. The server may a click stream via or comprising a user interacting, user or accessing a digital resource. The server may receive a click stream from the digital resource. The server may receive a click stream via a user requesting to encode an URL. The server may receive a click stream via a user clicking on an encoded URL. The server may receive a click stream via a request to decode an encoded URL. The server may receive a clicks stream via a client linking system API or application 225. The server may receive a click stream via a log file or activity log from an application, system, device or server. The server may decode any encoded URLs of the received click streams to identify associated content or content of the URL. The server may decode any encoded URLs upon receipt of the click stream.

At step 560, the server or system, such as via the keyword extractor, identifies phrases from, associated with, describing or related to content that users are interacting with or clicking on. The keyword extractor may identify phrases corresponding to a list of phrases 522 from content identified via decoding of encoded URLs. The keyword extractor may operate responsive to receipt of a user action or a click stream. The keyword extractor may identify phrases corresponding to a list of phrases 522 from content of a predetermined set or list of web-sites or URLs. The keyword extractor may identify phrases corresponding to a list of phrases 522 from content of a predetermined set or list of digital resources. The keyword extractor may operate responsive to a predetermined schedule for extracting or identifying keywords from these web-sites, URLs or digital resources. The keyword extractor may operate responsive to a change in the list of web-sites, URLs or digital resources. The keyword extractor may filter the phrase list according to ranking, priority, weighting, geography or temporal information. The keyword extractor may filter the list of phrases based on a threshold.

At step 565, the trending engine determines trends in the phrases, such as the phrases provided or generated by the keyword extractor. The trending engine may determine trends responsive to receipt of phrases from the keyword extractor. The trending engine may determine trends responsive to a predetermined schedule. The trending engine may determine trends on demand, such as responsive to a user request. The trending engine may determine trends responsive to any combination of the distribution scorer, engagement scorer and time decay functions. The trending engine may determine trending phrases from content with the highest or higher scores from the distribution scorer, engagement scorer and/or time decay functions. The trending engine may determine the number of instances of user action with a digital resource associated with or comprising one or more phrases. The trending engine may determine the number of instances over a predetermined time period of user action with a digital resource associated with or comprising one or more phrases. The trending engine, such as via the velocity engine, may determine a velocity of interaction by users with digital resources, such as content, associated with, related to or containing the phrases. The trending engine, such as via the velocity engine, may determine a velocity of interaction by users with content associated with, related to or containing the phrases. The trending engine may determine a velocity of user actions on with content associated with, related to or containing the phrases. The trending engine may determine a velocity of click actions to content associated with, related to or containing the phrases.

At step 570, the trending engine produces or generates a set of trending phrases responsive to determining the trends in the phrases. The trending engine may output the set of trending phrases responsive to the determination(s) of step 565. The trending engine may output the set of trending phrases responsive to a predetermined schedule. The trending engine may output the set of trending phrases on demand, such as responsive to a user request. The trending engine may output the set of trending phrases via an API call, event or function to an application, program or system. The trending engine may output a ranking of trending phrases, such as top N most upward trending phrases or top N most downward trending phrase. The trending engine may output a ranking of trending phrases, such as top N most popular phrases or top N least popular phrases. The trending engine may output an ordered list of trending phrases in increasing or decreasing velocity. The trending engine may output an ordered list of trending phrases with greatest change in velocity. The trending engine may output an ordered list of trending phrases with slowing or least amount of change in velocity.

Although the systems and methods may be generally described herein in reference to phrases, the systems and methods may be designed and constructed to determine a trending topic corresponding to a set or group of phrases. For example, the trending engine may be designed and constructed to organize or arrange a group of phrases into a topic. The trending engine may be designed and constructed to associate or identify that a group of phrases correspond to or describe a topic. In some embodiments, the phrases list may be constructed or organized to associate phrases with topics and the keyword extractor and trending engine operate responsive to this embodiment of the phrases list. Any of the systems and methods described herein may operate or be responsive to a group of phrases and produce a set of trending topics in accordance with the embodiments described herein.

F. Systems and Methods for Identifying Trends and Relevance of Phrases for a User Referring now to FIGS. 6A and 6B, systems and methods for identifying phrases that are relevant to specific user from the phrases that are trending among an aggregate of users interactions with an aggregate of content relevance is depicted. The embodiments of the systems and methods described in connection with FIGS. 3A and 3B for relevance scoring may be combined with embodiments of the systems and methods described in connection with FIGS. 5A and 5B for trending to provide systems and methods for identifying trends in phrases across multiple users and the relevance of such phrases for a particular user. By combining trending phrases with relevance scoring, the systems and methods of embodiments of the present solution can determine which content or phrases is most relevant to a specific user based on trending phrases from an aggregate set of users.

Figure 6A:
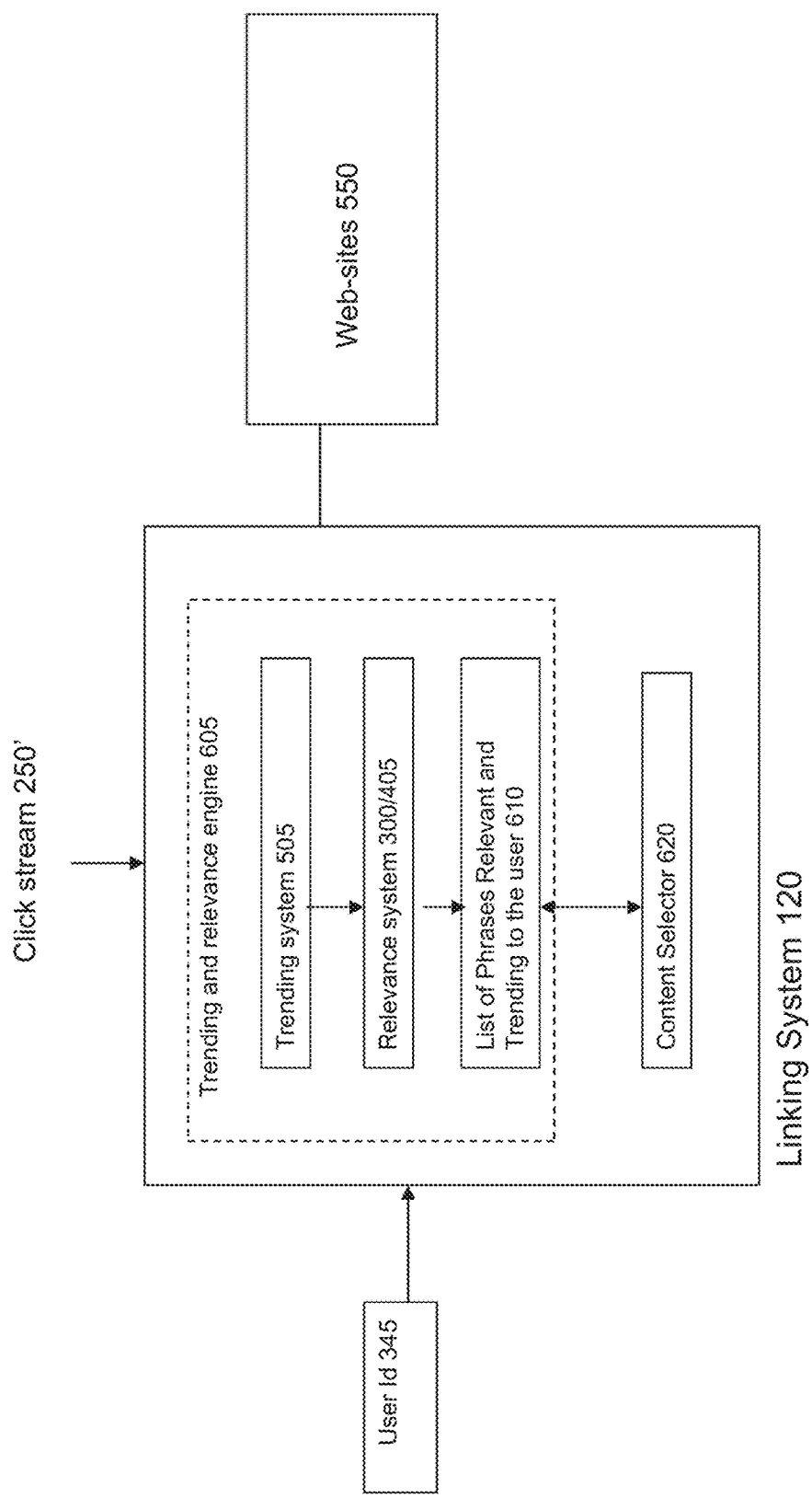
FIG. 6A is a block diagram of an embodiment of a system for identifying trending and relevance of phrases.
Figure 6B:
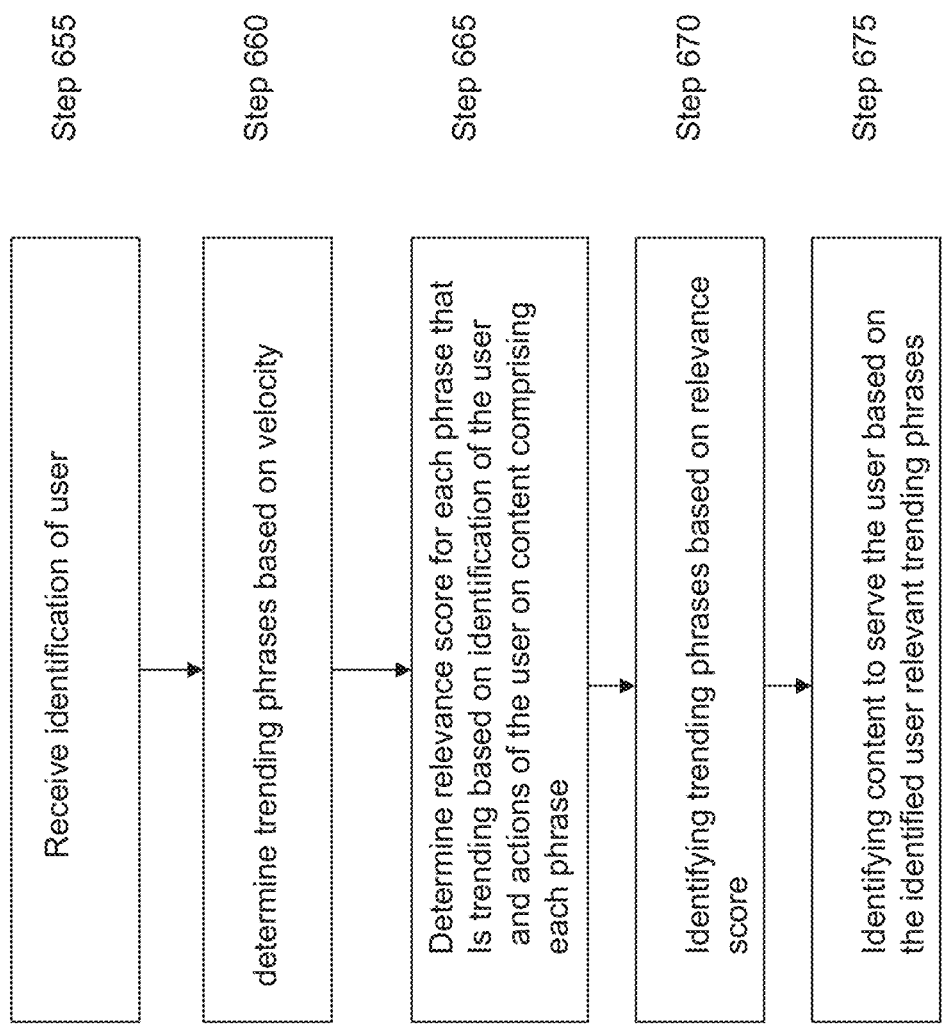
FIG. 6B is a flow diagram of an embodiment of a method for identifying trending and relevance of phrases.

Referring now to FIG. 6A, a system for identifying those phrases trending for an aggregate set of users which is relevant to a specific user is depicted. In brief overview, the system includes a trending and relevance engine 605 which may include a trending system 505 and a relevance system 300. The system may receive identification of a user via user id 345. The system identifies via the trending system those phrases that are trending, such as across an aggregate set of users interactions (e.g., clicks) with an aggregate of content. Further responsive to the user id, the system identifies those trending phrases from the aggregate set of user interactions that have the most relevant score to the user via the relevance system. The system outputs a list of phrases relevant and trending to the user 610. A content selector 620 may use this list to identify the most relevant content to provide or server the user.

The system may include any embodiments of the trending system 505 described in connection with FIGS. 5A and 5B. The system may include any embodiments of the relevance system 300 described in connection with FIGS. 3A and 3B. The system may include any embodiments of the relevance search system 405 described in connection with FIGS. 4A and 4B. The trending system may be designed and constructed to interface to, communicate to or integrate with the relevance system. The trending system may provide a list of phrases 540 to the relevance system. The relevance system may be designed and constructed to interface to, communicate to or integrate with the trending system. The relevance system may provide a list of digital resources and relevance scores 330 to the trending system. The trending system and relevance system may be designed and constructed to work in cooperation or in conjunction with each other. In some embodiments, the trending system and relevance system are combined or constructed into a single application, component, module or system. Any of the above embodiments may be generally referred to as the trending and relevance engine 605 or the relevance and trending engine 605. The system may apply any of the scoring and weighting functions of any embodiments of the relevance system 300/405 described herein in combination with or otherwise to trending phrases.

The trending and relevance engine may comprise any functionality, operations and/or logic to identify phrases that are trending for the user identified by the user id. The trending and relevance engine may comprise any functionality, operations and/or logic to identify digital resources that are most relevant to the user. The trending and relevance engine may comprise any functionality, operations and/or logic to identify phrases that are trending upwards and/or downwards in digital resources interacted with by an aggregate of users and that are most or more relevant to the user. The trending and relevance engine may comprise any functionality, operations and/or logic to identify phrases that are trending upwards and/or downwards in digital resources interacted with by an aggregate of users and that are least or less relevant to the user. The trending and relevance engine may identify phrases that are trending in digital resources that the user is interacting with. The trending and relevance engine may identify phrases that are trending (upwards or downwards) in digital resources interacted with by an aggregate of users and having a relevance score for the user greater than a predetermined threshold. The trending and relevance engine may identify phrases that are trending (upwards or downwards) in digital resources interacted with by an aggregate of users and having a relevance score for the user less than a predetermined threshold. The trending and relevance engine may identify phrases that are trending (upwards or downwards) in digital resources interacted with by an aggregate of users and having a relevance score for the user and velocity greater than a predetermined threshold.

The trending and relevance engine may generate or calculate a relevance score for content that the user interacted with and for which includes one or more phrases corresponding to the list of phrases 522. In some embodiments, while the trending and relevance engine determines trending phrases in content for which users have interacted with, the trending and relevance engine may also determine a relevance score of how relevant that content is to the user. In some embodiments, the trending portion of the trending and relevance engine identifies the trending phrases content corresponding to the trending phrases. The relevance portion of the trending and relevance engine may provide a relevance score for the trending phrase or the content corresponding to each of the trending phrases. In some embodiments, the relevance portion of the trending and relevance engine identifies from the trending phrase or corresponding content, those trending phrases or content most relevant to the user. In some embodiments, the trending and relevance engine performs relevance scoring on each content of a plurality of content corresponding to a phrase and takes an average, weighted average or other function of these scores to provide a relevance score for all content associated with a phrase.

The trending and relevance engine may identify trending or temporally popular phrases based on aggregating multiple users' interactions with an aggregate of content and comparing such phrases to a list of phrases of a particular user via the user's click history and/or user profile. The trending and relevance engine may match phrases between the aggregate user's trending phrases and the phrases from the user's history or profile to provide a set of trending phrases for the user. In some embodiments, the match of phrases from the trending phrases of the aggregate users to the phrases of the user may be referred to as trending phrases of or for the user. The trending and relevance engine may perform a relevance score for such matching or trending phrases of the user, or for any content associated with such phrases.

As a result of operation, the trending and relevance engine identifies phrases that are trending (upwards and/or downwards) in content that an aggregate of users is interacting with/clicking on and which is most or more relevant (and/or less or least relevant) to the user based on the relevance score. The relevance and trending engine may generate, output, communicate or otherwise provide a list or set of one or more user specific relevant trending phrases 610. The output 610 may be an enumerated list or ordered list. The output may be a report. The output may be a file. The output may be data stored in a database. The output may be a web page comprising the user relevant trending phrases. The output may be any digital resource comprising or identifying the user relevant trending phrases. The trending engine may output the set of relevant trending phrases via an API call, event or function to an application, program or system. For example, the trending and relevance engine may output the set of user relevant trending phrases via XML. The trending engine may output the set of relevant trending phrases via a web service call or response to a web service call. The trending and relevance engine may output the set of user relevant rendering phrases via raising an event or calling a function.

The output 610 may be an encoded URL identifying a digital resource comprising or identifying the user relevant trending phrases. In some embodiments, the user relevant trending phrases or output 610 comprises a list of phrases that are trending upwards in content most relevant to the user. In some embodiments, the user relevant trending phrases or output 610 comprises a list of phrases that are trending upwards in content least relevant or becoming less relevant to the user. In some embodiments, the user relevant trending phrases or output 610 comprises a list of phrases that are trending upwards above, below or within a predetermined threshold are most relevant and/or least relevant to the user. In some embodiments, the user relevant trending phrases or output 610 comprises a list of phrases that are trending downwards and are most and/or least relevant to the user. In some embodiments, the user relevant trending phrases or output 610 comprises a list of phrases that are trending downwards in content becoming less relevant or least relevant to the user. In some embodiments, the user relevant trending phrases or output 610 comprises a list of phrases that are trending downwards above, below or within a predetermined threshold in content most and/or least relevant to the user.

In the output 610, the relevance and trending engine may identify for each of the phrases for the user a ranking or placement in the ranking. The relevance and trending engine may determine a change in the ranking or the placement of the phrase from a previous instance of producing output 610 by the relevance and trending engine. In the output, the relevance and trending engine may identify a change in the ranking or the placement of the phrase during a predetermined time period. The relevance and trending engine may determine a percentage or degree change in the ranking or the placement of the phrase from a previous instance of producing output 540 by the relevance and trending engine. In the output, the relevance and trending engine may identify a percentage or degree change in the ranking or the placement of the phrase over a predetermined time period. In the output, the relevance and trending engine may identify a relevance score for each of the trending phrases. In the output, the relevance and trending engine may identify a relevance score and a trending indicator for each of the trending phrases for the user.

A content selector 620 may select or identify content to serve a user based on the output 610 from the trending and relevance engine 605. The content selector 620 may comprise an application, program, library, process, service, script, task or any type and form of executable instructions. The content selector may operate responsive to trending and relevance engine. The content selector may select content to server a user based on or using any information provided in any embodiments of the list of user relevant trending phrases 610. In some embodiments, the content selector 620 operates or executes on a system, server, or application in communication over a network to the trending and relevance engine. In some embodiments, the content selector may be embedded or included in a web page or other content served by the system, server or application. A content selector may identify from a plurality of content from one or more web-sites the user is visiting, the content that has highest trending phrases and is most relevant to user. Responsive to identifying such content, the system, server, or application may serve or provide the content to the user.

Referring now to FIG. 6A, an embodiment of a method for identifying trending or temporally popular phrases based on aggregating multiple users' interactions with an aggregate of content and that are relevant to a specific user is depicted. In brief overview, at step 655, the system receives identification of the user. At step 660, the system determines trending phrases for the user. At step 665, the system determines relevance score of content associated with or comprising the trending phrases. At step 670, the system identifies user relevant trending phrases. At step 675, content to serve the user is selected based on the user relevant trending phrases.

In further details, at step 655, the trending and relevance engine receives identification of a user via any type and form of user id. The trending and relevance engine may receive a request to provide a list of user relevant trending phrases for a user identified by the user identifier. In some embodiments, the trending and relevance engine receives the user id via a cookie. The trending and relevance engine may receive a user identifier or a request from any application, system or server. In some embodiments, a third party web site serving content may transmit the request and a user identifier to the trending and relevance engine. In some embodiments, an ad server serving advertisement or matching content to impression opportunities may transmit the request and/or a user identifier to the trending and relevance engine scorer. In some embodiments, a client application may transmit the request and/or a user identifier to the trending and relevance engine.

At step 660, the trending and relevance engine determines phrases that are trending based on the aggregate of multiple users' interactions with an aggregate of content and which are relevant, such based on a relevance score, to the user identified by the user id. The trending and relevance engine may determine trending phrases based on any embodiments of the systems and methods described in connection with FIGS. 5A and 5B. For example, the trending and relevance engine may determine which phrases are trending for the aggregate of users and compare those phrases with a click history or user profile of the user specified by the user id. The trending and relevance engine may perform or provide a relevance score for those matching phrases.

In another example, the trending and relevance engine may determine trending phrases for the user based on the number of instances of user action by the user with a digital resource associated with, related to or containing one or more phrases. The trending and relevance engine may determine trending phrases by the user based on the number of instances over a predetermined time period of user action by the user with a digital resource associated with, related to or containing one or more phrases. The trending and relevance engine, such as via the velocity engine, may determine trending phrases for the user based on a velocity of interaction by the user with digital resources, such as content, associated with, related to or containing the phrases. The trending and relevance engine, such as via the velocity engine, may determine trending phrases for the user based on a velocity of interaction by the user with content associated with, related to or containing the phrases. The trending and relevance engine may determine trending phrases for the user based on a velocity of user actions by the user with content associated with, related to or containing the phrases. The trending and relevance engine may determine trending phrases for the user based on a velocity of click actions by the user to content containing, related to or otherwise associated with the phrases.

At step 665, the trending and relevance engine determines for the user identified by the user id the relevance of the phrases from the trending phrases. In some embodiments, step 665 is performed in conjunction with, during or as part of step 660. For the content containing, related to or associated with the trending phrases, the trending and relevance engine determines a relevance score for the user for such phrases or content. In some embodiments, the trending and relevance engine determines a relevance score for phrases or content associated with phrases trending upwards for the user. In some embodiments, the trending and relevance engine determines a relevance score for phrases or content trending downwards for the user. In some embodiments, the trending and relevance engine determines a relevance score for phrases or content associated with phrases trending upwards and/or downwards for the user within a predetermined threshold. In some embodiments, the trending and relevance engine determines a relevance score for phrases or content associated with phrases trending upwards and/or downwards for the user within a predetermined time period.

In some embodiments, the trending and relevance engine determines a relevance score for phrases or content associated with phrases trending upwards and/or downwards for the user with or within a predetermined velocity. In some embodiments, the trending and relevance engine determines a relevance score for phrases or content associated with a top number of trending phrases.

At step 670, the trending and relevance engine generates or provides a list of user relevant trending phrases 610. The trending and relevance engine may generate or provide a list of user relevant trending phrases 610 responsive to steps 655, 660 and/or 665. The trending and relevance engine may enumerate the list of user relevant trending phrases 610 in ascending or descending order. The trending and relevance engine may enumerate the list of user relevant trending phrases 610 based on relevance. The trending and relevance engine may enumerate the list of user relevant trending phrases 610 based on trend velocity. The trending and relevance engine may enumerate the list of user relevant trending phrases 610 based on relevance and trend velocity. The trending and relevance engine may enumerate the list of user relevant trending phrases 610 based on a function of relevance and trend velocity. The trending and relevance engine communicates or provides a list of user relevant trending phrases 610 to a requestor, such as a user, application, server or system. The trending and relevance engine communicates or provides a list of user relevant trending phrases 610 to the content selector.

At 675, a content selector may select content to serve the user responsive to the trending and relevance engine. The content selector may select content from a plurality of possible content to serve the user based on the user relevant trending phrases. The content selector may select content from a plurality of possible content to serve the user based on the highest trending phrase in the user relevant trending phrases. The content selector may select content from a plurality of possible content to serve the user based on the most relevant phrase in the user relevant trending phrases. The content selector may select content from a plurality of possible content to serve the user based on the most relevant and highest trending phrase in the user relevant trending phrases. In some embodiments, the content selector provides a digital resource id and user id to the trending and relevance engine to determine what content to select and serve to the user.

G. Systems and Methods for Tracking Influence of a User on Content Shared Via Encoded Uniform Resource Locator (URL) Link Referring now to FIGS. 7A and 7B, systems and methods for tracking influence of a user on content shared via encoded URLs is depicted. Influence of a user, generally referred to as influence, may identify what level of engagement by other users does a particular user drive to content when the user shares content. For example, a high influencer may be a user who drives a high level of engagement with content when the user shares content. A low influencer may be a user who does not drives a high level of engagement, or otherwise drivers a low level of engagement with content when the user shares content. To measure or rate influence, embodiments of the systems and methods of the present solution may correlate who encoded a link, how important or how much traffic does the encoded link generate, who clicked on the encoded link and the topics or phrases associated with the links. From this correlation, these systems and methods may determine a ranking or rating of the influence of a user which may be stored in the user's profile. The influence rating of the user may be used by a relevance system to provide user weighting to relevance and trending scoring systems, such as any embodiments of such systems herein.

Figure 7A:
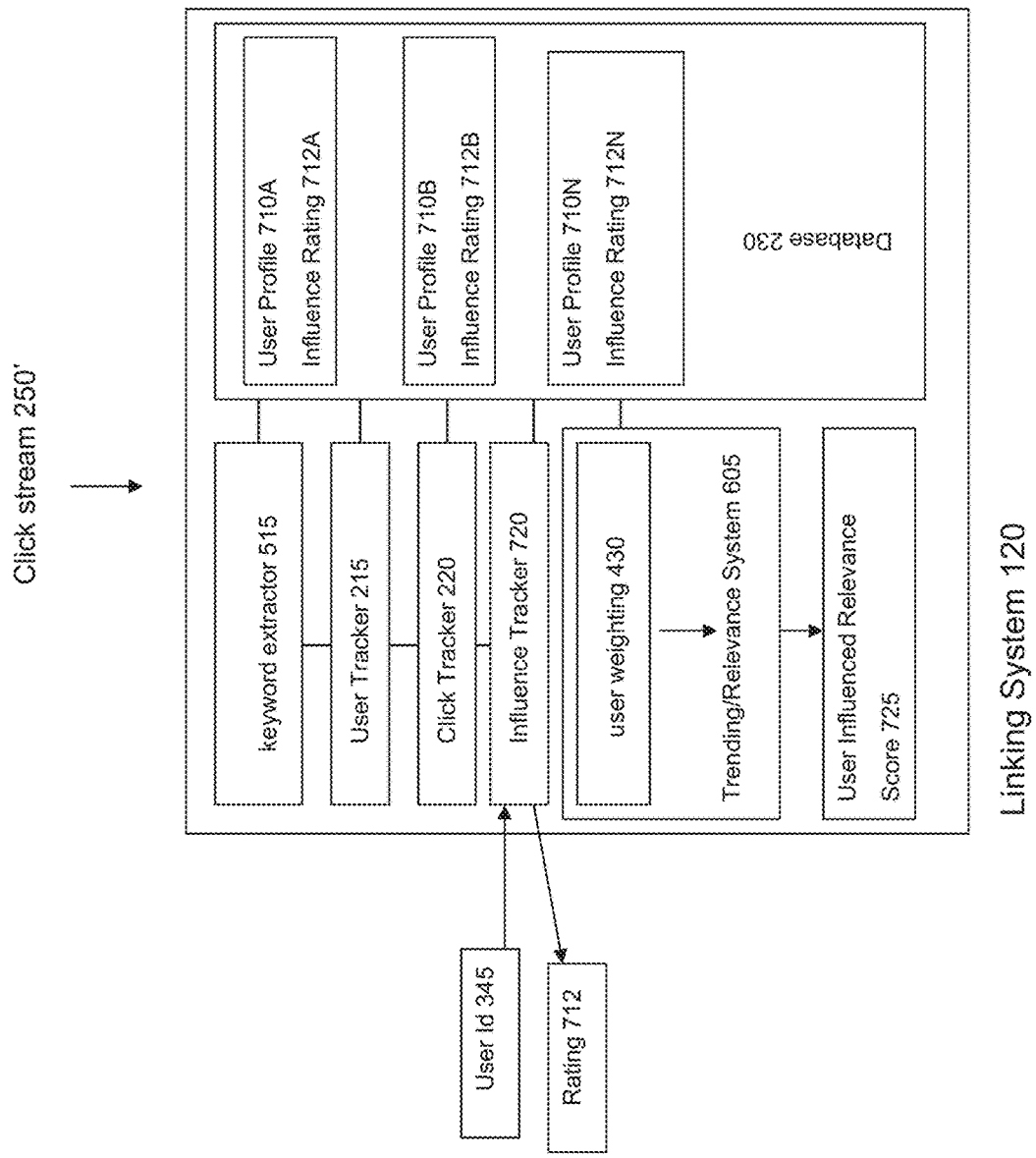
FIG. 7A is a block diagram of an embodiment of a system for tracking influence of a user on content shared via encoded uniform resource locator (URL) links.

Referring now to FIG. 7A, a system for tracking influence of a user is depicted. In brief overview, the system may include a keyword extractor 515, user tracker 215 and click tracker 220 as previously described herein. The system may include an influence tracker 720 that correlates information from the keyword extractor 515, user tracker 215 and click tracker 220 to determine an influence rating 712A-712N (generally referred to as influence rating 712) for each of a plurality of users, which may be stored in the user's profile 710A-710N (generally referred to as user profile 710). Based on the influence rating of a user, a relevance system 605 may provide user weighting 430 to a relevance score to up weight or down weight the score to result in a user influence relevance score 725. A user's influence rating 712 may be queried or obtained by request using a user identifier 345.

The trending and relevance system 605 may comprise any embodiments of the trending and relevance system 605 described herein. In some embodiments, the trending and relevance system 605 comprises the trending system 405. In some embodiments, the trending and relevance system 605 comprises the trending system 505. In some embodiments, the trending and relevance system 605 comprises the relevance system 300. In some embodiments, the trending and relevance system 605 comprises the relevance system 300. In some embodiments, the trending and relevance system 605 comprises the relevance system 405. Any of these embodiments may be referred to as a relevance based system.

Each of the keyword extractor 515, user tracker 215 and click tracker 220 may comprise any embodiments of keyword extractor 515, user tracker 215 and click tracker 220 described herein. The keyword extractor, user tracker and click tracker may be designed and constructed to interface to, communicate with or integrate to the influence tracker. The influence tracker may be designed and constructed to interface to, communicate with or integrate to keyword extractor, user tracker and/or click tracker. The keyword extractor, user tracker and click tracker may be designed and constructed to work in cooperation or in conjunction with the influence tracker. In some embodiments, the keyword extractor, user tracker, click tracker and influence tracker 720 are combined or constructed into a single application, component, module or system. Any of the above embodiments may be generally referred to as an influence system or the influence tracker 720.

In further details, the influence tracker 720 may comprise an application, program, library, process, service, script, task or any type and form of executable instructions. The influence tracker may comprise functions, operations and logic to determine the influence of a user based on information tracked by the linking system relative to, associated with or in connection with a specific user. In some embodiments, the influence tracker may operate responsive to the link encoder and/or link decoder. In some embodiments, the influence tracker may operate responsive to the user tracker. In some embodiments, the influence tracker may operate responsive to the click tracker and/or click analyzer 235.

The influence tracker may identify, track and correlate information on what links the user encoded, the traffic generated by the user's encoded links, who clicked on the user's encoded links and topics or phrases associated with the content from the user's encoded links. In some embodiments, the influence tracker identifies and tracks the URLs encoded by a user. In some embodiments, the influence tracker identifies and tracks the number of URLs encoded by a user, such as via the link encoder and user tracker. In some embodiments, the influence tracker identifies and tracks the content from the URL encoded by the user. In some embodiments, the influence tracker identifies and tracks keywords and/or phrases of the content from the URL encoded by the user. In some embodiments, the influence tracker identifies and tracks topics or subject matter of the content from the URL encoded by the user. In some embodiments, the influence tracker identifies and tracks trending phrases of the content from the URL encoded by the user. In some embodiments, the influence tracker identifies and tracks the number of clicks and/or number of other users who clicked on the encoded URL encoded by the user. In some embodiments, the influence tracker identifies and tracks the sources or sites from which of other users clicked on the encoded URL encoded by the user.

The influence tracker may store any of the identified and tracked information associated with the user to a user profile 710. The user profile may comprise a data structure, data object, file or one or more tables, such as data, objects or tables stored in a database. The user profile may store an aggregation of the information identified and tracked by the influence tracker. The user profile may store any statistics or metrics of the information identified and tracked by the influence tracker. The user profile may store a history of any the information identified and tracked by the influence tracker. The user profile may store influence rating of the user. The user profile may store a history of influence ratings of the user, such as changes and updated to the influence rating of the user.

The influence tracker may process, analyze and correlate any of the information tracked by the system of the user, such as any information tracked via the above described embodiments or stored in the user profile, to determine, generate or otherwise provide an influence rating or score 712 for the user. The influence rating or score of a user identifies a level of engagement by other users that a particular user drives or causes when sharing content (e.g. how much influence as user has for others to interact or engage with content when the user shares content). An influential user is someone who drives or causes a higher or high level of engagement or interaction with content when the user shares content such as via forwarding or distributing encoded links. The influence rating may identify a number of clicks from other users that a particular user drives when sharing content. In some embodiments, the influence tracker generates the influence rating 712 based on applying a function or algorithm to any combination of number of encoded URLs encoded by the user, how much traffic (e.g., number of clicks) generated by encoded URLs encoded by the user, who clicked on the encoded URLs encoded by the user and the topics associated with the encoded URLs encoded by the user. In some embodiments, the influence tracker in generating or computing the influence rating may weight any of the components or factors making up the influence rating in any manner. In some embodiments, the influence tracker uses a time decay function 435 to modify, change or affect the influence rating based on temporal information related to user and any of the components or factors making up the influence rating.

For example, in some embodiments, the influence tracker may compute the influence rating as function of a number of URLs encoded by the user and the number of clicks on the encoded URLs encoded by the user. In another example, the influence tracker may compute the influence rating as function of a number of URLs encoded by the user and/or the number of clicks on the encoded URLs encoded by the user and the influence rating of users who clicked on the encoded URL of the user. In another example, the influence tracker may compute the influence rating as function of a number of URLs encoded by the user and/or the number of clicks on the encoded URLs encoded by the user and the popularity or ranking of the web-sites from which users clicked on the encoded URL of the user. In another example, the influence tracker may compute the influence rating as function of a number of URLs encoded by the user and/or the number of clicks on the encoded URLs encoded by the user and the popularity or ranking of the phrases, keywords or topics of the content from or associated with the encoded URL of the user. In another example, the influence tracker may compute the influence rating as function of a number of URLs encoded by the user and/or the number of clicks on the encoded URLs encoded by the user and the trending of phrases, keywords or topics of the content from or associated with the encoded URL of the user. In another example, the influence tracker may compute the influence rating as a function of a relevance score for content of encoded URLs of the user. In another example, the influence tracker may compute the influence rating as a function of an engagement score and/or distribution score for content of encoded URLs of the user. In another example, the influence tracker may compute the influence rating as a function of geography of the user and/or the users clicking on the user's encoded URL.

In another example, the influence tracker may compute the influence rating as a function of any combination of a relevance score, engagement score, distribution score, social score, geography, search relevance score, a number of URLs encoded by the user and/or the number of clicks on the encoded URLs encoded by the user, popularity or ranking of web-sites from which users clicked the encoded URL of the user, popularity or ranking of the phrases, keywords or topics of the content from or associated with the encoded URL of the user and/or the trending of phrases, keywords or topics of the content from or associated with the encoded URL of the user The influence rating 712 may comprise a value that provides an indication of or otherwise identifies how influential a user, such as the influence of a user when sharing encoded URLs. The influence rating may be generated for or on an absolute or relative scale. The influence rating may be generated for or normalized to a predetermined influence rating range, such as for example −100 to 100, 0 to 100 or X to Y. The influence tracker may store the influence rating to the user's profile. The influence tracker may update the influence rating in the user's profile.

As click streams are received over time by the system 120, the influence tracker may regenerate, re-compute or re-determine the influence rating of a user. In some embodiments, the influence tracker determines the influence rating dynamically in real-time. As a click stream is received that impacts or affects the user's influence, the influence tracker may update the user's profile with tracked information and regenerate the user's influence rating. In some embodiments, the influence tracker determines the influence rating on a predetermined basis, such as once a day at a certain time. In some embodiments, the influence tracker determines the influence rating on an adhoc or on-demand basis, such as responsive to a request for the user's influence rating. In some the influence tracker determines the influence rating on an event basis, such as when the user encodes a URL or the system receives a user action from a click of the encoded URL encoded by the particular user.

The influence rating 712 and/or user profile may provide for or impact the user weighting 430 applied during any trending and/or relevance scoring system 605 described herein. In some embodiments, the influence rating is the user weighting. In some embodiments, the user weighting is a function of the influence rating. In some embodiments, the system 605 may convert the influence rating using any type and form of scaling or conversion factor to the user weighting 430. In some embodiments, the system 605 queries the influence tracker for the influence rating of a user identified by the user id 345. In some embodiments, the system 120 uses the influence rating 712 to up weight or down weight any relevance score and/or trending indicator. In some embodiments, the system 120 uses information in user profile(s) to up weight or down weight any relevance score and/or trending indicator.

Based on applying the influence rating and/or user weighting and/or the user profile, the system 605 provides a user influenced relevance score 725. In some embodiments, the relevance scores 325 described in FIG. 3A may use the influence rating 712 and/or user weighting 430 to determine or generate a relevance score 330 that is a user influenced relevance score 725. In some embodiments, the user influenced relevance score may comprises the relevance score(s) for content in the relevance search results 450 as described in FIG. 4A with the user weighting 430 based on the influence rating 712 of a specified user. In some embodiments, the trending/ranked phrases 540 described in FIG. 5A may use the influence rating 712 and/or user weighting 430 to determine or generate a user influenced relevance score 725 for such trending/ranked phrases. In some embodiments, the relevant trending phrases 610 described in FIG. 6A may use the influence rating 712 and/or user weighting 430 to determine or generate a user influenced relevance score 725 for such relevant trending phrases 610.

Figure 7B:
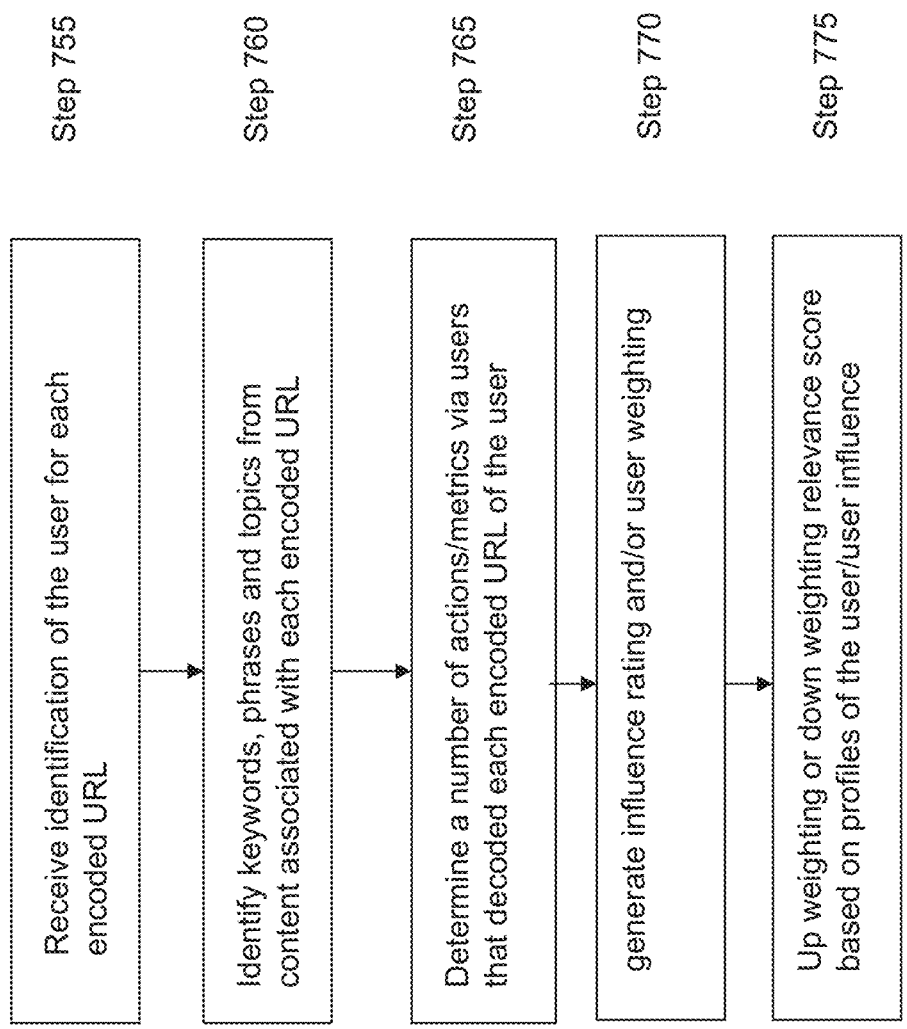
FIG. 7B is a flow diagram of an embodiment of a method for tracking influence of a user on content shared via encoded uniform resource locator (URL) links.

Referring now to FIG. 7B, a method for tracking influence of a user is depicted. In brief overview of the method at step 755, the system receives identification of the user for each encoded URL. At step 760, the system identifies keywords, phrases and topics from content associated with each encoded URL. At step 765, the system determines a number actions and other metrics via user uses the decoded each encoded URL of the user. At step 770, the system generates an influence rating and/or user weighting. At step 775, the system may up weight or down weight a relevance score based on a profile of the user, such as the user's influence rating.

In further details, at step 755, the system identifies the user encoding the URL. In some embodiments, the system identifies the user via a user id 345. In some embodiments, the system identifies the user via an account or login of the linking system 120. In some embodiments, the system identifies the user via a cookie 255. The system such as via the link encoder and user tracker may track each instance of the user encoding a link and store that information to the database 230 and/or to the user's profile 710. The system may track when the user encoded the link, what link was encoded and identification of the encoded link and store this information to the user's user profile.

At step 760, the system may identify keywords, phrases and/or topics from the content associated with, identified by or included in the URL or link encoded by the user. Each time the user encoded a link/URL, the system may identify keywords, phrases and topics for the encoded URL using any embodiments of the content extractor 315 and/or keyword extractor 515 described herein. In some embodiments, the content extractor 315 and/or keyword extractor may identify keywords, phrases and topics for content of or associated with the encoded URL. In some embodiments, the content extractor 315 and/or keyword extractor may identify keywords, phrases and topics upon the request to encode the URL or upon encoding the URL. The system may track when the keywords, phrases and/or topics of content of or from URLs that the user requests to encode and stores this information to the user user's user profile. The system may store this information in correlation with or association with the when the user encoded the link, what link was encoded and identification of the encoded link stored as part of step 760.

At step 765, the system may receive a plurality of click streams that identify user actions 250 with the encoded URL encoded by the user. The system, such as via the click tracker, may identify in the click streams requests to decode the encoded URL encoded by the user. The system, such as via the link decoder, may identify and track each time the encoded URL of the user is decoded. The system, such as via the click tracker, may identify the source of the user action to decode the encoded URL. For example, the system may identify the source IP address of the network traffic carrying the user action to decode the encoded URL. The system may identify the web-site, such as the social networking site, from which the network traffic carrying the user action to decode the encoded URL originated. The system may identify the web-site, such as the social networking site, from which user clicked on the encoded URL. The system may track the number of times the encoded URL of the user has been clicked. The system may track the number of different users that have clicked the encoded URL of the user. The system may track the number of different sources (e.g., web-sites) from which the encoded URL of the user was clicked. The system may track the number of different geographic locations from which the encoded URL of the user was clicked. The system may compute any metrics on the information such as averages, peaks, trends, minimums, maximums, etc. The system may store any of the identified or tracked information and any metrics thereof in the user's user profile. The system may store any of the identified or tracked information and any metrics thereof in the user's user profile in correlation with or association with any of the information stored in the user's user profile via steps 760 and/or 765.

At step 770, the influence tracker may determine, generate or otherwise provide an influence rating for the user based on the information identified and tracked via steps 755, 760 and/or 765. The influence tracker may use the information stored in the user's profile to generate the influence rating. The influence tracker may receive the information from any one or more of the keyword extractor, click tracker and user tracker to generate the influence rating. The influence tracker may generate the influence rating for the user as each click stream for an encoded URL of the user is received and analyzed. The influence tracker may generate the influence rating for any one or more users on a predetermined frequency, such as once per day. The influence tracker may generate the influence rating for a user on a per demand basis, such as upon receiving a request for the influence rating of a user specified by a user id. The influence tracker may store the generated influence rating in the user's user profile and update the influenced rating each time the influence tracker regenerates the influence rating.

At step 775, the influence rating of the user may influence or affect any relevance scores generated by any embodiments of the systems described herein. In some embodiments, a relevance based system queries the influence tracker to determine the influence rating of a user, such as via a request and response mechanism. In some embodiments, a relevance based system queries the user profile of a user to determine the influence rating of the user. In some embodiments, the relevance based system uses or applies the influence rating as a user weighting in determining a relevance score. In some embodiments, the relevance based system coverts or transforms the influence rating to a user weighting in determining a relevance score. In some embodiments, the relevance based system uses the influence rating to up weight or down weight a relevance score.

H. Systems and Methods for Providing a Recommended List of URLs Responsive to a URL Referring now to FIGS. 8A and 8B, systems and methods of embodiments of the present solution for providing a recommendation list of URLs or links given an input or URL link is depicted. Given an input of a link or URL (e.g., an input link), the present solution may provide an output of a list of recommended content in ranked order. In some embodiments, the present solution performs these systems and methods without any personal or other information about the user—the only input is a URL and the output is a list of URLs and in some embodiments, also a matching or recommendation score. The present solution maintains a click co-occurrence map, sometimes also referred to as click coherency map, to correlate all the users that clicked on the input link to the other links which have been clicked on by the users who also clicked on the input link. The click co-occurrence map may identify the largest number of those other links to which the users clicked and also clicked on the input link. The output may be filtered to be domain or content-site specific. In other embodiments, raw or unfiltered output may be useful to aggregators who may provide recommended content from a wider set of content resources.

Figure 8A:
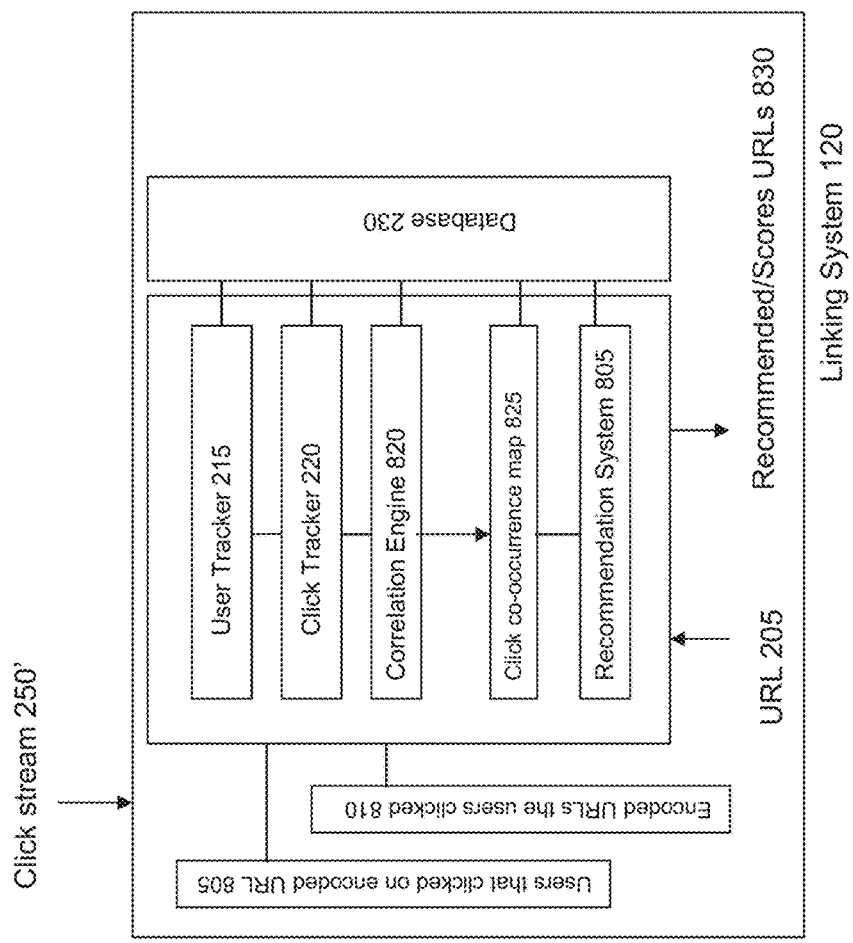
FIG. 8A is a block diagram of an embodiment of a system for providing a recommended list of uniform resource locators (URLs) responsive to a uniform resource locator (URL)

Referring now to FIG. 8A, an embodiment of a system for providing a recommendation list of URLs or links given an input or URL link is depicted. In brief overview, the system may include a user tracker 215, click tracker 220 and recommendation system 805. The system may also include a correlation engine 820 that maintains a click co-occurrence map 825 from click streams 250. The correlation engine may correlate via the click co-occurrence map users that clicked on an encoded URL 805 to other encoded URLS those users clicked on 810. The user tracker 215 may identify those who users clicked on the encoded URL 805 and who also clicked on other encoded URLs. The click tracker may identify the number of clicks on the encoded URL 805 and for each of the other encoded URLs the users clicked. The correlation engine may store the click co-occurrence map into a database 230. The recommendation system 805 may receive a URL 205 as input and output a set of URLs based on the click co-occurrence map 825.

The user tracker may comprise any embodiments of the user tracker 215 previously described herein. For any click stream 250' received by the system 120, the user tracker may identify the user who encoded the encoded URL and each of the other users who clicked on the encoded URL of the user. The click tracker may comprise any embodiments of the user tracker 215 previously described herein. For any click stream 250' received by the system 120, the user tracker may identify the number of users who encoded the same URL. For any click stream 250' received by the system 120, the click tracker may identify the number of users who clicked on the encoded URL of a user. The click tracker may identify for each user the number of encoded URLs that user clicked.

Via the user tracker and/or click tracker, the system identifies and tracks the users that clicked on an encoded URL 805. For each user tracked or managed by the system, the system may identify the other encoded URLs 810 that the same users who clicked the encoded URL 805 also clicked. The encoded URL 805 and the other encoded URLs 810 may be encoded URLs of any user. The encoded URL 805 and the other encoded URLs 810 may be encoded URLs of the system. The encoded URL 805 and the other encoded URLs 810 may identify or be associated with any content from any source. For each encoded URL 805, 810 tracked or managed by the system, the system may identify each of the users the clicked on each encoded URL. The system may identify each user via one or cookies. The system may identify each user via information sent with requests to decode the encoded URL. The system may identify each user via the user's account information for the system. In some embodiments, the system tracks the user id of the user who clicked on the encoded URL without tracking other user information. In some embodiments, the system may identify the source (e.g., web-site, social networking site, device, etc) from which the user clicked on the encoded URL, the time and/or geography from which the user clicked on the encoded URL. The system, such as via user tracker and click tracker, may store the users and number of clicks for the encoded URLs 805, 810 to the database 230.

The correlation engine 820 may comprise an application, program, library, service, script, process, task or any type and form of executable instructions executing or executable on a device. The correlation engine may comprise logic, function or operations to correlate any URL to a plurality of other URLs. The correlation engine may comprise logic, function or operations to correlate an encoded URL to a plurality of other encoded URLs. The correlation engine may comprise logic, function or operations to correlate the users the clicked on encoded URLs 805 to the encoded URLs 810 that the same users also clicked. The correlation engine may correlate URLs/encoded URLs to other URLs/encoded URLs based on the number of clicks. In some embodiments, the correlation engine may correlate URLs/encoded URLs to other URLs/encoded URL also based on the source of the clicks, the time of the clicks and/or the influence of the users or who performed the clicks.

The correlation engine 820 may be designed and constructed to generate and/or maintain a click co-occurrence map 825, sometimes referred to as a map. The click co-occurrence map may comprise any type and form of data structure, object, file, table(s) and/or arrangement of data stored in a database. The click co-occurrence map may identify or specify the correlation between URLs/encoded URLs to other URLs/encoded URLs. The click co-occurrence map may identify or specify the encoded URLs 810 for which the users who clicked on the encoded URL 805 also clicked. For each encoded URL 810, the click co-occurrence map may identify or track the number of such users who clicked both the encoded URL 805 and each encoded URL 810. For each of the other encoded URLs, the correlation engine may correlate the users and numbers of clicks on these encoded URLS and further encoded URLs those same users also clicked. In some embodiments, the correlation engine may maintain a click co-occurrence map for a plurality of depths or levels.

In some embodiments, a click co-occurrence map comprises a table, or any programmatic representation thereof, that identifies along one axis, such as the vertical axis, a list of the content the tracked users interacted with and along another axis, such as horizontal axis, each user. The table may identify or indicate for each user in the horizontal axis which content in the list of content in the vertical axis that the user has interacted with (e.g. clicked on). From such a table, the system can identify users who have interacted with the same content (e.g., similar interests). The system can also identify for users with similar interests what content one user may have interacted with or have interest in that the other user has not yet seen or interacted with. By the system performing comparison of similarities and differences between users in the map, the system may make recommendations of content for a particular user.

For each encoded URL 810, the click co-occurrence map may use any number of thresholds to determine whether or not the other encoded URLs has been clicked enough times or by enough users to be put or maintained within the map. For each encoded URL 810, the click co-occurrence map may use any temporal thresholds to determine whether or not the other encoded URLs 810 are put or maintained within the map. For each encoded URL 810, the click co-occurrence map may use any user influence or user weighting to determine whether or not the other encoded URLs 810 are put or maintained within the map. For each encoded URL 810, the click co-occurrence map may use any content relevancy score to determine whether or not the other encoded URLs 810 are put or maintained within the map. For each encoded URL 810, the click co-occurrence map may use any trending score to determine whether or not the other encoded URLs 810 are put or maintained within the map.

The correlation engine may generate and/or maintain a plurality of click co-occurrence maps. The correlation engine may generate and/or maintain a click co-occurrence map corresponding to each encoded URL 805. The correlation engine may generate and/or maintain a click co-occurrence map for a set of encoded URLs 805. The index to a click co-occurrence map may be an URL or encoded URL. The correlation engine may generate and/or maintain a single click co-occurrence map for all the encoded URLs.

The recommendation system 805 may comprise an application, program, library, service, script, process, task or any type and form of executable instructions executing or executable on a device. The recommendation engine may comprise logic, function or operations to provide a recommendation of one of more other URLs given a URL as input. The recommendation engine may comprise logic, function or operations to analyze the click co-occurrence map to determine similarities and/or difference between users in what content users have interacted with or co-clicked and what content users may not have not co-clicked. The recommendation system 805 may comprise any embodiments of the relevance system 405 described herein. The recommendation system may be designed and constructed to receive a URL 205 as input and to produce a set of one or more URLS 820 as output, such as based on the click co-occurrence map.

For any output URL, the recommendation system may provide a score, such as a recommendation or matching score, based on the level of matching via the co-occurrence map. The score may indicate or identify the number of click co-occurrences for the URL in the click co-occurrence map. The recommendation score may indicate the number of other users with similar click history or behavior who also clicked on the recommended output URL. In some embodiments, the recommendation score may be an order or ranking of the URL in the list of recommended URLs. In some embodiments, the score may be a relevance score if a user is specified with the URL input.

The recommendation system may comprise any type and form of interface to receive a URL 205, such as a graphical user, command line interface or programmatic interface. In some embodiments, the programmatic interface of the relevance system 405 may comprise an API, web-service or request/response mechanism. In some embodiments, the recommendation system may receive a plurality of URLs in a single request. In some embodiments, the recommendation system may receive an encoded URL and decodes the encoded URL.

The recommendation system, such as a responsive to receipt of a URL 205, may be designed and constructed to read, process or query a click co-occurrence map for or corresponding to the URL. The recommendation system may obtain or retrieve via the database a corresponding click co-occurrence map, such as by using the input URL as an index for retrieval. Via the click co-occurrence map, the recommendation system may identify or query the URLs that are mapped to the input URL. The recommendation system may output the set of mapped URLs 830 via any the interface, such as displaying via a graphical user interface, output via a command line interface or via a response of a programmatic interface. The recommendation system may rank the mapped URLs by the number of clicks on the mapped URLs. The recommendation system may output an enumeration of URLs 830 by ranking.

The recommendation system may filter any of the ranked or unranked URLs 830 based on a number of clicks threshold. The recommendation system may filter any of the ranked or unranked URLs 830 based on domain filtering. The recommendation system may filter any of the ranked or unranked URLs 830 using content based or content specific filtering. In some embodiments, if a user is also specified with the URL input, the recommendation system may also provide a relevance score for each of the URLs 830 by using any of the relevance scoring systems, methods and techniques previously described herein.

Figure 8B:
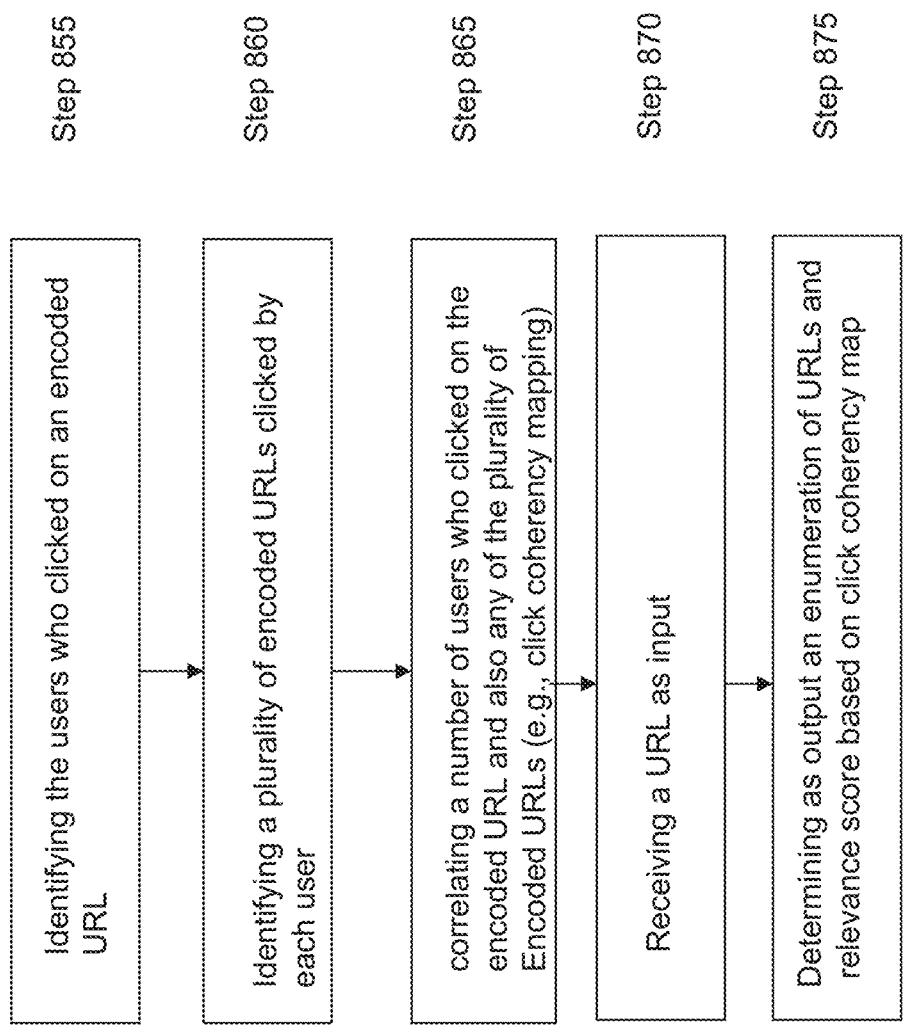
FIG. 8B is a flow diagram of an embodiment of a method for providing a recommended list of uniform resource locators (URLs) responsive to a uniform resource locator (URL)

Referring now to FIG. 8B, an embodiment of a method for providing a recommendation list of URLs or links given an input or URL link is depicted. In brief overview, at step 855, the system, such as any embodiments of linking system 120, identifies the users who clicked on an encoded URL. At step 860, the system identifies the plurality of other encoded URLs those users clicked on. At step 865, the system generates a click co-occurrence map, such as to correlate the encoded URL of step 855 to the plurality of other encoded URLs clicked by each user at step 860 who also clicked the encoded URL. At step 870, the system received a URL as input and at step 875, as output, the system provides an enumeration of recommended URLs based on a click co-occurrence map. In some embodiments, the output may also include a ranking and/or recommendation score.

At step 855, the system identifies each of the users who clicked on an encoded URL 805, requested to decode an encoded URL 805 or otherwise interacted with the encoded URL or corresponding URL. For each click stream and/or decoding of the encoded URL, the system may track for each encoded URL the users who clicked on the encoded URL. The system may identify each user via a user id 345. In some embodiments, the system identifies the user via an account or login of the linking system 120. In some embodiments, the system identifies the user via a cookie 255. The system such as via the link encoder and user tracker may track each instance of the user decoding an encoded link and store that information to the database 230 and/or to the user's profile 710. The system may track when the user decoded the link, what encoded link was decoded and identification of the link and store this information to the database, such as in the user's user profile.

At step 860, for each of the users identified as clicking on the encoded URL 805, the system identifies the other encoded URLs 810 those users also clicked or have clicked. The system via user tracker and click tracker may store in the database a history of encoded URLs each of the users have previously clicked on. The system may also continue to track, such as in real-time, the encoded URLs each of the users are clicking on. For each click stream and/or decoding of an encoded URL, the system may track by user the encoded URLs that user has clicked on. The system may track and store in the user's user profile any information identifying the encoded URLs/URLs that user has clicked on or otherwise interacted with.

At step 865, the system correlates the user and click tracking information, such as the user and click information obtained via steps 855 and 860 to generate and/or maintain one or more click co-occurrence maps. For each encoded URL 805 and for each of the users that clicked on or interacted with each encoded URL 805, the system may identify the other encoded URLs 810 that user also clicked on or interacted with. For each encoded URL 810, the click co-occurrence map may identify or track the number of such users who clicked both the encoded URL 805 and each encoded URL 810. The system may maintain a click co-occurrence map to correlate each encoded URL/URL 805 to the other encoded URLs/URLs 810. The system may maintain a separate click co-occurrence map for each encoded URL/URL. The system may maintain a click co-occurrence map for all encoded URL/URLs that is indexed by or organized by encoded URL. The system may update the click co-occurrence map upon processing each click stream. The system may update the click co-occurrence map upon decoding each encoded URL.

At step 870, the system receives an input identifying or comprising a URL. The system may receive the input via a request. The system may receive the URL as input via a graphical user interface. The system may receive the URL as input via a command line interface. The system may receive the URL as input via a programmatic interface. For example, the system may receive the URL as input via an API call, such as a web service call. The system may receive the URL as input via an HTTP request. The system may receive the URL as input from any component of the linking system 120. The system may receive the URL as input from any third party system, including applications, servers and systems. The system may receive the URL as input from a web page, script or other executable instructions executing on a web page or web server. The system may receive the URL as input from any type and form of mobile application executing on a mobile device, such as a smart phone.

The system may also receive with the URL input or otherwise associated with a request, any one or more parameters for filtering the output. These parameters may include geography information. These parameters may include language information or identification. These parameters may include identification or specification of domain filters and/or content filters. These parameters may include identification or specification of any thresholds, such as number of recommended URLs. These parameters may include identification or specification of a ranking or ordering of the output. These parameters may include identification or specification of providing or generating a score for the URLs in output, such as using any of the relevance scoring techniques described herein.

At step 875, the system provides as output 830 one or more URLs. The system may provide the output responsive to receipt of the URL 805 as input. The system may use the input URL to retrieve, lookup, query or obtain a click co-occurrence map, such as from database 230, for or corresponding to the input URL. Via the click co-occurrence map, the system may identify a plurality of encoded URLs clicked on by users who also clicked on the input URL. Via the click co-occurrence map, the system may determine a plurality of encoded URLs clicked on by the largest number of users who also clicked on the input URL. The system may provide the output 830 via a graphical user interface or command line interface. The system may provide the output 830 as a response to a request, such as an HTTP response to an HTTP request. The system may provide the output 830 as a response or data structure to an API call. The system may provide the output as an enumerated list of URLs. The system may provide the output as an enumerated list of URLs ranked in order based on number of user interactions/clicked and/or relevance.

The system may apply any filtering, such as domain or content filtering, based on any filtering parameters specified via the input or request. For example, the system may exclude URLs from the output that match or correspond to a domain. In another example, the system may exclude URLs from the output that link to or comprise content corresponding to or having keywords corresponding to specified content. The system may apply any threshold based on any threshold parameters specified via the input or request. For example, the system may provide as output a top 10 ranking of URLs. In another example, the system may provide an output of URLs that had at least a predetermined number of clicks (e.g., 100, 1000, etc). As may be requested via the input or the request or otherwise as a default, the system may determine or provide a score with each URL 830 in the output. The system may give each URL in the output a score based on the level or degree of matching or recommendation from analysis of the click co-occurrence map. If a user is specified with the input URL, the system may give each URL in the output a score based on any of the relevance scoring techniques described herein.

I. Systems and Methods for Monitoring Online Activity via Cookies of a Linking System Referring now to FIGS. 9A and 9B, systems and methods of monitoring online activities of users via cookies of a linking system is depicted. A linking system configured to generate links to content can generate and transmit cookies to client devices responsive to receiving interactions (e.g., clicks) from the client devices. The first time a client device requests access to content via a link generated by the linking system, the linking system can provide a response to the request that includes a cookie generated specifically for the client device from which the request was received. The cookie is stored on the client device, for instance, in a folder accessible by the browser of the client device. Each time a subsequent request to access content via a link of the linking system is received from the client device, the request will include the cookie. Each time the linking system receives the cookie, the linking system updates the cookie to include information corresponding to the request. For instance, the linking system can update the cookie to include a source URL from which the request was received and a destination URL identifying the URL of the content linked to the link. By updating the cookie each time the client device requests to access content via a link of the linking system, the cookie can maintain a history of source resources (e.g., URLs) from which requests to access content by the client device have been received by the linking system as well as destination resources (e.g., URLs) that include the content to which the client device requested access.

Stated in another way, the present solution involves a linking system that utilizes a cookie to track or monitor the online activity of a client device via interactions (e.g., clicks) on links encoded by the linking system. The encoded links are displayed on source resources (e.g., source URLs) and linked to destination resources (e.g. destination URLs). The cookie may allow a linking system to integrate, for the cookie, all interactions (e.g., clicks) on links encoded by the linking system performed via the client device. With this configuration, the linking system may collect, via a cookie of the linking system that is assigned to a client device of a user, browsing activity across resources of various domains and determine, from the collected user activity, all of the resources accessed by the client device. The linking system can then use the data collected for each client device (or browser of a client device) assigned a cookie to better understand relationships between different resources based on the browsing activities of various client devices.

According to some aspects, an online activity monitoring system, such as the linking system, can receive a first request from a browser of a client device to access a first destination URL via a link encoded by the linking system that was provided for display on a first source URL. The online activity monitoring system can generate a cookie for the client device and update the cookie to include data identifying the first source URL and the first destination URL. The online activity monitoring system can then provide the cookie to the browser of the client device. The online activity monitoring system may receive a second request from the browser of the client device to access a second destination URL via a second link encoded by the linking system that was provided for display on a second source URL. The second request from the browser can include the cookie previously provided by the online activity monitoring system. The online activity monitoring system can update the cookie to include data identifying the second source URL and the second destination URL such that the cookie has information on the first source URL, the second source URL, the first destination URL and the second destination URL. Each of the URLs can correspond to the same or different domains. The online activity monitoring system can then provide the updated cookie to the client device. The online activity monitoring system can provide the updated cookie within a response to the request. As the client device requests to access additional content via links encoded by the linking system, the cookie assigned to the client device is updated such that the cookie includes data identifying a plurality of resources visited by the client device.

Figure 9A:
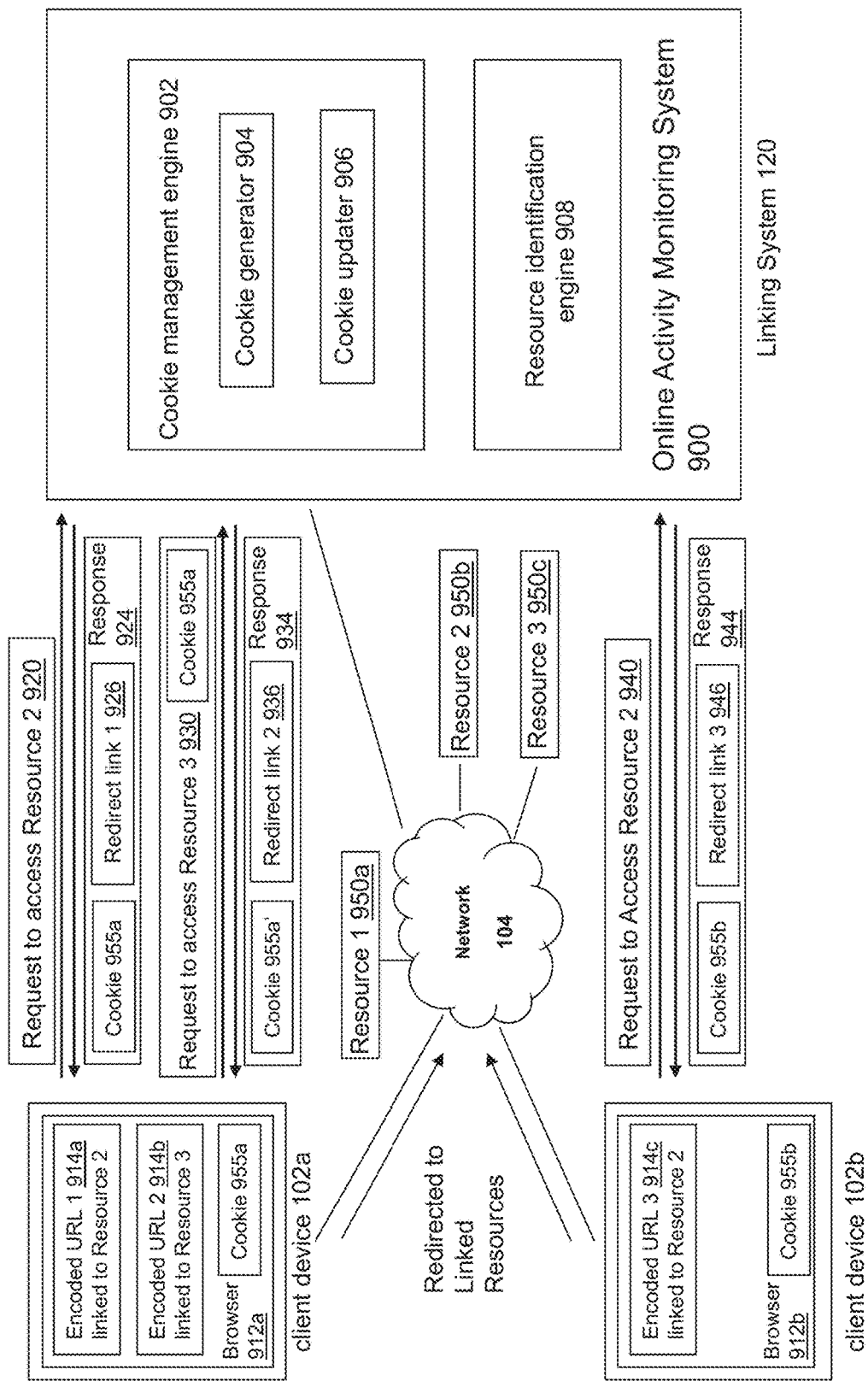
FIG. 9A is a diagram of an embodiment of a system to monitor online activities of users via cookies of a linking system.

Referring now to FIG. 9A, an embodiment of an online activity monitoring system 900 for monitoring online activities of client devices via cookies is depicted. In brief overview, the online activity monitoring system 900 can be a part of the linking system 120 or may include components and functionality of the linking system 120, as shown in FIGS. 2A-8A. The online activity monitoring system 900 may include a cookie management engine 902 and a resource identification engine 908. The online activity monitoring system 900 may be included in a linking system 120 and may execute on one or more server(s) 106A-N (see FIG. 2). The cookie management engine 902 may include a cookie generator 904 that generates a cookie (e.g., an HTTP cookie) responsive to a request to access a resource from a browser of a client device through the network 104. In some embodiments, the request can be generated responsive to an action taken on an encoded link generated by the linking system 120 that is included within a resource, such as the first resource 950a and provided for display on the client device. The encoded link can be linked to another resource, such as the second resource 950b. The cookie management engine 902 also includes a cookie updater 906 that updates the same cookie responsive to a subsequent request to access a resource by the same browser of the client device.

The online activity monitoring system 900 may provide the generated or updated cookie to the browser of the client device via the network 104. Here, the client device 102a and 102b may be either local machines, client nodes, client machines, client computers, endpoints, or endpoint nodes in communication with one or more servers 106a-106n via one or more networks 104 (see also FIG. 1A). In some embodiments, the client device 102a and 102b may have the capacity to function as both a client node seeking access to resources provided by a server and as a server providing access to hosted resources for other clients 102a-102n (see also FIG. 1A). Also, the linking system 120 may be configured to shorten, share and track links, and execute on one or more server(s) 106A-N and may be accessed by a plurality of clients 102a-102n via the network 104 (see also FIG. 2).

For example, referring to FIG. 9A, the linking system 120 can generate a first encoded URL 914a linked to a second resource 950b. The linking system 120 can also generate a second encoded URL 914b linked to a third resource 950. The linking system 120 can further generate a third encoded URL 914c linked to the second resource 950b. In some embodiments, the encoded URLs can be included in source resources by content publishers so they can monitor performance or behaviors of users by integrating the users' interactions with the encoded URLs via cookies. In some implementations, the linking system 120 can receive a request to generate an encoded link for a particular resource. The request can be initiated at a device of a client or a content publisher. In some implementations, the request can include a URL of the particular resource for which the encoded link is to be generated. The encoded link, as described herein, when clicked or otherwise interacted on at a client device, can cause the client device to send a request to the linking system 120, which in turn, will send back a response to redirect the client device to the particular resource.

For example, a first resource 950a can include a first encoded URL 914a that is generated by the linking system 120 and that is linked to a second resource 950b. Responsive to an action taken on the first encoded URL 914a, the client device 102a may generate and transmit a request 920 to the online activity monitoring system 900 to access the second resource 950b. The online activity monitoring system 900 may receive the request 920 and responsive to receiving the request 920, the resource identification engine 908 may identify from the request 920, the identity of the first resource 950a and the second resource 950b.

The online activity monitoring system 900 can be configured to determine whether the request 920 includes a cookie of the linking system 120. In some implementations, the cookie generator 904 may determine whether the request 920 includes a cookie of the linking system 120. In some embodiments, the cookie generator 904 can generate a cookie 955a responsive to determining that the request 900 did not include a cookie of the linking system 120. In some embodiments, the cookie generator 904 can determine if the online activity monitoring system 900 did not previously assign a cookie to the browser of the client device from which the request was received. Responsive to determining that the online activity monitoring system 900 did not previously assign a cookie to the browser of the client device from which the request was received, the cookie generator 904 can generate a cookie to provide to the client device.

The cookie generator 904 can generate the cookie and include information in the cookie that indicates that the browser of the client device 102a has accessed the first resource 950a and the second resource 950b responsive to receiving the request 920. The online activity monitoring system 900 can be configured to generate and transmit, to the client device 102a, a response 924 including the generated cookie 955a and a first redirect link 926. The first redirect link is configured to cause the browser 912a of the client device to be redirected from the first resource 950a to the second resource 950b. In some embodiments, upon receiving the response 924, the browser 912a of the client device 102a may store, in memory of the client device, the cookie 955a included in the response 924. At this point and therefrom, the resource identification engine 908 may identify, via the cookie 955a, that the client device 102a has accessed the first resource 950a and the second resource 950b.

Next, responsive to an action taken on the second encoded URL 914b that is linked to the third resource 950c, the client device 102a can generate a request 930 to access the third resource 950c. The request can include the cookie previously provided by the linking system 120 and stored in memory of the client device, for instance, in a cache of the browser of the client device. The online activity monitoring system 900 can receive the request 930. Responsive to receiving the request 930, the resource identification engine 908 can be configured to identify, from the request 930, the cookie 955a, the third resource 950c and the fourth resource. The fourth resource can be one of the first resource, the second resource or any other resource. In addition, the cookie updater 906 can be configured to update the cookie 955a to include information indicating that the client device 102a has accessed the first resource 950a, the second resource 950b, the third resource 950c and the fourth resource. The cookie updater 906 can store the information in the cookie 955a to generate an updated version of the cookie 955a'. The online activity monitoring system 900 can be configured to then send back to the client device 102a, a response 934 that includes the updated cookie 955a' and a second redirect link 936 that will redirect the browser 912a from the fourth resource to the third resource 950c. In some embodiments, upon receiving the response 934, the browser 912a of the client device 102a can update the stored cookie 955a to the updated cookie 955a' included in the response 934. At this point and therefrom, the resource identification engine 908 or the online activity monitoring system 900 may identify, via the cookie 955a' that the client device 102a has accessed the first resource 950a, the second resource 950b, the third resource 950c and the fourth resource.

Similarly, responsive to a subsequent action (e.g., clicks or other interactions) performed on any URL (not shown) encoded by the linking system 120 that is included in a fifth resource (not shown) and linked to a sixth resource (not shown), the client device 102a can generate a third request (not shown) including the cookie 955a' to the system 900 to access the sixth resource. The online activity monitoring system 900 may receive the third request. Responsive to the third request, the resource identification engine 908 may identify from the third request, the updated cookie 955a', the fifth resource and the sixth resource. In addition, the cookie updater 906 may further update the cookie 955a' to a further updated cookie (not shown). The further updated cookie may indicate that the client device 102a has accessed the first resource 950a, the second resource 950b, the third resource 950c, the fourth resource, the fifth resource and the sixth resource. The system 900 can then send back to the client device 102a a further response (not shown) that now includes the further updated cookie and a further redirect link (not shown). The further redirect link can cause the browser 912a to be redirected from the fifth resource to the sixth resource. At this point and therefrom, the resource identification engine 908 may identify via the further updated cookie that the client device 102a has accessed the first resource 950a, the second resource 950b, the third resource 950c, the fourth resource, the fifth resource and the sixth resource.

Furthermore, referring to FIG. 9A, for example, responsive to an action (e.g., clicks or other interactions by using a browser 912b in the client device 102b) performed on the third encoded URL 914c that is linked to the second resource 950b, the client device 102b may provide a request 940 to the system 900 to access the second resource 950b. The system 900 may receive the request 940 and responsive to the request 940, the resource identification engine 908 may identify, from the request 940, the second resource 950b. The cookie generator 904 can be configured to generate a cookie 955b indicating that the client device 102b has accessed the second resource 950b. The online activity monitoring system 900 can be configured to generate and transmit, to the client device 102b, a response 944 including the generated cookie 955b and a third redirect link 946. The third redirect link 946 can be configured to cause the browser 912b to the second resource 950b. In some embodiments, upon receiving the response 944, the browser 912b of the client device 102b may store, in memory, the cookie 955b included in the response 944. At this point and therefrom, the resource identification engine 908 may identify via the cookie 955b that the client device 102b has accessed the second resource 950b. It should be appreciated that each cookie and any updated versions of the cookie can be unique to a particular client device. In some embodiments, each cookie and any updated versions of the cookie can be unique to a particular browser or application of the client device.

The cookie management engine 902 may comprise an application, program, library, service, script, process, task or any type and form of executable instructions executing or executable on a device. The cookie management engine 902 may comprise logic, function or operations to create a cookie relating to a particular client device or application or program (e.g., browser) in a client device, and store, update and retrieve the cookie. More particularly, the cookie generator 904 may comprise logic, function or operations to create a cookie relating to the particular client device or application or program in a client device, and the cookie generator 906 may comprise logic, function or operations to update the cookie. The cookie management engine 902 may comprise logic, function or operations to create a plurality of cookies relating to respective client devices or applications or programs (e.g., browsers) in a client device, and store, update and retrieve the plurality of cookies.

The cookie management engine 902 may comprise logic, function or operations to correlate a client device or application or program to a plurality of source resources and destination resources to which the same client device or application or program has provided requests to access resources linked to encoded links generated by the linking system 120. In some embodiments, to perform such correlations, the cookie management engine 902 may comprise the link decoder 212 configured to decode an encoded URL, such as via the database 230 and perform a lookup of the URL corresponding to the shortened or encoded URL (see FIG. 2). The cookie management engine 902 may also correlate the client devices or applications or programs to source resources from which the same client device or application or program has generated request to access another resource (by clicking encoded links on those source resources by users of the client devices or applications or programs).

In some embodiments, to perform such correlations, the cookie management engine 902 may comprise logic, function or operations to identify source resource information from a header of a request generated by a client device (e.g., the HTTP header field of referrer). For example, referring to FIG. 9A, responsive to the request 920, the cookie generator 904 may generate the cookie 955a correlating the client device 102a to both the first resource 950a, from which the client device 102a generated a request to access the second resource 950b, and the second resource 950b. Moreover, referring to FIG. 9A, responsive to the request 930 made by the same client device 102a, the cookie updater 906 may update the same cookie 955a to an updated cookie 955a' so as to correlate the client device 102a not only to the first resource 950a and the fourth resource, from which the client device 102a has generated a request to access other resources, but also to the second resource 950b and the third resource 950c, to which the encoded links were linked. Furthermore, referring to FIG. 9A, responsive to the request 940 generated by a different client device, i.e., the client device 102b, the cookie generator 904 may generate a cookie different from the cookie 955a associated to the client device 102a, i.e., the cookie 955b, to correlate the client device 102b to the second resource 950b to which the client device 102b generated request to access.

In some embodiments, if the online activity monitoring system 900 receives a first request from a first client device and determines that the first request does not include any cookie, the cookie generator 904 may create or generate a cookie and provide the cookie to the first client device. Subsequently, if the online activity monitoring system 900 a second request from the first client device and identifies a cookie of the linking system 120 included in the second request, the online activity monitoring system 900, via the cookie updater 906, may update browsing data stored in the cookie to include a source resource and a destination resource identified by the second request, and transmit the updated cookie to the first client device.

Similarly, the online activity monitoring system 900 may provide, via the cookie generator 904, a second cookie to a second client device that is different from the first client device, responsive to receiving from the second client device, a request to access any link encoded by the link shortening system 120.

The resource identification engine 908 may comprise an application, program, library, service, script, process, task or any type and form of executable instructions executing or executable on a device. The resource identification engine 908 may comprise logic, function or operations to identify from a request (e.g., an HTTP request) generated by a client device, both a source resource, from which the client device generated request to access to a destination resource (by clicking an encoded link liked to the destination resource), and the destination resource. In some embodiments, the resource identification engine 908 may comprise logic, function or operations to identify the source resource information from a header of the request (e.g., the HTTP header field of referrer) and identify the destination resource information using the link decoder 212 of the linking system 120 configured to decode an encoded URL, such as via the database 230 and perform a lookup of the URL corresponding to the shortened or encoded URL (see FIG. 2).

The resource identification engine 908 may also comprise logic, function or operations to identify from a request generated by a client device and a cookie included therein, both a source resource, from which the client device generated the request to access to a destination resource (by clicking an encoded link liked to the destination resource), and the destination resource. The resource identification engine 908 may also comprise logic, function or operations to identify from a request generated by a client device and a cookie included therein, both a plurality of source resources, from which the client device has previously generated requests to access to a plurality of destination resources, and the plurality of destination resources. For example, referring to FIG. 9A, responsive to the request 930 generated by the client device 102a, the resource identification engine 908 may identify from the request 930 and the cookie 955a included therein, both a plurality of source resources (e.g., the first resource 950a), from which the client device has previously generated requests to access to a plurality of destination resources (e.g., the second resource 950b and the third resource 950c), and the plurality of destination resources.

In other embodiments, the online activity monitoring system 900 may provide an output identifying a plurality of resources accessed by the client device. The online activity monitoring system 900 may identify, from a cookie relating to a particular client device, a plurality of resources accessed by the particular client device based on links encoded by the link shortening system. For example, the online activity monitoring system 900 may identify, from the cookie 955a relating to the client device 102a, a plurality of resources (e.g., the second resource 950b and the third resource 950c) accessed by the client device 102a based on the encoded links 1 and 2 (914a and 914b).

The online activity monitoring system 900 can be configured to maintain copies of cookies provided to each of the client devices that access links encoded by the online activity monitoring system 900. In some embodiments, the online activity monitoring system 900 can store, in memory, a cookie of the each of the cookies provided by the online activity monitoring system 900 and can be configured to update the cookie stored in the memory each time the cookie is updated by the linking system. The cookies can identify the source URLs from which browsers of client devices can access links encoded by the online activity monitoring system 900 as well as the destination URLs to which to redirect the browsers responsive to accessing the encoded links.

The online activity monitoring system 900 can be configured to analyze the resources identified by the cookies of the linking system 120 that are provided to browsers or applications of client devices to identify one or more relationships between resources. For instance, the online activity monitoring system 900 can determine, from the plurality of cookies of the linking system 120, that a large number of users visited a first resource and a second resource that is not linked to the first resource by an encoded link of the linking system 900. The online activity monitoring system 900 can determine that there is a correlation between the first resource and the second resource by comparing the number of cookies that identified both the first resource and the second resource to a predetermined threshold value. For instance, if more than 10% of the cookies corresponding to client devices visited a first resource and a second resource, the online activity monitoring system 900 can determine that the first resource and the second resource attract similar types of users.

In some implementations, the online activity monitoring system 900 can generate reports based on trends identifiable from the history of resources accessed by the each of the cookies of the linking system 120. The online activity monitoring system 900 can further provide the generated reports to entities requesting such reports.

In some embodiments, the online activity monitoring system 900 can identify, from cookies relating to particular client devices or a cookie history of the client devices, that many of the client devices which visited resources in a first domain generated requests to access resources in a second domain. In this manner, the online activity monitoring system can identify correlation between different domains based on the online activity of multiple client devices. In some embodiments, the online activity monitoring system 900 can identify, for each domain, a list of other domains that are related via cookie history, and determine the top domains that are visited from each domain.

Figure 9B:
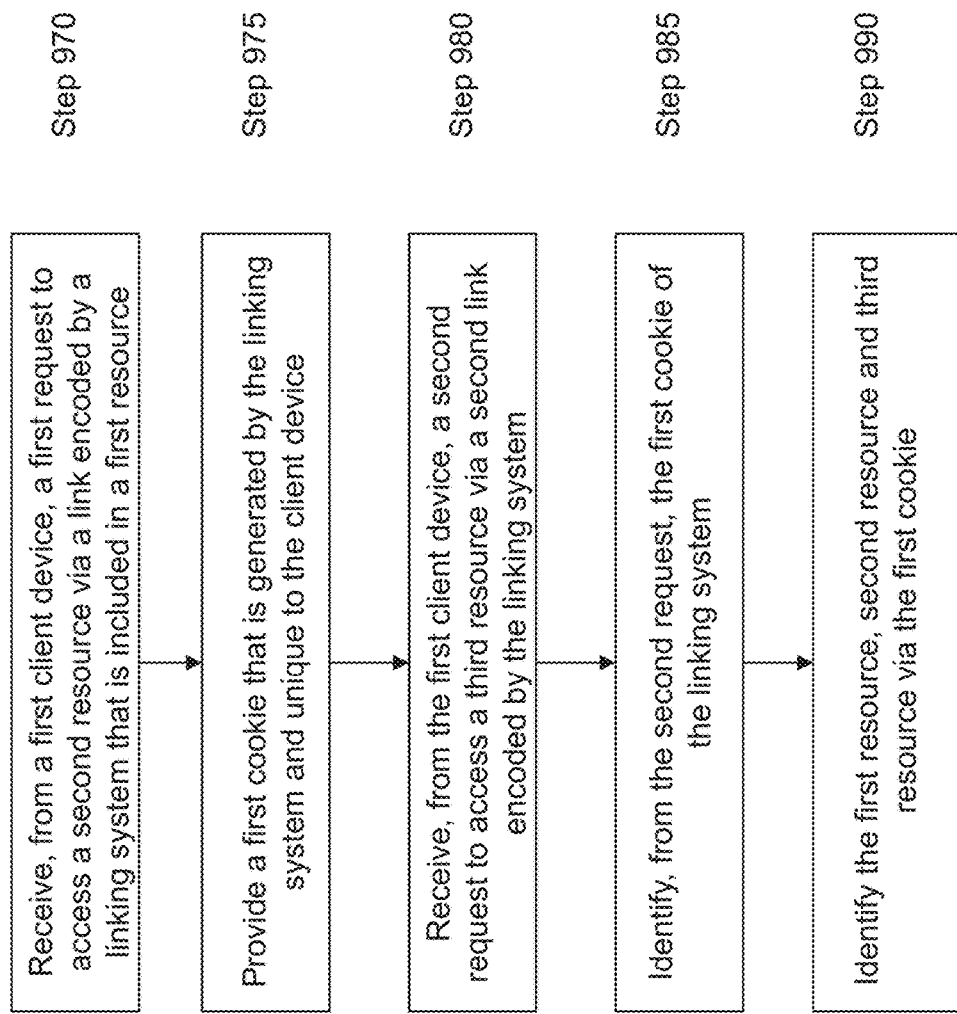
FIG. 9B is a flow diagram of an embodiment of a method for monitoring online activities of users via cookies of a linking system.

Referring now to FIG. 9B, an embodiment of a method for monitoring online activities of users via cookies is depicted. In brief overview, at step 970, the system or server, such as any embodiments of the online activity monitoring system 900, receives from a client device, a first request from a first resource to access a first link that is encoded by a linking system and linked to a second resource. At step 975, the online activity monitoring system 900 provides a cookie of the linking system to the client device responsive to receiving the first request from the client device. The online activity monitoring system 900 may identify, from the cookie of the link shortening system, the first resource and the second resource. At step 980, the online activity monitoring system 900 receives from the client device, a second request to access a second link that is encoded by the linking system and linked to a third resource. At step 985, the system identifies from the second request, the same cookie provided to the client device and the third resource. At step 990, the online activity monitoring system 900 identifies, via the cookie provided to the client device, that the client device has accessed the first resource, the second resource and the third resource.

In further detail, at step 970, the online activity monitoring system 900 may receive from a client device (e.g., the client device 102a or 102b) a first request from a first resource to access a first link that is encoded by the linking system (e.g., the linking system 120) and linked to a second resource. Referring to FIG. 9A, for example, when a user of the client device 102a clicks or otherwise interacts with (e.g., by using the browser 912a in the client device 102a) the first encoded URL 914a on the first resource 950a that is linked to the second resource 950b, the client device 102a may provide a request 920 to the system 900 to access the second resource 950b and the system 900 may receive the request 920. The first encoded URL 914a can be included within the first resource such that when the contents of the first resource is displayed on a client device via the browser 912a, a user of the client device 102a can click or otherwise interact with the encoded URL 914a.

In some embodiments, the browser executing on a client device may include a web browser configured to retrieve, present and traverse information resources on the World Wide Web via the Internet. In some other embodiments, the browser may comprise an application, program, library, service, script, process, task or any type and form of executable instructions executing or executable on the client device. The browser can be configured to retrieve, present and traverse information resources that are linked to each other by hypertext links. In some embodiments, when a user visits a first page that includes a link encoded by the linking system, responsive to the user's access to the encoded link, a browser may provide, to the online activity monitoring system, a request including information identifying the source resource (i.e., the resource on which the encoded link was accessed). The user may access the encoded link by clicking on the link or performing one or more other qualifying interactions. Such interactions may include tapping on a touchpad or trackpad, pressing a touch screen with a finger or tool, or eye movements by use of eye tracking devices. In some embodiments, the browser may generate an HTTP request message that includes a source resource URL (i.e., the URL of the first page) and a destination resource URL which is the address of the encoded link.

At step 975, the online activity monitoring system 900 may provide a cookie of the linking system to the client device responsive to receiving, from the client device, the first request to access the first encoded link that is linked to the second resource. Referring to FIG. 9A, for example, responsive to the first request 920, the resource identification engine 908 may identify from the first request 920, the first resource 950a and the second resource 950b by using a header of the first request (e.g., the HTTP header field of referrer) and the link decoder 212 configured to decode the first encoded URL 914a, such as via database 230 and perform a lookup of the URL corresponding to the encoded URL (see FIG. 2). Next, the cookie generator 904 may generate the cookie 955a indicating that the client device 102a has accessed the first resource 950a and the second resource 950b. In some implementations, the cookie generator 904 can maintain, in memory, an indication of the cookie generated by the online activity monitoring system 900 and store a copy of the cookie provided to the client device in memory. The cookie can include information that identifies the source resource URL identifying the first resource and the destination resource URL identifying the second resource.

The online activity monitoring system 900 may then send back, to the client device 102a, the response 924 (e.g., an HTTP response) including the generated cookie 955a and a first redirect link 926. The first redirect link 926 can redirect the browser of the client device from the first resource 950a to the second resource 950b. In some embodiments, the system may provide the cookie responsive to determining that the first request does not identify a cookie. For example, if the system 900 receives the first request from a first client device and determines that the first request does not include a cookie, the cookie generator 904 may create or generate a cookie and provide it to the first client device.

At step 980, the online activity monitoring system 900 may receive from the client device, a second request to access a second link that is encoded by the linking system and linked to a third resource. Referring to FIG. 9A, for example, the user or another user of the client device 102a may click the second encoded URL 914b on the fourth resource (not shown), that is linked to the third resource 950c. The client device 102a may generate the second request 930 including the cookie 955a to the system 900 to access the third resource 950c in response to receiving an indication of an action performed on the second encoded URL 914b. In some embodiments, the browser of the client device on which the action was performed can store, in memory of the client device 102, a copy of the cookie received from the linking system. The browser can be configured to generate the second request to provide to the linking system 900. The browser can include a copy of the cookie received from the linking system in the second request, which can also identify the URL on which the action was performed.

At step 985, the online activity monitoring system 900 may identify from the second request, the same cookie provided to the client device and the third resource. In some embodiments, the online activity monitoring system 900 may identify from the second request, the fourth resource from which the online activity monitoring system 900 received the second request. Referring to FIG. 9A, for example, responsive to the request 930, the resource identification engine 908 may identify, from the request 930, the cookie 955*a* previously provided by the online activity monitoring system 900 to the first client device 102*a*, the third resource 950*c* and the fourth resource (source resource). The cookie updater 906 can then update the cookie 955*a* included in the second request that is received from the client device to indicate that the client device 102*a* has accessed the first resource 950*a*, the second resource 950*b*, the third resource 950*c* and the fourth resource. The online activity monitoring system 900 may then send back to the client device 102*a* the response 934 that now includes the updated cookie 955*a*' and a second redirect link 936. The second redirect link will then redirect the browser from the fourth resource to the third resource 950*c*.

In some embodiments, the fourth resource can be the same as the first resource, e.g., the first resource 950*a*. As described herein, the first request may be received by receiving a first interaction on the first encoded link, and the second request may be received by receiving a second interaction on the second encoded link. Referring to FIG. 9A, for example, the request 920 is received by receiving a first click by a user of the client device 102*a* on the first encoded URL 914*a*, and the request 930 is received by receiving a second click by a user of the client device 102*a* on the second encoded URL 914*b*.

In some implementations, the online activity monitoring system 900 can store, in memory of the linking system 900, a copy of the updated cookie 955'. In some implementations, the online activity monitoring system 900 can maintain, in memory, a record of the resources accessed by the browser of the client device. Each time the browser of the client device transmits a request to the online activity monitoring system 900 responsive to an action performed on a link encoded by the linking system, the cookie of the online activity monitoring system 900 provided to the browser can be updated to identify the source resource on which the action was performed and the destination resource to which the encoded link is configured to redirect the browser.

At step 990, the online activity monitoring system 900 may identify, via the cookie provided to the client device, that the client device has accessed the first resource, the second resource and the third resource. Referring back to FIG. 9A, for example, after sending the response 934 back to the client device 102*a*, the resource identification engine 908 may identify via the cookie 955*a*' that the client device 102*a* has accessed the first resource 950*a*, the second resource 950*b*, the third resource 950*c* and the fourth resource.

In some embodiments, the online activity monitoring system 900 may further receive a third request from a fifth resource to access a link that is encoded by the linking system and linked to a sixth resource, and identify, via the cookie provided to the client device, that the client device has accessed the first resource, the second resource, the third resource, the fourth resource, the fifth resource and the sixth resource.

In some embodiments, the online activity monitoring system 900 may provide an output identifying a plurality of resources accessed by the client device. In some embodiments, responsive to the online activity monitoring system 900 receiving the second request from the client device, the online activity monitoring system 900 may receive the cookie included in the second request, update browsing data stored in the cookie to include a source resource and a destination resource identified by the second request, and transmit the updated cookie to the client device.

In some embodiments, the online activity monitoring system 900 may provide a second cookie to a second client device responsive to receiving a request to access any link encoded by the linking system. Referring to FIG. 9A, for example, the online activity monitoring system 900 may provide the second cookie (e.g., the cookie 955*b*) to the second client device (e.g., the client device 102*b*) that is different from the first client device (e.g., the client device 102*a*), responsive to receiving a request (e.g., the request 940) to access any link encoded by the linking system 120 (e.g., the third encoded URL 914*c*). In some embodiments, the online activity monitoring system 900 may identify from the second cookie, a plurality of resources accessed by the second client device based on links encoded by the link shortening system.

J. Systems and Methods for Analyzing Traffic Across Media Channels via Encoded Links Referring now to FIGS. 10A and 10B, systems and methods of analyzing traffic across multiple media channels via encoded links is depicted. The present solution may generate respective encoded links for different media channels, determine, for each of the media channels, statistics related to user interactions with the encoded links, and provide channel-specific or aggregate information based on the statistics. The respective encoded links for the media channels may allow a media channel analysis system 1000 to track statistics for each media channel and provide aggregate or channel-specific information based on the statistics. For example, a marketer may use the media channel analysis system to evaluate the performance of their marketing campaigns across multiple marketing channels including dark social media (e.g., email and Short Message Service (SMS)). Responsive to receiving a request from a marketer to shorten a link to content (for example, an information resource such as a webpage), the media channel analysis system can generate multiple links to the content. Each of the generated links can be specific to a particular marketing channel. The system can then track statistics for each media channel based on activity tracked on each of the encoded links and provide both aggregate and channel-specific insights to the marketer.

Figure 10A:
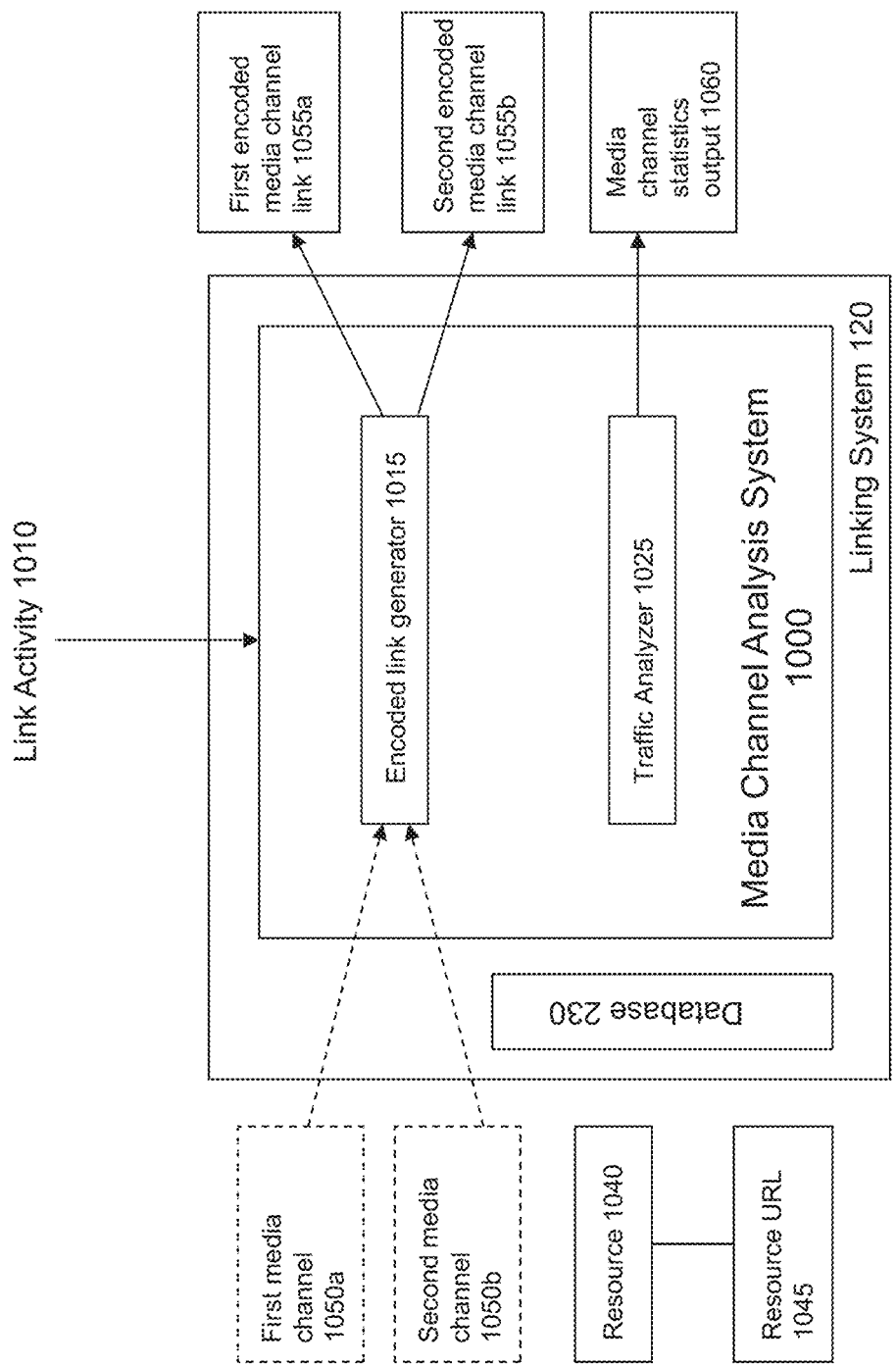
FIG. 10A is a diagram of an embodiment of a system to analyze multiple media channels via encoded links.

Referring to FIG. 10A, the media channel analysis system 1000 can be included in or executed on one or more servers 106A-N. The media channel analysis system 1000 can include one or more components, modules, scripts, programs, or set of instructions. The media channel analysis system 1000 can include an encoded link generator 1015 and a traffic analyzer 1025. The media channel analysis system can be a part of a linking system, such as the linking system 120 described herein with respect to FIGS. 2A-10B.

The encoded link generator 1015 can be configured, constructed or designed to receive identification of a plurality of media channels for which to generate encoded links to a resource. In some embodiments, the encoded link generator 1015 can receive a request, from a client device of a marketer or advertiser, to generate one or more media channel specific encoded links to a resource, such as a resource 1040. The resource 1040 can be an information resource, such as a web page. The resource 1040 can be stored on a server and may correspond to or be accessed via a resource URL 1045. In some embodiments, the encoded link generator 1015 can be configured to provide a user interface to a client device through which one or more requests to generate encoded links can be received. The user interface can provide one or more input fields. Via the user interface, a user of the client device can provide a resource URL, such as the resource URL 1045 of the resource 1040, for which to generate one or more media channel specific encoded links. The user of the client device can also provide, via the user interface, an identification of one or more media channels for which to generate encoded links to the resource. For instance, the user of the client device can provide a URL of the resource and an indication of a social network media channel, a SMS media channel and an email media channel for which to generate specific encoded links. Each of the specific encoded links is linked to the same resource. In some embodiments, the request can identify a first media channel 1050*a* and a second media channel 1050*b* for which to generate media channel specific encoded links.

The encoded link generator 1015 can be configured to generate different encoded links to the resource for each of the different media channels for which an encoded link is to be generated. The encoded link generator 1015 can be configured to generate a first encoded media channel link 1055*a* and a second encoded media channel link 1055*b* both of which are linked to the same resource 1040. The first encoded media channel link 1055*a* can correspond to the first media channel 1050*a*, while the second encoded media channel link 1055*b* can correspond to the second media channel 1050*b* identified in the request received from the client device. The request can identify one or more additional media channels for which to generate media channel specific encoded links. A media channel specific encoded link can be a link to the resource that can be assigned to or otherwise attributed or associated with a particular media channel. A media channel can be a channel for which statistics relating to online activity may be determined. Examples of media channels can include one or more of the following: a social media platform, such as FACEBOOK, TWITTER, INSTAGRAM, an email channel, an SMS channel, a particular website or domain (for instance, YAHOO.COM, AOL.COM, etc.), or one or more websites belonging to a particular category, such as sports or music or news, among others.

The encoded link generator 1015 can be configured to generate the first encoded link 1055*a*. The first encoded link can be configured such that when a client device accesses the first encoded link, the client device sends a request to a server of the media channel analysis system 1000, which then redirects the client device to a server of the resource to which the first encoded link is linked.

The encoded link generator 1015 can be configured to associate a media channel identifier (ID) of the first media channel 1050*a* to the generated first encoded link 1055*a*. In this way, any activity performed via the first encoded link can be attributed to the first media channel 1050*a*. Similarly, the encoded link generator 1015 can also be configured to generate the second encoded link 1055*b*. The second encoded link 1055*b* is linked to the same resource as the first encoded link 1055*a*. The second encoded link can be configured such that when a client device accesses the second encoded link, the client device sends a request to a server of the media channel analysis system 1000, which then redirects the client device to a server of the resource to which the second encoded link is also linked.

The encoded link generator 1015 can be configured to assign each of the encoded links generated by the encoded link generator 1015 that are linked to the same resource to a respective media channel. In some embodiments, the encoded link generator 1015 can assign an encoded link to a media channel by creating an entry in a data structure stored on the database 230. In some embodiments, the entry can include the resource URL 1045 of the resource 1040, the first encoded media channel link 1055*a* and the media channel ID of the first media channel 1050*a*. In this way, any activity corresponding to the first encoded media channel link 1055*a* can be attributed to the first media channel 1050*a*. Similarly, the entry can include the resource URL 1045 of the resource 1040, the second encoded media channel link 1055*b* and the media channel ID of the second media channel 1050*b*. In this way, any activity corresponding to the second encoded media channel link 1055*b* can be attributed to the second media channel 1050*b*.

The media channel analysis system 1000 may receive multiple requests to generate media specific encoded links for the same resource from multiple client devices or accounts corresponding to the media channel analysis system. For instance, the media channel analysis system 1000 can receive a first request from a first client device to generate multiple encoded links for a particular resource. The media channel analysis system 1000 can also receive a second request from a second client device to generate multiple encoded links for the same resource. In some embodiments, the media channel analysis system, via the encoded link generator 1015 can generate a first set of encoded links for the first request and a second set of encoded links that are different from the first set of encoded links for the second request. In this way, any activity corresponding to any particular encoded link can be specific to a media channel and a client device from which the request to generate encoded links was received. However, in some embodiments, the media channel analysis system 1000, via the encoded link generator 1015, can provide previously generated encoded links that are linked to the same resource and are assigned to a particular media channel in response to a request from another client device for an encoded link to the same resource to be assigned to the same media channel. In such embodiments, any activity corresponding to the particular encoded link will be specific to the media channel but will not be specific to a particular client device.

In some embodiments, the media channel analysis system 1000 can be configured to maintain a data structure in the database 230 to allow the media channel analysis system to identify, for a given resource, each of the encoded links to the resource generated by the encoded link generator 1015. In addition, the media channel analysis system 1000 can be further configured to identify, for a given resource, each of the generated encoded links to the resource that are assigned to a particular media channel, such as FACEBOOK, or email or SMS, among others.

In some embodiments, multiple entries corresponding to requests to generate encoded links to a resource can be linked together based on the resource or the URL of the resource. In some embodiments, the media channel analysis system 1000 can be configured to perform a lookup by resource URL or resource to identify each of the generated encoded links to the resource. In this way, the media channel analysis system 1000 can identify each of the encoded links generated by the encoded link generator 1015 for the given resource.

The traffic analyzer 1025 of the media channel analysis system 1000 can be configured to identify link activity 1010. Link activity can include any actions performed by users of one or more client devices on encoded links generated by the encoded link generator 1015. Examples of actions can include clicking on encoded links, sharing encoded links, requesting to generate the encoded links, among others. The media channel analysis system 1000 can identify these actions and record the actions in the database 230. In some embodiments, the database 230 can include one or more data structures for recording link activity. For instance, each time a client device requests access (for instance, by clicking) to a link generated by the link generator 1015, the traffic analyzer 1025 can identify the activity (for instance, the request to access the link) and update one of the data structures to include the identified activity. In some embodiments, the traffic analyzer 1025 can identify click information and store the click information in the data structure. The click information can include one or more of the following: a client device identifier, a cookie of the media channel analysis system (or linking system 120) assigned to the client device (or user), a source URL on which the encoded link was presented, date and time of the activity, URL of the encoded link, a media channel to which the encoded link is assigned, among others.

In some implementations, the traffic analyzer 1025 can generate entries corresponding to actions taken on encoded links generated by the encoded link generator 1015. In some implementations, the traffic analyzer 1025 can maintain a table including a plurality of entries. Each entry can include one or more of an encoded link URL, a media channel to which the encoded link is assigned, a source identifier identifying the content on which the encoded link URL was presented when accessed, a cookie of the linking system identifying a client device that accessed the encoded link URL, a destination resource identifier identifying the resource to which the encoded link is linked, among others.

Table 1 below illustrates example entries that can be generated by the traffic analyzer 1025.

generator 1015, the traffic analyzer 1025 can use the table to determine statistics for various encoded links and media channels. These statistics can then be shared or provided to advertisers that may determine where to allocate their advertising spend based on the performance of the media channels. By generating separate links for each media channel and then using the respective links assigned to a media channel to distribute the links on their respective channels, an advertiser, via the traffic analyzer, can determine the performance of each of the links and the media channels to which they are assigned.

The traffic analyzer 1025 can be configured to determine statistics based on activity on each of the links generated by the encoded link generator 1015. The traffic analyzer 1025 can determine statistics related to a given resource, for each media channel, based on activity on each of the links generated by the encoded link generator 1015 that are assigned to the media channel and linked to the resource. For instance, if a resource (for instance, webpage 1) is linked to 3 different encoded links generated by the encoded link generator 1015 that are each assigned to a first media channel and linked to webpage 1, the traffic analyzer 1025 can identify all of the actions performed on the 3 different encoded links and based on the identified actions, generate a report including statistics for the first media channel for the webpage 1 based on the 3 different encoded links generated by the encoded link generator 1015.

The traffic analyzer 1025 can be configured to determine statistics from various perspectives. In one embodiment, the traffic analyzer 1025 can be configured to determine statistics based only on encoded links generated by the encoded link generator 1015 that are linked to a particular resource. In one embodiment, the traffic analyzer 1025 can be configured to determine statistics based only on encoded links generated by the encoded link generator 1015 that are linked to a particular resource and assigned to a particular media channel. In one embodiment, the traffic analyzer 1025 can be configured to determine statistics based only on encoded links generated by the encoded link generator 1015 that may be linked to multiple resources but are assigned to a particular media channel. In one embodiment, the traffic analyzer 1025 can be configured to determine statistics based

| Encoded link URL | Media channel identifier | Channel Type | Source Identifier | Client device identifier | Destination Resource URL | Event Time |
|---|---|---|---|---|---|---|
| Link 1 | Facebook | Social Media | Fb.com/123 | Cookie1 | Example1.com | 12-01-15 1:02:03 |
| Link 2 | SMS | SMS | null | Cookie2 | Example1.com | 12-01-15 2:52:03 |
| Link 3 | Email | Email | null | Cookie3 | Example1.com | 12-01-15 4:13:33 |
| Link 2 | Facebook | SMS | Fb.com/123 | Cookie4 | Example1.com | 12-01-15 1:02:03 |
| Link 3 | Facebook | Email | Fb.com/524 | Cookie5 | Example1.com | 12-01-15 2:52:03 |

As shown in Table 1, each of the links, Link 1, Link 2 and Link 3 each are linked to the same destination resource, Example1.com. Even though the links were originally distributed on the media channel for which they were configured, the links may be shared across different media channel types. For instance, both Link 2 and Link 3, were shared on Facebook (social media), even though they were assigned to the SMS channel and email channel respectively. By maintaining a table including a plurality of entries for each action taken on an encoded link generated by the encoded link only on encoded links generated by the encoded link generator 1015 that are linked to a particular resource and are specific to a particular client device (or marketer) that requested the generation of the encoded links. In some embodiments, the traffic analyzer 1025 can be configured to determine statistics based on one or more of previous embodiments.

In some embodiments, the traffic analyzer 1025 may generate or calculate, for each media channel, a number of requests to access a particular resource that were received.

For example, for the first media channel 1050*a* and the resource 1040, the traffic analyzer 1025 can determine a total number of requests to access the resource 1040 via encoded links that were generated by the encoded link generator 1015 that were assigned to the first media channel 1050*a*. For this determination, in one embodiment, the traffic analyzer 1025 may identify all the encoded links generated by the encoded link generator 1015 that are assigned to the first media channel 1050*a*. Next, with the identified encoded links, the traffic analyzer 1025 may calculate a total number of requests to access the resource 1040 by adding the number of requests to access the resource 1040 of each of the identified encoded links specific to the first media channel 1050*a*.

In some embodiments, the traffic analyzer 1025 may generate or calculate, for each media channel, a number of different source URLs from which requests to access the resource 1040 were received. For example, for the first media channel 1050*a* and the resource 1040, the traffic analyzer 1025 may determine a number of different source URLs from which requests to access the resource 1040 via encoded links that were generated by the encoded link generator 1015 that were assigned to the first media channel 1050*a*. For this determination, in one embodiment, the traffic analyzer 1025 may identify all the encoded links generated by the encoded link generator 1015 that are assigned to the first media channel 1050*a*. Next, with the identified encoded links, the traffic analyzer 1025 may identify, from the data structure maintaining an activity log for each of the encoded links, each of the different source URLs from which requests to access the resource 1040 via one of the retrieved encoded links were received.

In other embodiments, the traffic analyzer 1025 may determine, for the resource 1040, a statistic (for example, number of clicks) for each of the media channels, and aggregate each of the identified statistics to generate an aggregate statistic for the resource. For example, to calculate the aggregated total number of requests to access a particular resource via links encoded by the encoded link generator 1015 and assigned to the media channels, the traffic analyzer 1025 may add the number of requests to access the resource 1040 via the encoded links assigned to a respective media channel of the media channels.

In some embodiments, the portion of the statistics may relate to a specific media channel, for instance, one of a social networking channel, an SMS channel and an email channel. In some embodiments, the traffic analyzer 1025 may be configured to rank each of the media channels based on their respective statistics. For example, after calculating, for each media channel, the number of requests to access the resource 1040 that were received, the traffic analyzer 1025 may rank the media channels based on their respective number of requests to access the resource 1040 that were received. In another example, after calculating, for each media channel, the number of different source URLs from which requests to access the resource 1040 were received, the traffic analyzer 1025 may rank the media channels based on their respective number of different source URLs from which requests to access the resource 1040 were received.

In some embodiments, the traffic analyzer 1025 may provide a media channel statistics output 1060 including at least a portion of the statistics. For example, the traffic analyzer 1025 may provide the media channel statistics output 1060 by generating a visual representation of the statistics (e.g., plain text or table format) on a web page. In this manner, for example, a table format output may be provided representing, for each media channel, the number of requests to access the resource 1040 and the number of different source URLs from which requests to access the resource 1040 were received, along with their respective ranks. In some other embodiments, the traffic analyzer 1025 may generate a graphical representation of the statistics, e.g., bar graphs, pie charts, line graphs and histogram. In this manner, for example, a bar graph or pie chart or histogram output may be provided representing, for each media channel, the number of requests to access the resource 1040 or the number of different source URLs from which requests to access the resource 1040 were received.

In some embodiments, the traffic analyzer 1025 may provide the media channel statistics output 1060 by providing statistics relating to performance of an SMS channel or an email channel. In one embodiment, performance of an SMS channel or an email channel may relate to performance in advertising a particular resource to the public via the SMS or email channels. Such advertisement performance may be measured by the number of requests to access the particular resource or the number of different source URLs from which requests to access the particular resource were received. For example, one performance metric of an SMS channel may be its rank among multiple media channels or its relative volume compared to those of other media channels with respect to the number of requests to access the resource 1040 or the number of different source URLs from which requests to access the resource 1040 were received.

In some embodiments, the media channels may include a first channel corresponding to a first domain and a second channel corresponding to a second domain. In some embodiments, a media channels may relate to multiple domains. Multiple domains may identify distinct network resources, such as computers, networks or services on the Internet. In some other embodiments, the media channels may correspond to different geographical regions. For instance, an advertiser may request to generate separate encoded links for each State in the U.S., or different encoded links for different countries.

In some other embodiment, the media channels may further include a first channel corresponding to a first advertisement of an advertiser and a second channel corresponding to a second advertisement of the advertiser. For example, the same business or company may utilize multiple media channels for different advertisements.

Figure 10B:
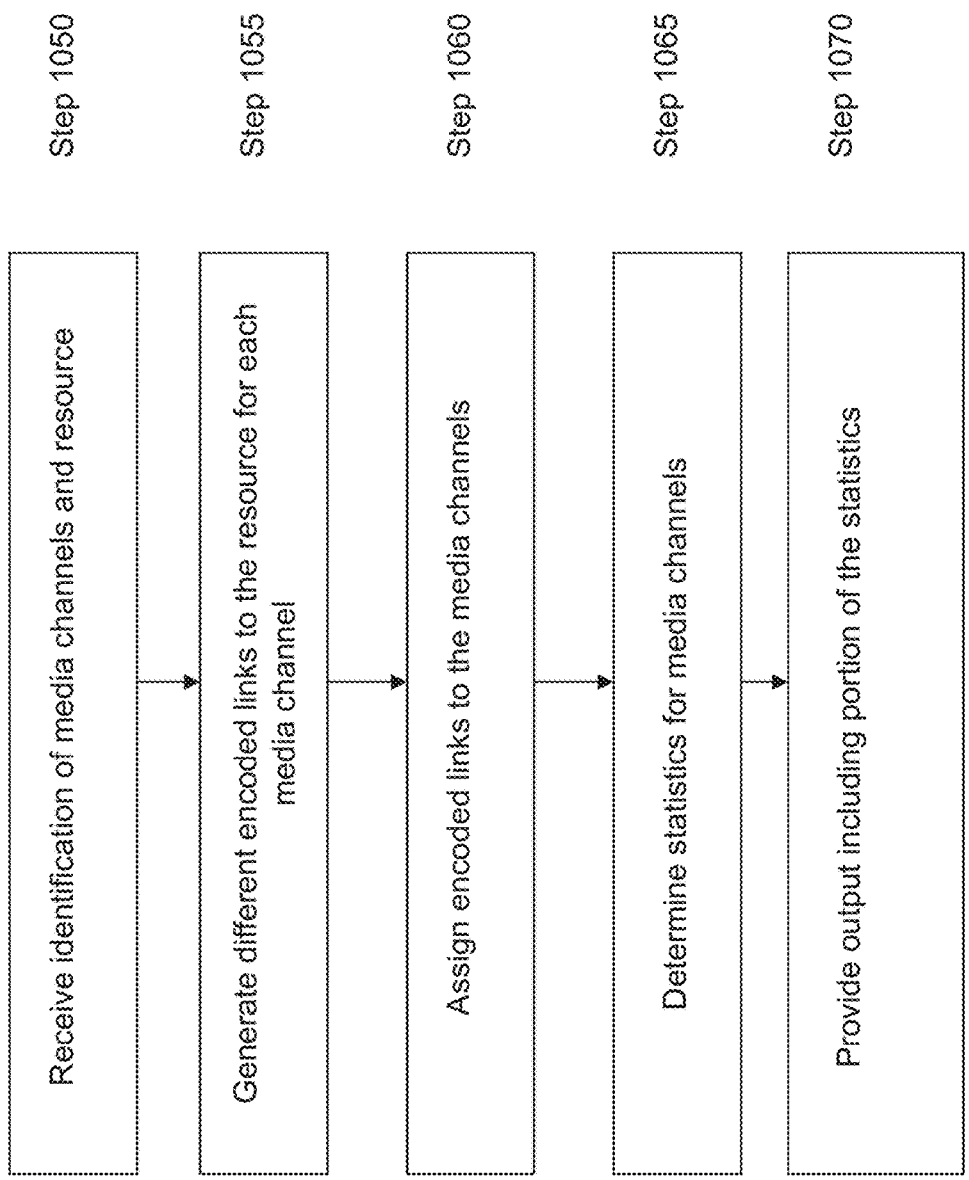
FIG. 10B is a flow diagram of an embodiment of a method for analyzing traffic across multiple media channels via encoded links.

Referring now to FIG. 10B, an embodiment of a method for analyzing traffic across a plurality of media channels is depicted. In brief overview, at step 1050, the system or server 1000 may receive identification of the media channels to distribute a link to a resource. At step 1055, the server 1000 may generate different encoded links linked to the resource for the identified media channels. At step 1060, the server 1000 may assign a respective encoded link of the generated encoded links to each of the identified media channels. At step 1065, the server 1000 may determine, for each of the identified media channels, statistics related to the respective encoded link. At step 1070, the server 1000 may provide an output comprising at least a portion of the statistics.

More particularly, at step 1050, the server 1000 may receive identification of the media channels to distribute a link to a resource. The server 1000 may receive identification of multiple media channels including a first media channel 1050*a* and a second media channel 1050*b* to distribute a link to a resource 1040. The resource 1040 may have a resource URL 1045. In some embodiments, a client device may provide a request for generating an encoded link that is linked to a resource, for a media channel. In some embodiments, the client device may provide a request for generating an encoded link via web interface of the server 1000. In some embodiments, the client device may provide a request for generating an encoded link via the linking system API or applications 225 in the client device (see FIG. 2). The request for generating an encoded link may include identification of the media channel. That is, the server 1000 may receive identification of a media channel from a client device via web interface of the server 1000 or the linking system API or applications 225 in the client device (see FIG. 2). The identification of a media channel may include a URL of the media channel (e.g., "www.facebook.com" for the Facebook social media channel), application information of the media channel (e.g., the name of email client application for the email channel), or an identification number of the media channel (e.g., telephone number of a mobile phone for the SMS channel).

At step 1055, the server 1000 may generate different encoded links linked to the resource for the identified media channels. In some embodiments, the server 1000 may generate, via the encoded link generator 1015, a first encoded media channel link 1055a and a second encoded media channel link 1055b that are encoded by the server of the linking system 120 for the identified first media channel 1050a and second media channel 1050b, respectively. The first encoded media channel link 1055a and second encoded media channel link 1055b may be linked to the resource 1040. In some embodiments, responsive to a request for generating an encoded link for a media channel, the encoded link generator 1015 may retrieve the media channel IDs of the first and second media channels 1050a and 1050b. Next, the encoded link generator 1015 may generate the first and second encoded media channel links 1055a and 1055b via the encoded link generator 1015. The encoded link generator 1015 may then store in a data structure, the resource URL 1045 as original URL, the first encoded media channel link as encoded URL, and the media channel ID of the first media channel 1050a as media channel ID. Similarly, the encoded link generator 1015 may store in the encoding data structure, the resource URL 1045 as original URL, the second encoded media channel link as encoded URL, and the media channel ID of the second media channel 1050b as media channel ID. In this manner, the server 1000 can assign a respective encoded link of the generated first and second encoded media channel links 1055a and 1055b to each of the identified first and second media channels 1050a and 1050b.

At step 1060, the server 1000 may assign a respective encoded link of the generated encoded links to each of the identified media channels. In some embodiments, the server 1000 may assign a respective encoded link of the generated first and second encoded media channel links 1055a and 1055b to each of the identified first and second media channels 1050a and 1050b. In some embodiments, the server 1000 may assign the respective encoded link to each of the identified media channels by assigning the first encoded link 1055a to a social networking channel, the second encoded link 1055b to an SMS channel, and a third encoded link (not shown) to an email channel. For this assignment, the media channel data structure of the database 230 may store data describing a social networking channel, an SMS channel, and an email channel. For example, the Facebook social networking channel may be described in the media channel data structure as "10" as media channel ID, "social media" as channel category, "Facebook" as channel name, and "facebook.com" as channel domain. An email channel using the Google Gmail service may be described in the media channel data structure as "11" as media channel ID, "email" as channel category, "Gmail" as channel name, and "gmail.com" as channel domain. An SMS channel using a mobile phone may be described in the media channel data structure as "12" as media channel ID, "SMS" as channel category, and the telephone number of the mobile phone as channel name. In some embodiments, the SMS channel or email channel may have a source address that is not a URL. In this case, the channel domain field of such SMS channel or email channel may be set to a "Null" value in the media channel data structure.

In some embodiments, the media channels may include a first channel corresponding to a first domain and a second channel corresponding to a second domain. In some embodiments, the media channels may relate to respective multiple domains. Multiple domains may identify distinct network resources, such as computers, networks or services on the Internet. In some other embodiment, multiple domains may identify different administrative realms such as different countries, geographic locations, businesses or organizations. These various channel domains may be described using the channel domain field of the media channel data structure. In some other embodiment, the media channels may further include a first channel corresponding to a first advertisement of an advertiser and a second channel corresponding to a second advertisement of the advertiser. For example, the same business or company may utilize multiple media channels for different advertisements. These multiple media channels for the same business or company may be represented by setting, in the media channel data structure in the database 2300, the channel name field to different advertisements while setting the channel domain field to the same business or company.

At step 1065, the server 1000 may determine, via the traffic analyzer 1025 for each of the identified media channels 1050a and 1050b, statistics related to the respective encoded link. In some embodiments, the traffic analyzer 1025 may generate or calculate, for each media channel, a number of requests to access a particular resource that were received. For example, given the information on the first media channel 1050a and the resource 1040, the traffic analyzer 1025 may calculate the number of requests to access the resource 1040 via encoded links that was generated for the first media channel 1050a. For this calculation, in one embodiment, the traffic analyzer 1025 may retrieve all the encoded links created for the first media channel 1050a from the encoding data structure in the database 230. Next, with the retrieved encoded links, the traffic analyzer 1025 may calculate, from the user action data structure, the sum of the number of requests to access the resource 1040 via each of the retrieved encoded links to calculate the total number of requests to access the resource 1040 via any of the retrieved encoded links.

In some embodiments, the traffic analyzer 1025 may generate or calculate, for each media channel, a number of different source URLs from which requests to access the resource 1040 were received. For example, given the information on the first media channel 1050a and the resource 1040, the traffic analyzer 1025 may calculate the number of different source URLs from which requests to access the resource 1040 via encoded links for the first media channel 1050a were received. For this calculation, in one embodiment, the traffic analyzer 1025 may retrieve all the encoded links generated for the first media channel 1050a from the encoding data structure in the database 230. Next, with the retrieved encoded links, the traffic analyzer 1025 may count, from the source resource/channel URL field of the user action data structure, the number of different source URLs from which requests to access the resource 1040 via one of the retrieved encoded links were received.

In other embodiment, the server 1000 may identify, via the traffic analyzer 1025 for the resource 1040, a first statistic for each of the media channels, and aggregate each of the identified first statistics to generate an aggregate first statistic for the resource. For example, to calculate the aggregated total number of requests to access a particular resource via links encoded for a set of media channels, the traffic analyzer 1025 may sum or aggregate the total number of requests to access the resource 1040 via links encoded for each of the set of media channels. Similarly, to calculate the aggregated number of different source URLs from which requests to access the resource 1040 via links encoded for a set of media channels, the traffic analyzer 1025 may add the number of different source URLs from which requests to access the resource 1040 via links encoded for each of the set of media channels were received.

In some embodiments, the portion of the statistics may relate to a specific media channel that is any one of social networking channel, SMS channel and email channel. The media channel data structure in the database 230 according to an embodiment may store information relating to one of social networking channel, SMS channel and email channel. For example, the Facebook social networking channel may be described in the media channel data structure as "10" as media channel ID, "social media" as channel category, "Facebook" as channel name, and "facebook.com" as channel domain. An email channel using the Google Gmail service may be described in the media channel data structure as "11" as media channel ID, "email" as channel category, "Gmail" as channel name, and "gmail.com" as channel domain. An SMS channel using a mobile phone may be described in the media channel data structure as "12" as media channel ID, "SMS" as channel category, and the telephone number of the mobile phone as channel name. Therefore, using data stored in the media channel data structure, the encoded link generator 1015 may generate an encoded link for any one of social networking channel, SMS channel and email channel and store the encoded link in the encoding data structure. Moreover, using data stored in the media channel data structure and encoding data structure, the media channel identifier 1020 may identify user actions relating to encoded links encoded for any one of social networking channel, SMS channel, email channel, and store the information relating to the identified user actions in the user action data structure. Similarly, using data stored in the media channel data structure and encoding data structure, the media channel identifier 1020 may identify global actions relating to encoded links encoded for any one of social networking channel, SMS channel and email channel and store the information relating to the identified global actions in the global action data structure. Therefore, using data stored in the four data structures relating to encoded links encoded for any one of social networking channel, SMS channel and email channel, the traffic analyzer 1025 may generate channel-specific or aggregate statistics, a portion of which relates to a specific media channel that is any one of social networking channel, SMS channel and email channel.

In some embodiments, the server 1000 may rank the media channels based on their respective statistics. For example, after calculating, for each media channel, the number of requests to access the resource 1040 that were received, the traffic analyzer 1025 may rank the media channels based on their respective number of requests to access the resource 1040 that were received. For another example, after calculating, for each media channel, the number of different source URLs from which requests to access the resource 1040 were received, the traffic analyzer 1025 may rank each of the media channels based on their respective number of different source URLs from which requests to access the resource 1040 were received, the traffic analyzer 1025.

In some embodiments, referring to FIG. 10A, the server 1000 may identify via the media channel identifier 1020, a common source URL across multiple media channels. In some embodiments, for a particular resource, the media channel identifier 1020 may identify whether there exists a common source URL across all or a subset of the media channels from which requests to access the particular resource were received. In some other embodiments, the media channel identifier 1020 may also identify whether there exists a common source URL across all or a subset of the media channels from which requests to access any resource via encoded links were received. The identified common source URL can be effectively used by a user, e.g., advertiser, by increasing the sharing of links on the identified common source URL.

At step 1070, the server 1000 may provide a media channel statistics output 1060 including at least a portion of the statistics. In some embodiments, the server 1000 may provide, via the traffic analyzer 1025, a media channel statistics output 1060 including at least a portion of the statistics. For example, the traffic analyzer 1025 may provide the media channel statistics output 1060 by generating text representation of the statistics (e.g., plain text or table format) on a web page. In this manner, for example, a table format output may be provided representing, for each media channel, the number of requests to access the resource 1040 and the number of different source URLs from which requests to access the resource 1040 were received, along with their respective ranks. In some other embodiment, the traffic analyzer 1025 may generate graphical representation of the statistics, e.g., bar graphs, pie charts, line graphs and histogram. In this manner, for example, a bar graph or pie chart or histogram output may be provided representing, for each media channel, the number of requests to access the resource 1040 or the number of different source URLs from which requests to access the resource 1040 were received.

In some embodiments, the server 1000 may provide, via the traffic analyzer 1025, a media channel statistics output 1060 including at least a portion of the statistics. For example, the traffic analyzer 1025 may provide the media channel statistics output 1060 by generating text representation of the statistics (e.g., plain text or table format) on a web page. In this manner, for example, a table format output may be provided representing, for each media channel, the number of requests to access the resource 1040 and the number of different source URLs from which requests to access the resource 1040 were received, along with their respective ranks. In some other embodiment, the traffic analyzer 1025 may generate graphical representation of the statistics, e.g., bar graphs, pie charts, line graphs and histogram. In this manner, for example, a bar graph or pie chart or histogram output may be provided representing, for each media channel, the number of requests to access the resource 1040 or the number of different source URLs from which requests to access the resource 1040 were received.

In some embodiments, the server 1000 may provide the media channel statistics output 1060 by providing statistics relating to performance of an SMS channel or an email channel. In one embodiment, performance of an SMS channel or an email channel may relate to performance in advertising a particular resource to the public via the SMS or email channels. Such advertisement performance may be measured by the number of requests to access the particular resource or the number of different source URLs from which requests to access the particular resource were received. For example, one performance metric of an SMS channel may be its rank among multiple media channels or its relative volume compared to those of other media channels with respect to the number of requests to access the resource 1040 or the number of different source URLs from which requests to access the resource 1040 were received. The top-ranked media channels can be effectively used for a user, e.g., advertiser, by increasing the sharing or forwarding of links across the top-ranked media channels.

K. Systems and Methods for Analyzing Online Content Audience via Encoded Links

Typically, a website can only track activities of visitors based on actions the visitors perform on the website but are unable to track the activities of visitors on other websites. The present solution can track the activities of visitors across multiple websites that utilize encoded links encoded by a linking system, which can collect data about the activities of visitors across the multiple websites that individual web sites would otherwise be unable to gather. The present solution can gather intelligence about an audience of online content published by online content publishers as well as provide metrics based on an analysis of the collected activities of visitors across the multiple websites. Based on the collected data, the present solution can identify correlations between different websites/topics and content. This information may be useful to websites or online content publishers to understand the types of content their web site visitors are interested in at an aggregate level and at an individual level.

The present solution may include a content audience analysis system that can deploy a cookie when a user of a client device clicks on a link encoded by the content audience analysis system and track or monitor the user's online activity as the user interacts (e.g., clicks) on other encoded by the content audience analysis system on different resources (e.g., source URLs) corresponding to different websites or domains. The content audience analysis system can aggregate, for a cookie, all interactions (e.g., clicks) on links encoded by the linking system 120 (described in FIGS. 2A-10B) performed by the user. The content audience analysis system can further aggregate, for a plurality of cookies, all or portion of interactions (e.g., clicks) on links encoded by the content audience analysis system performed by the users corresponding to the cookies. With this configuration, the content audience analysis system may determine, via cookies assigned to client devices of users, for each of the online content publishers for which the content audience analysis system has encoded at least one link to a resource of the online content publisher, other resources, websites, visited by users that interacted with the at least one link.

Further, the content audience analysis system can analyze content at each of the resources on which the encoded links are displayed as well as the resources to which the encoded links are linked. The content audience analysis system can classify the resources to one or more content types and based on the classification, provide online content publishers additional information about the types of content their visitors are accessing. This can allow online content publishers to better understand their audiences and thereby, upload content on their website that caters to their audiences or to audiences they wish to bring to their website.

Figure 11A:
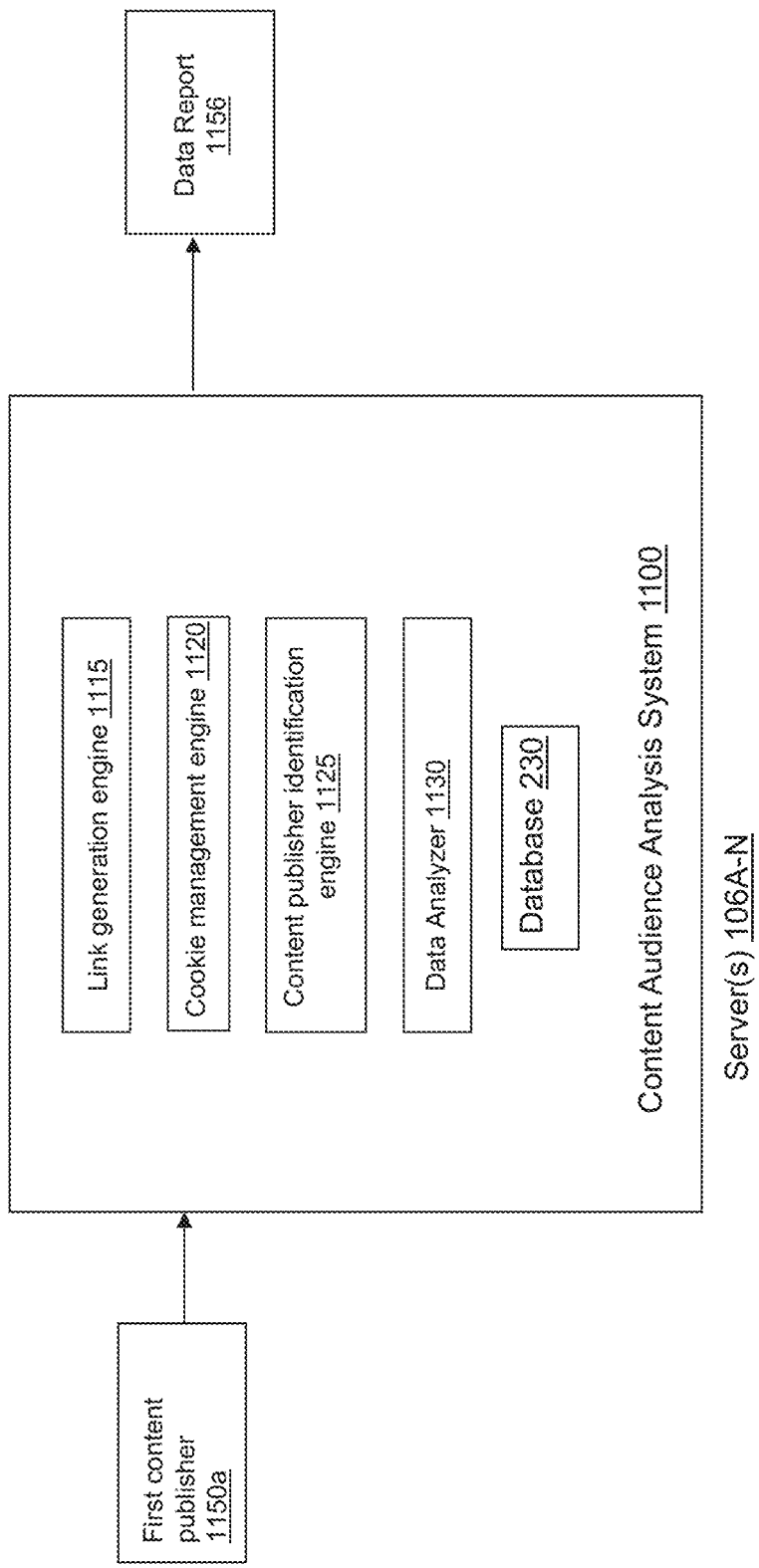
FIG. 11A is a diagram of an embodiment of a system to analyze online content audience via encoded links.

Referring to FIG. 11A, an embodiment of a content audience analysis system 1100 for analyzing online content audience via encoded links is depicted. In brief overview, the content audience analysis system 1100 can be a part of the linking system 120 or may include components and functionality of the linking system 120, as shown in FIGS. 2A-10B. The content audience analysis system 1100 may include a link generation engine 1115, a cookie management engine 1120, a content publisher identification engine 125 and a data analyzer 1130. The content audience analysis system 1100 can be a part of a linking system, such as the linking system 120 described herein with respect to FIGS. 2A-11B.

The link generation engine 1115 can include one or more executable instructions, code, scripts, programs, or modules configured to receive requests to generate encoded links. In some implementations, the link generation engine 1115 can receive a request from a client device to generate an encoded link. The request can include a resource identifier that is associated with a resource or content for which to generate the link. For instance, a content publisher, via a client device of the content publisher, can transmit a request to the link generation engine 1115 to generate a link to a particular resource. The particular resource can be a resource hosted on a server of the content publisher (or accessible via a domain of the content publisher), or in some implementations, a resource hosted on a server of any other content publisher or accessible via any other domain. The link generation engine 1115 can generate the encoded link. The encoded link corresponds to a resource maintained by the content audience analysis system 1100 and configured such that when a request to access the encoded link is received by the content audience analysis system 1100, the content audience analysis system 1100 can transmit a response to the client device requesting access redirecting the client device to the resource to which the encoded link is linked. The content audience analysis system 1100 is configured to store data associated with the request and can use the information associated with the request to track online activity, as will be described herein. In some implementations, the link generation engine 1115 can include one or more components of other engines, modules, or components described with respect to the linking system 120 described with respect to FIGS. 2A-10B.

The link generation engine 1115 or the content audience analysis system 1100 can maintain a plurality of encoded links and resources associated with the encoded links that are configured to cause client devices requesting to access the encoded links to be redirected to other resources to which the encoded links are linked. In some implementations, the content audience analysis system 1100 can maintain a database, such as database, that can be configured to maintain a mapping of encoded links to resources to which to redirect client devices accessing the encoded links.

The cookie management engine 1120 can include one or more executable instructions, code, scripts, programs, or modules configured to manage cookies of the content audience analysis system 1100 as well as data corresponding to the cookies. In some implementations, the cookie management engine 1120 can be configured to assign cookies to client devices responsive to receiving a request to access an encoded link generated by the link generation engine 1115. In some implementations, the cookie management engine 1120 can be configured to determine, responsive to the content audience analysis system 1100 receiving a request to access an encoded link, if the request includes a cookie of the content audience analysis system 1100. In some implementations, the cookie management engine 1120 can assign the client device a cookie of the content audience analysis system 1100 responsive to determining that the request does not include a cookie of the content audience analysis system 1100.

The cookie management engine 1120 can generate a cookie and assigns the generated cookie to the client device. This cookie can be included in the response to the request and can be stored on the client device to which the cookie is assigned. In some implementations, the cookie can be specific to a browser of the client device from which the request to access the encoded link was received. Once a cookie has been assigned to a client device and transmitted to the client device, the client device can be configured to include the cookie in future requests to access any encoded link generated by the content audience analysis system 1100.

The cookie management engine 1120 can be configured to receive a plurality of interactions with encoded links generated by the content audience analysis system 1100 and linked to resources of one or more content publishers. In some implementations, each time users of client devices access an encoded link generated by the content audience analysis system 1100, the cookie management engine 1120 can identify a cookie associated with the client device from the request.

The cookie management engine 1120 can be configured to store and maintain activity data corresponding to requests associated with a particular cookie in a data log corresponding to the cookie. The activity data can include i) an identification of the resource on which the encoded link was presented when accessed (source resource URL); ii) an identification of the resource to which the encoded link is linked (destination resource URL); iii) time/date of access; iv) identity of content publisher of source resource URL; v) identity of content publisher of destination resource URL; vi) type/topic of content included in source resource; vii) type/topic of content included in destination resource, among others. In some implementations, a resource analysis module (not shown) can be configured to analyze each of the source resource and the destination resource to determine a type of content included in the source resource and the destination resource. In some implementations, the resource analysis module (not shown) can be configured to analyze each of the source resource and the destination resource to determine a topic of the content included in the source resource and the destination resource. Examples of topics can include sports, music, news, entertainment, shopping, electronics, etc., and in some implementations, the granularity of the topics may be more specific, for example, tennis, rap music, political news, among others.

The cookie management engine 1120 can be configured to receive a plurality of interactions with encoded links generated by the content audience analysis system 1100 and linked to resources of a first content publisher. In some implementations, the cookie management engine 1120 can receive a request from a first content publisher to provide data corresponding to visitors accessing resources of the first content publisher via encoded links generated by the link generation engine 1115 of the content audience analysis system 1100. In some implementations, the cookie management engine 1120 can generate, for the first content publisher, data corresponding to visitors accessing resources of the first content publisher via encoded links generated by the link generation engine 1115 of the content audience analysis system 1100.

In some implementations, the cookie management engine 1115 can be configured to identify a plurality of encoded links generated by the content audience analysis system 1100 that are linked to resources of a first content publisher. The cookie management engine 1115 can identify the plurality of encoded links by performing a lookup in the database 230 to identify each of the encoded URLs that are linked to resources of the first content publisher. For instance, if the first content publisher is www.example1.com, then the cookie management engine 1115 can identify the resources that are associated with the website www.example1.com by performing a lookup for all resources that may correspond to the domain example1.com.

In some implementations, the cookie management engine 1115 can be configured to identify a plurality of interactions with each of the plurality of encoded links generated by the content audience analysis system 1100 that are linked to resources of the first content publisher. These interactions can correspond to clicks or other types of actions that result in the content audience analysis system 1100 receiving a request to access an encoded link of the plurality of encoded links. In some implementations, the cookie management engine 1115 can be configured to identify the plurality of interactions with each of the plurality of encoded links by performing a lookup in one or more data structures stored in the database 230 using the encoded links. For instance, the cookie management engine 1115 can access a data structure that stores entries corresponding to interactions to access encoded links. The cookie management engine 1115 can perform a lookup for all interactions that correspond to encoded links generated by the content audience analysis system 1100 that are linked to resources of a first content publisher.

The cookie management engine 1115 can be configured to identify, from the plurality of interactions, a plurality of cookies of the content audience analysis system 1100 assigned to unique client devices. In some implementations, the cookie management engine 1115 can be configured to identify, for each interaction of the plurality of interactions, a cookie of a client device from which the request to access an encoded link generated by the content audience analysis system 1100 that is linked to a resource of the first content publisher was received.

The content publisher identification engine can include one or more executable instructions, code, scripts, programs, or modules configured to identify one or more content publishers that include at least one resource that is linked to an encoded link generated by the link generation engine 1115 and that has been accessed via the encoded link by one of the cookies identified by the cookie management engine 1115. In particular, the content publisher identification engine can be configured to identify second content publishers having resources that were accessed by the client devices corresponding to cookies identified by the cookie management engine 1115 via encoded links generated by the link generation engine 1115.

After the cookie management engine 1115 identifies a cookie that is associated with a client device that has requested to access a link encoded by the link generation engine 1115 that is linked to a resource of the first content publisher, the content publisher identifier engine 1125 can identify one or more second content publishers that have resources that have been accessed by the client device corresponding to the cookie. To do so, in some implementations, the content publisher identifier engine 1125 can access a data structure that includes one or more entries corresponding to requests to access content via one or more encoded links generated by the link generation engine 1115. The content publisher identifier engine 1125 can perform a lookup in the data structure for entries corresponding to the identified cookie associated with the client device that has requested to access a link encoded by the link generation engine 1115 that is linked to a resource of the first content publisher. Responsive to identifying the entries of the identified cookie, the content publisher identifier engine 1125 can be configured to identify, from the identified entries, one or more content publishers different from the first content publisher whose resources have been accessed by the client device via encoded links generated by the link generation engine 1115.

The content publisher identifier engine 1125 can be configured to aggregate, for each cookie that visited a resource of the first content publisher via a link generated by the link generation engine 1115, a list of content publishers having resources also visited by the cookie via one or more links generated by the link generation engine 1115. In some implementations, the content publisher identifier engine 1125 can be configured to determine, for each content publisher of the list of content publishers, a type of content published by the content publisher or a topic of the content included in the resource of the content publisher accessed by the cookie. The content publisher identifier engine 1125 can be configured to store, in a data structure, for each cookie associated with a client device, information relating to the content publishers visited by the client device, information related to topics of content accessed by the client device, among others.

The content publisher identifier engine 1125 can be configured to aggregate, for the first content publisher, using the techniques deployed herein to determine information about a particular cookie, information pertaining to activities of a plurality of cookies that accessed a resource of the first content publisher via a link generated by the link generation engine 1115.

The content publisher identifier engine 1125 can be configured to then provide, to the first content publisher, data corresponding to the identified second content publishers having resources accessed by client devices that also accessed the resources of the first content publisher.

Figure 11C:
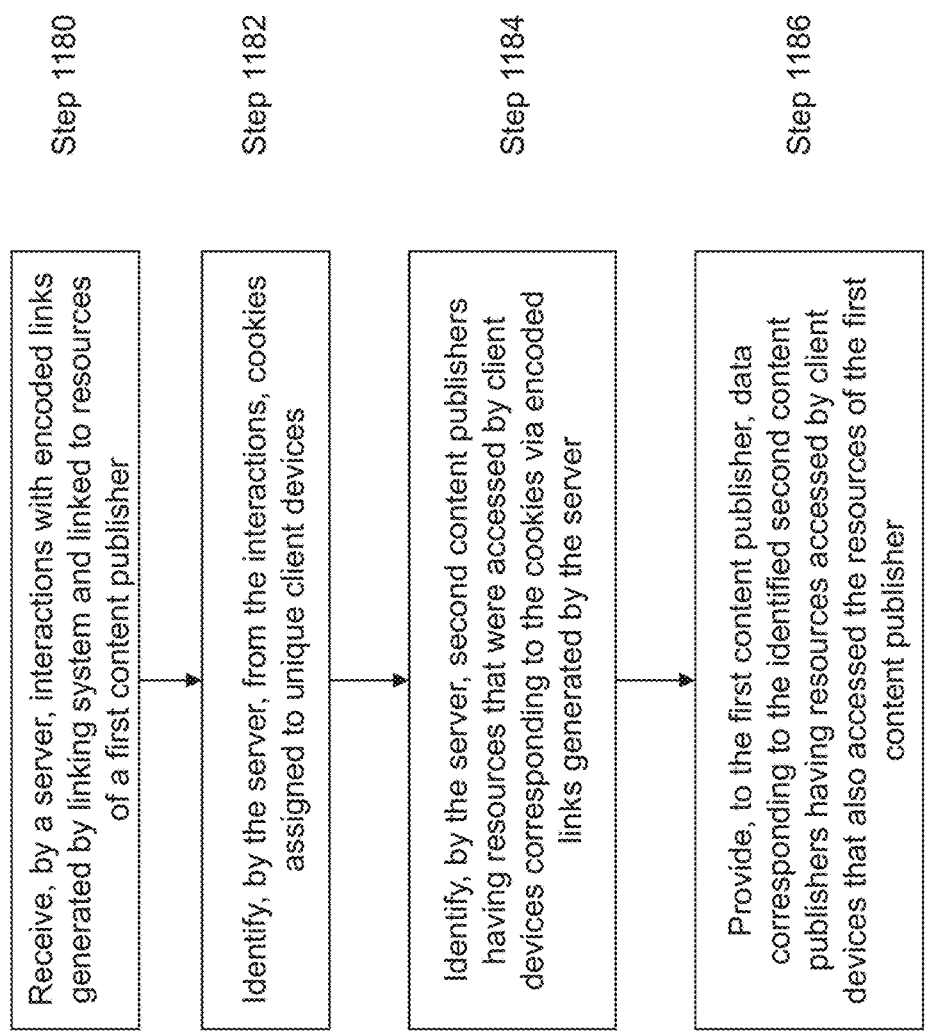
FIG. 11C is a flow diagram of an embodiment of a method for analyzing online content audience via encoded links.

Referring to FIGS. 11A, 11B and 11C, the cookie management engine 1120 may be further configured to store the plurality of requests to access encoded links in a data structure (e.g., a resource requests table 1160 in the database 230). In some embodiments, the data structure includes data identifying a cookie provided to a client device (e.g., a field of cookie ID 1161), a source URL (e.g., a data field of source resource 1162) of a source resource on which the encoded link was presented, the identity of the content publisher of the source resource (e.g., a data field of source content publisher ID 1163), the destination URL of a destination resource accessed via the encoded link (e.g., a data field of destination resource 1164), the identity of the content publisher of the destination resource (e.g., a data field of destination content publisher ID 1165. In some embodiments, the data structure may include data identifying the timestamp of each of the requests (e.g., a field of timestamp 1166).

Referring to FIG. 11B, the database 230 may include any information or data associated with clicks or other activity on one or more encoded links generated by the link generation engine 1115. The database 230 may include data collected, tracked, and analyzed either statically or in real-time, and associated with the click. In some embodiments, the database 230 may include multiple data structures, e.g., multiple relational database tables. For example, the database 230 may include a resource requests data structure including data related to requests from client devices to access a resource via encoded links generated by the link generation engine 1115. In some embodiments, the resource request data structure may be implemented as the resource requests table 1160 as shown in FIG. 11B. The resource requests table 1160 may store one or more entries, each of which corresponds to a request from a client device for an online resource. The resource requests table 1160 may be defined as multiple attributes or fields, for example, the cookie ID 1161, the source resource field 1162, the source content publisher ID field 1163, the destination resource 1164, the destination content publisher ID field 1165, and the timestamp 1166. The cookie ID field 1161 may identify a cookie associated with the client device from which each request is received. In some embodiments, the database 230 may include a cookie data structure (e.g., a cookie table) including data related to each cookie so that the cookie ID field 1161 can be associated with an ID field of the cookie table. The source resource field 1162 may identify a source resource (or its URL) on which the encoded link was presented. The source content publisher ID field 1163 may identify a content publisher (e.g., a person, company, organization or any entity that can publish online resources) which published the source resource identified by the source resource field 1162. The destination resource field 1164 may identify a destination resource (or its URL) to which the encoded link was linked. The destination content publisher ID field 1165 may identify a content publisher (e.g., a person, company, organization or any entity that can publish online resources) which published the destination resource identified by the destination resource field 1162. In some embodiments, the timestamp field 1166 may identify the date and time when each of the requests was made by a client device.

In some embodiments, referring to FIG. 11B, the database 230 may include a content publisher data structure (e.g., a content publisher table 1167) including data associating a plurality of resources (e.g., a field of resource 1168) with their corresponding content publishers (e.g., a field of content publisher ID 1169) so as to identify a content publisher for a given resource, e.g., a source resource or a destination resource in the resource requests table 1160. In some embodiments, the content publisher table 1167 may include data related to information on each content publisher, for example, name of organization, geographic area, industry, product, and contact information, etc. In some embodiments, the content publisher table 1167 may be populated with data from external sources, e.g., an internet domain name directory or search services. In some embodiments, referring to FIG. 11B, a single content publisher may have more than one resources. For example, the two resources "dogs.com" and "cats.com" may be published by a single organization. In some embodiments, given a source resource and a destination resource, the corresponding source content publisher ID field 1163 and destination content publisher ID field 1165 may be populated in the resource requests table 1160 using the data stored in the content publisher table 1167.

Referring to FIG. 11A, the content audience analysis system 1100 may comprise an application, program, library, process, service, script, task or any type and form of executable instructions executable or executing on a device. The content audience analysis system 1100 may operate on a plurality of servers 106A-106N. The content audience analysis system 1100 may include application programming interfaces, such as web services, XML, Jason (JSON), etc. for accessing the functionality, operations and/or data of the linking system. The content audience analysis system 1100 may include one or more modules, components or executables for providing these APIs and performing the function and operations described herein. For example, in some embodiments, the content audience analysis system 1100 may include components like the link generation engine 1115, cookie management engine 1120, content publisher identification engine 1125 and data analyzer 1130. Each of the components may comprise an application, program, library, service, script, process, task or any type and form of executable instructions executing or executable on a device. The modules, components or executables of the content audience analysis system may operate in a client/server architecture. The modules, components or executables of the content audience analysis system may operate in a distributed manner across multiple devices.

In some embodiments, an application (like the application 225 in FIG. 2) may execute on the client that communicates with or interfaces to the content audience analysis system to encode and decode URLs. In some embodiments, an application may include any portion of the content audience analysis system. In some embodiments, the application may be a mobile application, generally referred to as an app, executing on a mobile device, such as a smart phone or tablet device. In some embodiments, the application may include an add-on, extension, script, ActiveX control, applet, widget or other types and forms of executable instructions executed by or in a browser. In some embodiments, the application may include, use or call one or more APIs to the linking system. The application may be programmed to programmatically integrate the content audience analysis system, or interface thereto, into the application. Via the one or more APIs, the application may access data from the content audience analysis system. Via the one or more APIs, the application may perform or execute any of the functions or operations of the content audience analysis system. Via the one or more APIs, the application may perform or execute any of the systems and methods described herein.

Referring to FIGS. 11A and 11B, in some embodiments, the cookie management engine 1120 receives from a first client device, a plurality of interactions (e.g., clicks) on encoded links that are linked to resources of the first content publisher 1150a and presented on respective source resources. For example, referring to FIG. 11B, the plurality of interactions from the first client device may include a first click on an encoded link linked to "mtv.com" that was presented on "yahoo.com", a second click on the encoded link linked to "mtv.com" that was presented on "facebook.com", and a third click on an encoded link linked to "abc.com" that was presented on "facebook.com." From the plurality of interactions, the cookie management engine 1120 may identify a cookie of the content audience analysis system 1100 assigned to the first client device. For example, the cookie management engine 1120 may identify the cookie assigned to the first client device and retrieve the ID of the cookie (e.g., C1) by looking up the database 230 with information of the first client device. Upon receiving of the plurality of interactions from the first client device, the cookie management engine 1120 may also receive the access requests corresponding to the interactions to access the encoded links. In some embodiments, the cookie management engine 1120 may store data corresponding to the requests received from the first client device. For example, referring to FIG. 11B, the cookie management engine 1120 may identify the content publisher IDs of the resource "mtv.com" and two source resources "yahoo.com" and "facebook.com" as P1, P3 and P4, respectively using the content publisher table 1167. The cookie management engine may then store three database tuples having cookie ID "C1" corresponding to the three requests (and the first, second and third clicks) in the resource requests table 1160 (see FIG. 11B).

Similarly, referring to FIGS. 11A and 11B, the cookie management engine 1120 can receive from a second client device, a plurality of interactions (e.g., clicks) on encoded links that are linked to resources of the first content publisher 1150a and presented on respective source resources. For example, referring to FIG. 11B, the plurality of interactions from the second client device may include a fourth click on an encoded link linked to "mtv.com" that was presented on "dogs.com", and a fifth click on the encoded link linked to "mtv.com" that was presented on "cats.com." From the plurality of interactions, the cookie management engine 1120 may identify a cookie of the content audience analysis system 1100 assigned to the second client device and retrieve the ID of the cookie (e.g., C2) by looking up the database 230 with information of the second client device. Upon receiving of the plurality of interactions from the second client device, the cookie management engine 1120 may also receive the access requests corresponding to the interactions to access the encoded links. In some embodiments, the cookie management engine may store data corresponding to the requests received from the second client device. For example, referring to FIG. 11B, the cookie management engine may identify the content publisher IDs of the resource "mtv.com" and two source resources "dogs.com" and "cats.com" as P1, P5 and P5, respectively using the content publisher table 1167. The cookie management engine may then store two database tuples having cookie ID "C2" corresponding to the two requests (and the fourth and fifth clicks) in the resource requests table 1160 (see FIG. 11B).

In some embodiments, the content publisher identification engine 1125 may identify second content publishers having resources that were accessed by the same client devices corresponding to the plurality of cookies. In some embodiments, the identification may be performed by issuing a database query to the database 230, e.g., SQL SELECT statement, on the resource requests table 1160. For example, by selecting all tuples having the cookie ID "C1" from the resource requests table 1160, the identification engine 1125 may identify two content publishers, those with content publisher ID "P1" and "P2", having the resources "mtv.com" and "abc.com" that were accessed by the same first client device corresponding the cookie ID "C1". In some embodiments, the content publisher identification engine 1125 may provide, to a first content publisher, data corresponding to identified content publishers having resources accessed by the same client devices that also accessed resources of the first content publisher. For example, by selecting all tuples having the cookie ID "C1" and not having the destination content publisher ID "P1", the content publisher identification engine 1125 may provide, to the first content publisher with ID "P1", data corresponding to the identified content publishers (e.g., the content publisher with ID "P2") having resources (e.g., "abc.com") accessed by the same first client device that also accessed resources (e.g., "mtv.com") of the content publisher with ID "P1". In addition, since the content audience analysis system 1100 also identifies the source resource on which the encoded link was presented when the access request was received, the content publisher identification engine 1125 can identify, for the first content publisher P1 (mtv.com), the second content publishers yahoo.com (P3), facebook.com (P4), and dogs- .com (P5) as publishers having resources that were visited by the first client device corresponding to the cookie ID C1. In some implementations, the link generation engine 1115 may generate encoded links linked to resources of a particular content publisher so that the particular content publisher can be identified from the encoded links. In some embodiments, the link generation engine 1115 may encode an URL into an encoded URL that comprises a domain name configured, specified or identified by the particular content publisher. In some embodiments, the link generation engine 1115 may encode an URL into an encoded URL that comprises a content publisher ID (see the content publisher table 1167 in FIG. 11B) identifying the particular content publisher. For example, referring to FIG. 11B, the link generation engine 1115 may encode an URL of the resource "dogs.com" into an encoded URL that comprises content publisher ID "5". Similarly, the link generation engine 1115 may encode an URL of the resource "cats.com" into an encoded URL that comprises content publisher ID "5" because both "dogs.com" and "cats.com" belong to the same content publisher.

In some embodiment, referring to FIGS. 11A and 11B, the content publisher identification engine 1125 may receive, from the first content publisher 1150a, a request to identify content publishers that have resources that have been accessed by client devices that also accessed the first content publisher 1150a. In some embodiments, the first content publisher 1150a may use an application including a browser to send a resource identification request to the content publisher identification engine 1125. In some embodiments, the application may be a mobile application, generally referred to as an app, executing on a mobile device, such as a smart phone or tablet device. In some embodiments, the application may include an add-on, extension, script, ActiveX control, applet, widget or other types and forms of executable instructions executed by or in a browser. In some embodiments, the application may include, use or call one or more APIs to the content audience analysis system 1100. The application may be programmed to programmatically integrate the content audience analysis system 1100, or interface thereto, into the application. Via the one or more APIs, the application may access data from the content audience analysis system 1100. Via the one or more APIs, the application may perform or execute any of the functions or operations of the content audience analysis system 1100.

Via the one or more APIs, the application may perform or execute any of the systems and methods described herein. In some embodiments, responsive to the resource identification request from a particular content publisher, the content publisher identification engine 1125 may identify content publishers that have resources that have been accessed by client devices that also accessed the particular content publisher. In some embodiments, for example, referring to FIG. 11B, the content publisher identification engine 1125 may identify content publishers that have resources that have been accessed by client devices that also accessed the (destination) content publisher with ID "P1", by first selecting data in the cookie ID field 1161 of all tuples having "P1" in the destination content publisher field. Next, responsive to identification of client devices with cookie IDs "P1" and "P2" as a result of the selection, the content publisher identification engine 1125 may further select data in the destination content publisher ID field 1165 of all tuples having "C1" or "C2" in the cookie ID field. Next, as a selection result, the content publisher identification engine 1125 may identify two destination content publishers with IDs "P1" and "P2". Finally, the content publisher identification engine 1125 may identify the content publisher with ID "P2" as a content publisher (other than the content publisher with ID "P1") that has resources that have been accessed by the client devices that also accessed the (destination) content publisher with ID "P1".

In some embodiments, referring to FIG. 11A, the content audience analysis system 1100 may receive a plurality of requests to access destination resources of a plurality of content publishers via interactions with encoded links linked to the destination resources. In some embodiments, the content audience analysis system 1100 may store, for each cookie of the plurality of cookies, in memory, data indicating i) the destination resources of the plurality of content publishers accessed by the client device of the cookie, ii) the source resources on which encoded links linked to the resources accessed by the client device of the cookie; and iii) second resources accessed by the client device of the cookie. For example, in some embodiments, referring to FIG. 11B, the server may store in memory (e.g., as a data report 1156), for the cookie with ID "C1", data indicating i) the destination resources of the plurality of content publishers accessed by the client device of the cookie (e.g., "mtv.com"), ii) the source resources on which encoded links linked to the resources accessed by the client device of the cookie (e.g., "yahoo.com" and "facebook.com"), and iii) second resources accessed by the client device of the cookie (e.g., "abc.com"). Similarly, in some embodiments, referring to FIG. 11B, the server may store in memory (e.g., as the data report 1156), for the cookie with ID "C2", data indicating i) the destination resources of the plurality of content publishers accessed by the client device of the cookie (e.g., "mtv.com"), ii) the source resources on which encoded links linked to the resources accessed by the client device of the cookie (e.g., "dogs.com" and "cats.com"), and iii) second resources accessed by the client device of the cookie (e.g., Null for the cookie with ID "C2").

In some embodiments, the server may provide to a content publisher of the plurality of content publishers (e.g., the content publisher with ID "P1"), statistics derived from the stored data. For example, for providing to the content publisher with ID "P1", the statistics may include i) the number of unique source resources or corresponding content publishers on which encoded links linked to the destination resources of the content publisher with ID "P1" were presented (e.g., four unique source resources—"yahoo.com", "facebook.com", "dogs.com" and "cats.com"); ii) the most frequent source resource on which encoded links linked to the destination resources of the content publisher with ID "P1" were presented; iii) the most frequent content publisher having resources on which encoded links linked to the destination resources of the content publisher with ID "P1" were presented (e.g., the most frequent content publisher having source resources is the content publisher with ID "P5" having two source resources "dogs.com" and "cats.com"; and iv) the number of other content publishers that are accessed by client devices that also accessed destination resources of the content publisher with ID "P1" (e.g., there is only one other content publisher (the one with ID "P2") that is accessed by the same client device(s) that also accessed destination resources of the content publisher with ID "P1").

In some embodiments, referring to FIG. 5A, the phrase list 522 and keyword extractor 515 may be used to extract a topic based on the content included in a destination resource. Referring to FIG. 5A, the phrases list 522 may comprise any data and information identifying a predetermined set of phrases and/or keywords. The phrases list may comprise a dictionary. The phrases list may comprise an ontology. The phrases list may comprise an enumerated list of phrases and/or keywords. The phrases list may comprise an enumerated list of phrases and/or keywords ranked in order of priority or otherwise having an identified priority. The phrases list may comprise an enumerated list of phrases and/or keywords ordered based on ranking or otherwise having an identified ranking. The phrases list may comprise an enumerated list of phrases and/or keywords with assigned weights or weighting. The phrases list may identify a predetermined list of topics, interests or subject matter. The phrases list may identify a predetermined set of keywords related to or making up a topics, interests or subject matter. The phrases list may be generated from a third-party source, such as a web-site or URL. The phrases list may be generated by the trending engine based on a count of phrases and/or keywords identified in the predetermined list of web-sites. The phrases list may be generated from previous versions of the phrases list. The phrases list may be generated based on learning or intelligence of the trending engine.

Referring to FIGS. 5A and 11A, the keyword extractor 515 may identify keywords or topics from a predetermined set or list of destination resources (e.g., the first resource 1140a and the second resource 1140b). In some embodiments, the keywords or topics identified by the keyword extractor 515 may be a subset of the phrases list. In some embodiments, the keyword extractor identifies keywords from a predetermined set or list of destination resources on a predetermined frequency. In some embodiments, the keyword extractor identifies keywords from a predetermined set or list of destination resources responsive to an event, such as a user request. In some embodiments, the keyword extractor operates responsive to a click-stream while identifying keywords from a predetermined set or list of destination resources.

In some embodiments, the server may determine, for a destination resource of the destination resources, a topic based on the content included in the destination resource using the phrases list 522 or the keyword extractor 515. In some embodiments, the server may prepare the phrases list 522, and then determine for a destination resource, topics or keywords based on the content of the destination resource by extracting the topics or keywords from the content of the destination resource using the keyword extractor 515. In some embodiments, the server may generate a list including one or more of the second resources that also relate to each of the determined keywords or topics. For example, referring to FIG. 11B, the server may determine a topic or keyword "music" from the content of the destination resource "mtv.com" using the keyword extractor 515. The server may also generate a list including the second (destination) resource "abc.com" that also relates to the determined topic or keyword "music."

In some embodiments, referring to FIGS. 11A and 11B, the system 1100 may provide, to a particular content publisher of the plurality of content publishers, a list including one or more domains corresponding to the resources accessed by client devices that also accessed resources of the particular content publishers. For example, referring to FIG. 11B, the server may provide, to the content publisher with ID "2", a list including one or more domains (e.g., "mtv.com") corresponding to the resource "mtv.com" accessed by the client device of the cookie ID "1" that also accessed the resource "abc.com" of the content publisher with ID "2". Similarly, referring to FIG. 11B, the server may provide, to the content publisher with ID "1", a list including one or more domains (e.g., "mtv.com") corresponding to the resource "abc.com" accessed by the client device of the cookie ID "1" that also accessed the resource "mtv.com" of the content publisher with ID "1".

In some embodiments, referring to FIGS. 11A and 11B, the system 1100 may provide, to a first content publisher of the plurality of content publishers, a number of cookies of the linking system that accessed a first resource of the first content publisher and a second resource of a second content publisher of the plurality of content publishers. For example, the server may provide, to the content publisher with ID "P1", the number of distinct cookies of the linking system that accessed both the resource "mtv.com" of the content publisher with ID "P1" and the resource "abc.com" of the content publisher with ID "P2" (e.g., the number of distinct cookies accessing both of the resources "mtv.com" and "abc.com" is 1—the cookie with ID "C1").

Referring now to FIG. 11C, an embodiment of a method for analyzing online content audience is depicted. In brief overview, at step 1180, the system or server 1100 may receive interactions with encoded links generated by linking system and linked to resources of a first content publisher. At step 1182, the server may identify from the interactions, cookies assigned to unique client devices. At step 1184, the server may Identify second content publishers having resources that were accessed by client devices corresponding to the cookies via encoded links generated by the server. At step 1186, the server may provide, to the first content publisher, data corresponding to the identified second content publishers having resources accessed by client devices that also accessed the resources of the first content publisher.

More particularly, referring to FIG. 11C, at step 1180, the system or server 1100 may receive interactions with encoded links generated by linking system and linked to resources of a first content publisher. In some embodiments, referring to FIGS. 11A and 11B, the cookie management engine 1120 receives from a first client device, a plurality of interactions (e.g., clicks) on encoded links that are linked to resources of the first content publisher 1150a and presented on respective source resources. For example, referring to FIG. 11B, the plurality of interactions from the first client device may include a first click on an encoded link linked to "mtv.com" that was presented on "yahoo.com", a second click on the encoded link linked to "mtv.com" that was presented on "facebook.com", and a third click on an encoded link linked to "abc.com" that was presented on "facebook.com." From the plurality of interactions, the cookie management engine 1120 may identify a cookie of the linking system 120 assigned to the first client device. For example, the cookie management engine 1120 may identify the cookie assigned to the first client device and retrieve the ID of the cookie (e.g., 1) by looking up the database 230 with information of the first client device, e.g., an IP address of the first client device. Upon receiving of the plurality of interactions from the first client device, the cookie management engine 1120 may also receive the access requests corresponding to the interactions to access the encoded links. In some embodiments, the cookie management engine may store data corresponding to the requests received from the first client device. For example, referring to FIG. 11B, the cookie management engine may identify the content publisher IDs of the resource "mtv.com" and two source resources "yahoo.com" and "facebook.com" as 1, 3 and 4, respectively using the content publisher table 1167. The cookie management engine may then store three database tuples having cookie ID "1" corresponding to the three requests (and the first, second and third clicks) in the resource requests table 1160 (see FIG. 11B).

Similarly, in some embodiments, referring to FIGS. 11A and 11B, the cookie management engine 1120 receives from a second client device, a plurality of interactions (e.g., clicks) on encoded links that are linked to resources of the first content publisher 1150*a* and presented on respective source resources. For example, referring to FIG. 11B, the plurality of interactions from the second client device may include a fourth click on an encoded link linked to "mtv.com" that was presented on "dogs.com", and a fifth click on the encoded link linked to "mtv.com" that was presented on "cats.com."

In some embodiments, referring to FIGS. 11A and 11B, the link generation engine 1115 may generate encoded links linked to resources of a particular content publisher so that the particular content publisher can be identified from the encoded links. In some embodiments, the link generation engine 1115 may encode an URL into an encoded URL that comprises a domain name configured, specified or identified by the particular content publisher. In some embodiments, the link generation engine 1115 may encode an URL into an encoded URL that comprises a content publisher ID (see the content publisher table 1167 in FIG. 11B) identifying the particular content publisher. For example, referring to FIG. 11B, the link generation engine 1115 may encode an URL of the resource "dogs.com" into an encoded URL that comprises content publisher ID "5". Similarly, the link generation engine 1115 may encode an URL of the resource "cats.com" into an encoded URL that comprises content publisher ID "5" because both "dogs.com" and "cats.com" belong to the same content publisher.

In some embodiments, referring to FIGS. 11A and 11B, the cookie management engine 1120 may store the plurality of requests to access encoded links in a data structure, the data structure including data identifying the source URL on which the encoded link was presented, the identity of the first content publisher, the destination URL identifying the resource of the first content publisher, and the cookie provided to the client device. For example, referring to FIG. 11B, the cookie management engine 1120 may store the plurality of requests to access encoded links in the resource requests table 1160, which includes data identifying a cookie provided to a client device (e.g., the cookie ID field 1161), a source URL (e.g., the source resource field 1162) of a source resource on which the encoded link was presented, the identity of the content publisher of the source resource (e.g., the source content publisher ID field 1163), the destination URL of a destination resource accessed via the encoded link (e.g., the destination resource field 1164), the identity of the content publisher of the destination resource (e.g., the destination content publisher ID field 1165).

Referring to FIG. 11C, at step 1182, the server may identify from the interactions, cookies assigned to unique client devices. In some embodiments, referring to FIGS. 11A and 11B, from the plurality of interactions, the cookie management engine 1120 may identify a cookie of the linking system 120 assigned to the second client device and retrieve the ID of the cookie (e.g., 2) by looking up the database 230 with information of the second client device, e.g., an IP address of the second client device. Upon receiving of the plurality of interactions from the second client device, the cookie management engine 1120 may also receive the access requests corresponding to the interactions to access the encoded links. In some embodiments, the cookie management engine may store data corresponding to the requests received from the second client device. For example, referring to FIG. 11B, the cookie management engine may identify the content publisher IDs of the resource "mtv.com" and two source resources "dogs.com" and "cats.com" as 1, 5 and 5, respectively using the content publisher table 1167. The cookie management engine may then store two database tuples having cookie ID "2" corresponding to the two requests (and the fourth and fifth clicks) in the resource requests table 1160 (see FIG. 11B).

In some embodiments, referring to FIG. 11A, when receiving the plurality of interactions from a first client, the cookie management engine 1120 may receive each request to access an encoded link from the first client device. For example, responsive to an interaction taken on the first encoded link 1152*a* that is linked to the first resource 1145*a* and included in the third resource 1154*a* as source resource, the first client device may generate and transmit a request to the cookie management engine 1120 to access the first resource 1140*a*. The cookie management engine 1120 may also identify i) a source URL identifying a resource on which the encoded link was presented and ii) a cookie of the linking system that is unique to the client device. For example, the cookie management engine 1120 may receive the request for access to the first resource 1145*a* and identify, responsive to receiving the request, from the request, i) the source URL identifying the third resource 1154*a* on which the encoded link 1152*a* was presented and ii) a cookie of the linking system that is unique to the first client device. In addition, the cookie management engine 1120 may generate a cookie responsive to determining that the cookie management engine did not previously assign a cookie to the browser of the first client device from which the request was received.

In some embodiments, referring to FIGS. 11A and 11B, the cookie management engine 1120 may identify, for each request, a source content publisher corresponding to the resource identified by the source URL. For example, as noted above, the cookie management engine 1120 may identify from the request, the source URL identifying the third resource 1154*a* on which the encoded link 1152*a* was presented. Next, in some embodiments, the cookie management engine 1120 may identify a source content publisher corresponding to the source URL of the third resource 1154 by looking up the content publisher table 1167. For example, when the cookie management engine 1120 identifies from a request (e.g., the request represented by the first tuple in the resource requests table 1160 in FIG. 11B) the source resource "yahoo.com" on which the encoded link linked to the "mtv.com" was presented, the cookie management engine 1120 may identify the content publisher ID "3" corresponding to the source resource "yahoo.com" by looking up the content publisher table 1167.

In some embodiments, referring to FIGS. 11A and 11B, the cookie management engine 1120 may further determine that a request includes a cookie of the linking system 120, and responsive to determining that the request does not include a cookie of the linking system, provide, to the client device, a unique cookie of the linking system. For example, the cookie management engine 1120 may receive a request from a first client device for access to the first resource 1145*a* and identify, responsive to receiving the request, from the request a cookie of the linking system that is unique to the first client device. The cookie management engine 1120 may generate a unique cookie of the linking system responsive to determining that the request does not include a cookie of the linking system, and provide to the first client device, the generated unique cookie.

In some embodiments, referring to FIG. 11A, the system or server 1100 of the linking system 120 may receive a plurality of requests to access destination resources of a plurality of content publishers via interactions with encoded links linked to the destination resources, the encoded links generated by the linking system and presented on source resources. In some embodiments, the server may store, for each cookie of the plurality of cookies, in memory, data indicating i) the destination resources of the plurality of content publishers accessed by the client device of the cookie, ii) the source resources on which encoded links linked to the resources accessed by the client device of the cookie; and iii) second resources accessed by the client device of the cookie. For example, in some embodiments, referring to FIG. 11B, the server may store in memory (e.g., as a data report 1156), for the cookie with ID "C1", data indicating i) the destination resources of the plurality of content publishers accessed by the client device of the cookie (e.g., "mtv.com"), ii) the source resources on which encoded links linked to the resources accessed by the client device of the cookie (e.g., "yahoo.com" and "facebook.com"), and iii) second resources accessed by the client device of the cookie (e.g., "abc.com"). Similarly, in some embodiments, referring to FIG. 11B, the server may store in memory (e.g., as the data report 1156), for the cookie with ID "C2", data indicating i) the destination resources of the plurality of content publishers accessed by the client device of the cookie (e.g., "mtv.com"), ii) the source resources on which encoded links linked to the resources accessed by the client device of the cookie (e.g., "dogs.com" and "cats.com"), and iii) second resources accessed by the client device of the cookie (e.g., Null for the cookie with ID "C2").

Referring to FIG. 11C, at step 1184, the server may identify second content publishers having resources that were accessed by client devices corresponding to the cookies via encoded links generated by the server. In some embodiments, the content publisher identification engine 1125 may identify second content publishers having resources that were accessed by the same client devices corresponding to the plurality of cookies. In some embodiments, the identification may be performed by issuing a database query to the database 230, e.g., SQL SELECT statement, on the resource requests table 1160. For example, referring to FIG. 11, by selecting all tuples having the cookie ID "1" from the resource requests table 1160, the identification engine 1125 may identify two content publishers, those with content publisher ID "1" and "2", having the resources "mtv.com" and "abc.com" that were accessed by the same first client device corresponding to the cookie ID "1".

Referring to FIG. 11C, at step 1186, the server may provide, to the first content publisher, data corresponding to the identified second content publishers having resources accessed by client devices that also accessed the resources of the first content publisher. In some embodiments, the content publisher identification engine 1125 may provide, to a first content publisher, data corresponding to identified content publishers having resources accessed by the same client devices that also accessed resources of the first content publisher. For example, referring to FIG. 11B, by selecting all tuples having the cookie ID "1" and not having the destination content publisher ID "1", the content publisher identification engine 1125 may provide, to the first content publisher with ID "1", data corresponding to the identified content publishers (e.g., the content publisher with ID "2") having resources (e.g., "abc.com") accessed by the same first client device that also accessed resources (e.g., "mtv.com") of the content publisher with ID "1".

In some embodiments, referring to FIGS. 11A and 11B, the content publisher identification engine 1125 may provide, to a first content publisher, data corresponding to identified source content publishers having resources identified by the source URLs that are accessed by the client devices that also accessed (destination) resources of the first content publisher. For example, referring to the resource request table 1160 in FIG. 11B, the content publisher identification engine 1125 may identify all source URLs that are accessed by the first client device corresponding to cookie ID "1" that also accessed resources of the first content publisher with ID "1" by selecting data in the source resource field 1162 of all tuples having "1" in the cookie ID field and "1" in the destination content publisher. As a result, the content publisher identification engine 1125 may identify the resources "yahoo.com" and "facebook.com" as source URLs that are accessed by the first client device that also accessed resources of the first content publisher.

In some embodiments, referring to FIGS. 11A and 11B, the content publisher identification engine 1125 may receive, from the first content publisher 1150a, a request to identify content publishers that have resources that have been accessed by client devices that also accessed the first content publisher 1150a. In some embodiments, the first content publisher 1150a may use an application including a browser to send a resource identification request to the content publisher identification engine 1125. In some embodiments, the application may be a mobile application, generally referred to as an app, executing on a mobile device, such as a smart phone or tablet device. In some embodiments, the application may include an add-on, extension, script, ActiveX control, applet, widget or other types and forms of executable instructions executed by or in a browser. In some embodiments, the application may include, use or call one or more APIs to the content audience analysis system 1100. The application may be programmed to programmatically integrate the content audience analysis system 1100, or interface thereto, into the application. Via the one or more APIs, the application may access data from the content audience analysis system 1100. Via the one or more APIs, the application may perform or execute any of the functions or operations of the content audience analysis system 1100. Via the one or more APIs, the application may perform or execute any of the systems and methods described herein. In some embodiments, responsive to the resource identification request from a particular content publisher, the content publisher identification engine 1125 may identify content publishers that have resources that have been accessed by client devices that also accessed the particular content publisher. In some embodiments, for example, referring to FIG. 11B, the content publisher identification engine 1125 may identify content publishers that have resources that have been accessed by client devices that also accessed the (destination) content publisher with ID "P1", by first selecting data in the cookie ID field 1161 of all tuples having "P1" in the destination content publisher field. Next, responsive to identification of client devices with cookie IDs "C1" and "C2" as a result of the selection, the content publisher identification engine 1125 may further select data in the destination content publisher ID field 1165 of all tuples having "C1" or "C2" in the cookie ID field. Next, as a selection result, the content publisher identification engine 1125 may identify two destination content publishers with IDs "P1" and "P2". Finally, the content publisher identification engine 1125 may identify the content publisher with ID "P2" as a content publisher (other than the content publisher with ID "1") that has resources that have been accessed by the client devices that also accessed the (destination) content publisher with ID "P1". In some embodiments, the content publisher identification engine 1125 may issue a database query statement to identify the result.

In some embodiments, the server may provide to a content publisher of the plurality of content publishers (e.g., the content publisher with ID "P1"), statistics derived from the stored data. For example, for providing to the content publisher with ID "P1", the statistics may include i) the number of unique source resources on which encoded links linked to the destination resources of the content publisher with ID "P1" were presented (e.g., four unique source resources—"yahoo.com", "facebook.com", "dogs.com" and "cats.com"); ii) the most frequent source resource on which encoded links linked to the destination resources of the content publisher with ID "P1" were presented; iii) the most frequent content publisher having resources on which encoded links linked to the destination resources of the content publisher with ID "P1" were presented (e.g., the most frequent content publisher having source resources is the content publisher with ID "P5" having two source resources "dogs.com" and "cats.com"; and iv) the number of other content publishers that are accessed by client devices that also accessed destination resources of the content publisher with ID "P1" (e.g., there is only one other content publisher (the one with ID "P2") that is accessed by the same client device(s) that also accessed destination resources of the content publisher with ID "P1").

L. Systems and Methods for Benchmarking Online Activity via Encoded Links

Systems and methods of benchmarking online activity via encoded links generated by a linking system via encoded links are described. The present solution includes an online activity benchmarking system configured to identify multiple encoded links that are each generated by the online activity benchmarking system and linked to an information resource. The online activity benchmarking system can identify, from an activity log maintaining entries corresponding to request to access encoded links generated by the online activity benchmarking system, a plurality of requests to access a link of the identified multiple encoded links that are linked to the information resource. The online activity benchmarking system can identify one or more attributes corresponding to each request of the plurality of requests to access the information resource via the encoded links to the information resource. The online activity benchmarking system may then categorize the requests based on the identified attributes and provide a statistics output corresponding to the categorized requests. Generally, the identified encoded links linked to the information resource may allow the online activity benchmarking system to track statistics for each request received via the identified encoded links, categorize the requests based on one or more attributes, and provide output statistics corresponding to the categorized requests. For example, statistics of requests received via encoded links can be calculated by analyzing user interactions (e.g., clicks) on corresponding encoded links. The information can be categorized or tabulated to generate statistics.

As described herein, the activity log can store data corresponding to each request. The activity log can store, for each entry corresponding to a request to access an encoded link, data identifying one or more attributes of the request. Examples of the attributes of the request can include i) a source resource on which the encoded link is presented when accessed, ii) a destination resource to which the encoded link is linked, iii) a time of the request; iv) a cookie of the online activity benchmarking system assigned to the client device from which the request was received; v) a topic of the source resource; vi) a topic of the destination resource, vii) a type of client device accessing the content; viii) the location or IP address of the client device, among others.

The online activity benchmarking system can perform analysis of the data to identify certain trends, for example, attributes or characteristics of popular links and unpopular links. The online activity benchmarking system can further generate recommendations based on such trends. In one example, a first information resource can have multiple encoded links which can be posted on webpages in various verticals (e.g., sports, news and music). Based on the statistics of requests received via each of the encoded links, the online activity benchmarking system 1200 can benchmark the performance of the first information resource across the different verticals, device types or geolocations of the users, among others.

Figure 12A:
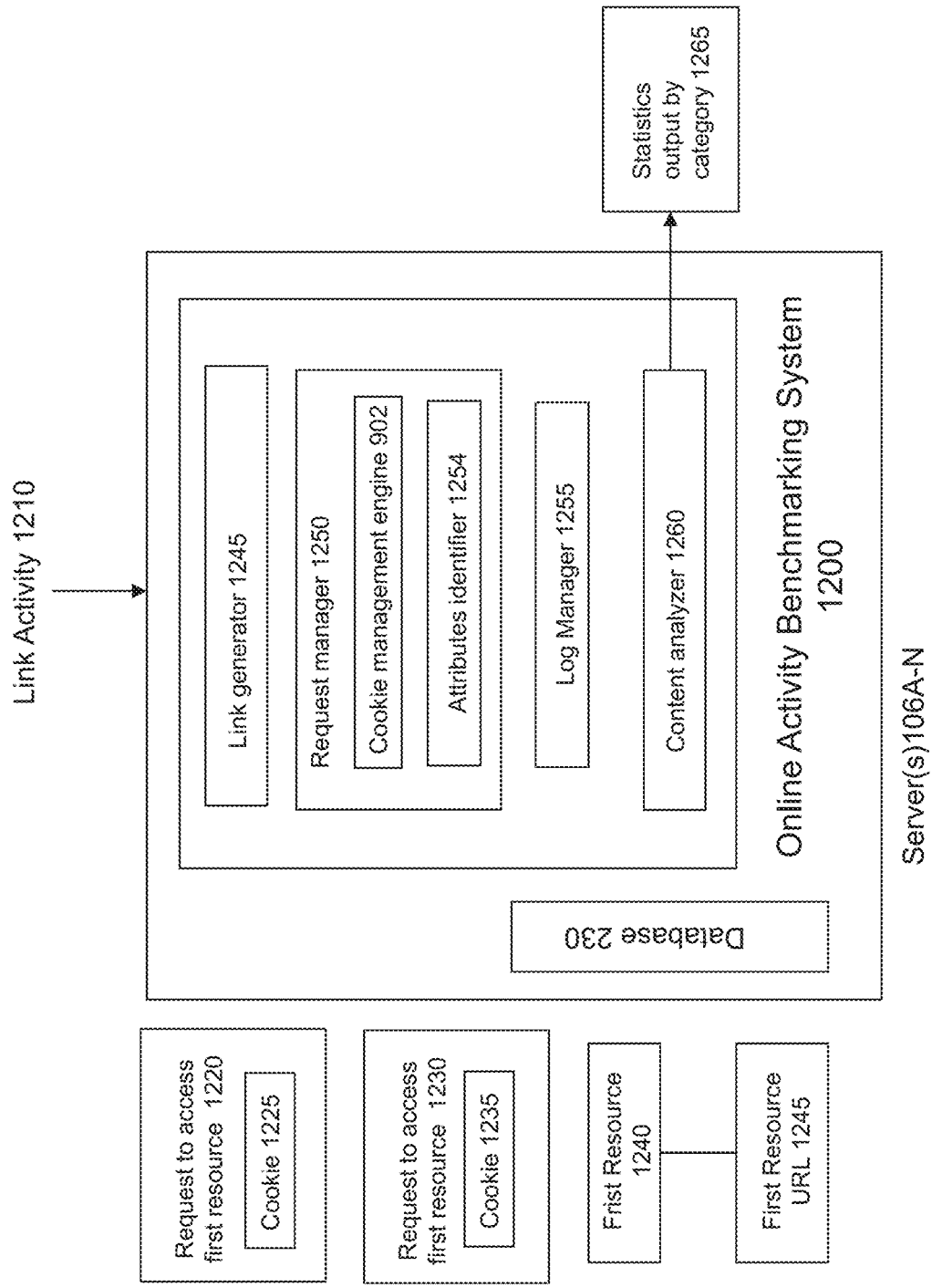
FIG. 12A is a diagram of an embodiment of a system to benchmark online activity via encoded links.

Referring to FIG. 12A, the online activity benchmarking system 1200 can be a part of the linking system 120 or may include components and functionality of the linking system 120, as shown in FIGS. 2A-11C. The online activity benchmarking system 1200 may include a link generator 1245, a request manager 1250, a log manager 1255 and a content analyzer 1260. The request manager 1250 can include a cookie management engine 902 and an attributes identifier 1254. The online activity benchmarking system 1200 also can include a database 230 described herein with respect to FIGS. 2A-12B.

The link generator 1245 can include one or more executable instructions, code, scripts, programs, or modules configured to receive requests to generate encoded links. In some implementations, the link generator 1245 can receive a request from a client device to generate an encoded link. The request can include a resource identifier that is associated with a resource or content for which to generate the link. For instance, a content publisher, via a client device of the content publisher, can transmit a request to the link generator 1245 to generate a link to a particular resource. The particular resource can be a resource hosted on a server of the content publisher (or accessible via a domain of the content publisher), or in some implementations, a resource hosted on a server of any other content publisher or accessible via any other domain. In some embodiments, users may request to generate encoded links to information resources, for instance, to share on a social media website. The link generator 1245 can generate the encoded link. The encoded link corresponds to a resource maintained by the online activity benchmarking system 1200 and configured such that when a request to access the encoded link is received by the online activity benchmarking system 1200, the online activity benchmarking system 1200 can transmit a response to the client device requesting access redirecting the client device to the resource to which the encoded link is linked. The online activity benchmarking system 1200 is configured to store data associated with the request and can use the information associated with the request to track online activity, as will be described herein. In some implementations, the link generator 1245 can include one or more components of other engines, modules, or components described with respect to the linking system 120 described with respect to FIGS. 2A-11C.

The link generator 1245 or the online activity benchmarking system 1200 can maintain a plurality of encoded links and resources associated with the encoded links that are configured to cause client devices requesting to access the encoded links to be redirected to other resources to which the encoded links are linked. In some implementations, the online activity benchmarking system 1200 can maintain a database, such as database, that can be configured to maintain a mapping of encoded links to resources to which to redirect client devices accessing the encoded links.

The request manager 1250 can include one or more executable instructions, code, scripts, programs, or modules configured to receive a request from a content publisher to provide statistical information relating to one or more information resources of the content publisher. The request manager 1250 can be configured to identify, for an information resource of the content publisher, a plurality of encoded links generated by the link generator 1245 that are linked to the information resource. In some embodiments, the request manager 1250 can perform a lookup in a data structure maintaining a mapping of encoded links to information resources to identify each of the encoded links linked to the information resource. For instance, if the information resource has a resource identifier example1.com, the request manager 1250 can perform a lookup to identify each of the encoded links that are linked to the resource identifier example1.com.

The request manager 1250 can be configured to identify, for each of the identified plurality of encoded links, a plurality of requests to access the information resource. The request manager 1250 can perform a lookup in a data structure that maintains an activity log of all of the requests to access encoded links generated by the link generator 1245. The activity log can be updated to maintain request related information in the activity log for each request to access an information resource via an encoded link generated by the link generator 1245.

The log manager 1255 can include one or more executable instructions, code, scripts, programs, or modules configured to create, maintain, manager and update an activity log. The activity log can include one or more data structures stored in the database 230 and can include data corresponding to link activity 1210. In some embodiments, the log manager 1255 of the online activity benchmarking system 1200 can identify link activity 1210. Link activity can include any actions performed by users of one or more client devices on encoded links generated by the link generator 1255. Examples of actions can include clicking on encoded links, sharing encoded links, requesting to generate the encoded links, among others. The log manager 1255 can identify these actions and record the actions in the database 230. In some embodiments, the database 230 can include one or more data structures for recording link activity. For instance, each time a client device requests access (for instance, by clicking) to a link generated by the link generator 1255, the log manager 1255 can identify the activity (for instance, the request to access the link) and update one of the data structures to include the identified activity.

The activity log can be configured to include an entry for each request to access an information resource via an encoded link generated by the link generator 1245. The log manager 1255 can be configured to insert an entry in the activity log responsive to the online activity benchmarking system 1200 receiving a request to access an information resource via an encoded link generated by the link generator 1245. Each entry can include various types of information. In some embodiments, each entry can include values corresponding to a plurality of attributes across which different information resources of content publishers can be benchmarked.

The activity log can store data corresponding to each request. The activity log can store, for each entry corresponding to a request to access an encoded link, data identifying one or more attributes of the request. Examples of the attributes of the request can include i) a source resource on which the encoded link is presented when accessed, ii) a destination resource to which the encoded link is linked, iii) a time of the request; iv) a cookie of the online activity benchmarking system assigned to the client device from which the request was received; v) a topic of the source resource; vi) a topic of the destination resource, vii) a type of client device accessing the content; viii) the location or IP address of the client device, among others.

The cookie management engine 902 may comprise an application, program, library, service, script, process, task or any type and form of executable instructions executing or executable on a device. The cookie management engine 902 may comprise logic, function or operations to create a cookie relating to a particular client device or application or program (e.g., browser) in a client device, and store, update and retrieve the cookie. More particularly, the cookie generator 904 can be configured to create a cookie relating to the particular client device or application or program in a client device, and to update the cookie. The cookie management engine 902 can create a plurality of cookies relating to respective client devices or applications or programs (e.g., browsers) in a client device, and store, update and retrieve the plurality of cookies.

The cookie management engine 902 can be configured to correlate a client device or application or program to a plurality of source resources and destination resources to which the same client device or application or program has provided requests to access resources linked to encoded links generated by the online activity benchmarking system 1200. In some embodiments, to perform such correlations, the cookie management engine 902 may comprise the link decoder 212 configured to decode an encoded URL, such as via the database 230 and perform a lookup of the URL corresponding to the shortened or encoded URL (see FIG. 2). The cookie management engine 902 may also correlate the client devices or applications or programs to source resources from which the same client device or application or program has generated request to access another resource (by clicking encoded links on those source resources by users of the client devices or applications or programs).

In some embodiments, to perform such correlations, the cookie management engine 902 can be configured to identify source resource information from a header of a request generated by a client device (e.g., the HTTP header field of referrer). For example, referring to FIG. 9A, responsive to a request to access a second resource via an encoded link, the cookie management engine 902 may generate a cookie correlating the client device to both a first resource from which the client device generated a request to access the second resource and the second resource. Responsive to the online activity benchmarking system receiving a subsequent request to access a third resource via another encoded link from the same client device, the cookie management engine 902 may update the same cookie assigned to the client device so as to correlate the client device to the first resource, second resource and the third resource.

The attributes identifier 1254 of the request manager 1250 can be configured to identify, for each request to access the information resource via the plurality of encoded links, values of one or more attributes corresponding to the request. The attributes identifier 1254 can identify the values of one or more attributes from the entries of the activity log that correspond to the identified plurality of requests. In some embodiments, the attributes identifier 1254 can identify values of a subset or portion of the attributes for which benchmarking can be performed. In some embodiments, depending on the request to benchmark data, the attributes for which benchmarking is to be performed per the request are included in the request to benchmark.

In some embodiments, the cookie management engine 902 of the request manager 1250 can identify, from the multiple requests to access the information resource for which a plurality of encoded links were identified by the request manager 1250, multiple cookies generated by the cookie management engine 902 that are assigned to unique client devices. The attributes identifier 1254 can identify, from a cookie corresponding to each request, one or more attributes corresponding to the request. For example, the attributes identifier 1254 can identify, from a cookie relating to a particular client device, a plurality of resources accessed by the particular client device and identify one or more characteristics unique to the particular client device (as attributes of each request) by classifying the accessed plurality of resources. In some embodiments, the identification of client device characteristics can be performed by classification based on keywords or domains or URLs extracted from the accessed plurality of resources or a list of phrases extracted from a click history stored in the cookie. For example, referring to FIG. 12A, the attributes identifier can identify, from a cookie 1225 corresponding to the request 1220, a plurality of resources accessed by a first client device corresponding to the cookie 1225. The attributes identifier can identify characteristics of the first client device (e.g., preference for a sports vertical) as an attribute for the request 1220 by classifying the identified plurality of resources. Similarly, the attributes identifier can identify, from a cookie 1235 corresponding to the request 1230, a plurality of resources accessed by a second client device corresponding to the cookie 1235. The attributes identifier can further identify characteristics of the second client device (e.g., preference for a music vertical) as an attribute for the request 1230 by classifying the identified plurality of resources.

The content analyzer 1260 can include one or more executable instructions, code, scripts, programs, or modules configured to categorize the requests to access the information resource via the encoded links based on the one or more identified attributes. The content analyzer 1260 can categorize the requests by sorting the requests according to one or more attributes. For instance, requests that were received when the client devices transmitting the request were accessing a first information resource can be categorized or grouped together, while requests that were received when the client devices transmitting the request were accessing a second information resource can be categorized or grouped together. In some embodiments, requests that were received from mobile phones can be assigned to a particular category, while requests that were received from laptops (or non-mobile computing devices) can be assigned to another category, among others. The categories across which requests can be categorized is based on the attributes and the values of the attributes that are stored in the activity log.

The content analyzer 1260 can further be configured to generate one or more reports for presentation that presents graphics or any other content that provides statistics based on the requests to access the information resource via the encoded links linked to the information resource. The content analyzer 1260 can generate the report responsive to a request from a content publisher to provide statistics related to the information resource. In some embodiments, the content analyzer 1260 can generate a report comparing the performance of a first information resource and a second information resource based on determining statistics from requests to access each of the first information resource and the second information resource via respective encoded links generated by the link generator 1245.

In some embodiments, the content analyzer 1260 can determine a first number of requests to access the information resource via encoded links of the online activity benchmarking system 1200 that are displayed on webpages corresponding to the first vertical. Similarly, the content analyzer 1260 can determine a second number of requests to access the information resource via encoded links of the online activity benchmarking system 1200 that are displayed on webpages corresponding to a second vertical. The content analyzer can determine to which vertical a webpage belongs based on an analysis of the domain name, other webpages of the domain, keywords in the webpage, identity of users that access the information resource, and via cookies assigned to the users, identity of other webpages the users have visited, among others. The content analyzer 1260 can then provide, for presentation, a visual content item (e.g., graphs, charts or other graphical representations of the statistics output 1265) based on at least one of the first number of requests or the second number of requests. For example, the content analyzer can provide the first number of requests via encoded links present on webpages corresponding to the first vertical (e.g., sports) and the second number of requests via encoded links present on webpages corresponding to the second vertical (e.g., music) per different types of client devices performing each request (e.g., mobile devices and desktop devices) during different months (e.g., September 2014, October 2014, November 2014, and December 2014).

Figure 12B:
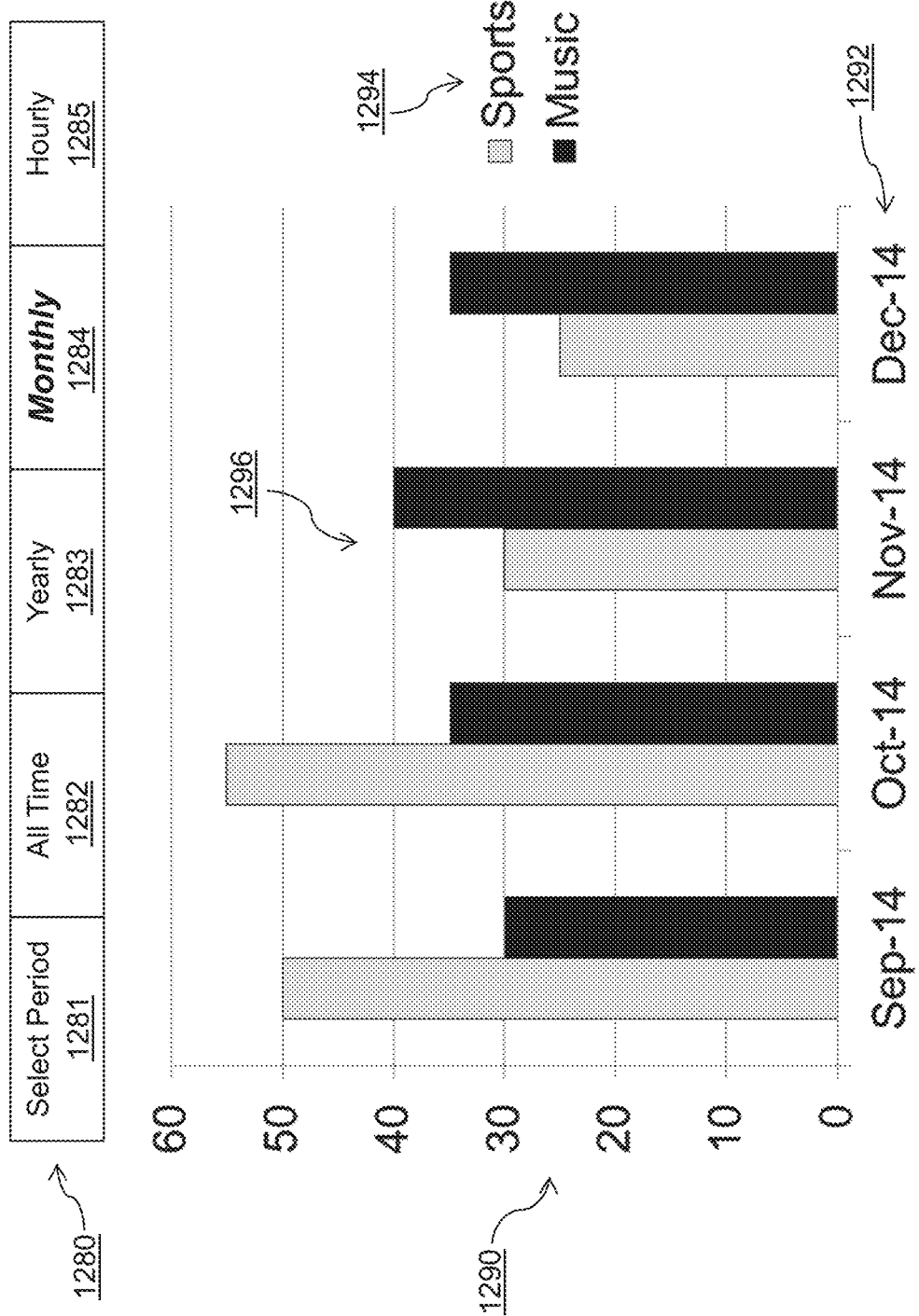
FIG. 12B is an example statistics output of an embodiment of a system to benchmark online activity via encoded links.

Referring now to FIG. 12B, an example statistics output of an embodiment of the content analyzer 1260 for providing a visual content item is depicted. In some embodiments, as shown in FIG. 12B, the content analyzer 1260 can provide, for presentation, a bar chart 1296 of the statistics output 1265 including a first number of requests corresponding to the first vertical (e.g., sports) and a second number of requests corresponding to the second vertical (e.g., music). In some embodiments, the content analyzer 1260 can provide a user interface 1280 to select different granularity of time periods, for example, all time 1282, yearly 1283, monthly 1284 and hourly 1285. In some embodiments, the user interface 1280 can include an interface 1281 to select a custom period (e.g., from January 2014 to December 2014). In some embodiments, the user interface 1280 can include web-based user interfaces, e.g., tabs (as shown in FIG. 12B), radio buttons, dropdown lists, list boxes, buttons, dropdown buttons, etc. In some embodiments, as shown in FIG. 12B, when "monthly" time period is selected, the content analyzer 1260 can provide a bar chart of the statistics output 1265 including the number of requests per different verticals 1294 (e.g., sports and music) during different monthly time periods of requests 1292 (e.g., September 2014, October 2014, November 2014, and December 2014).

In some embodiments, the content analyzer 1260 can rank each of the first and second encoded links based on their respective number of requests across the at least one attribute (e.g., per different verticals, per different time periods during which each request is performed, per different types of a client device performing each request, etc.).

In some embodiments, the content analyzer 1260 can determine a first number of requests to access the information resource via encoded links of the online activity benchmarking system 1200 that are received from a first referral source. In some embodiments, the first referral source can be determined based on a source URL on which each request is performed. Similarly, the content analyzer 1260 can determine a second number of requests to access the information resource via encoded links of the online activity benchmarking system 1200 that are received from a second referral source. The content analyzer 1260 can provide, for presentation a visual content item based on at least one of the first number of requests or the second number of requests. In some embodiments, the content analyzer 1260 can then provide, for presentation, a visual content item (e.g., graphs, charts or other graphical representations) based on at least one of the first number of requests performed on the first referral source or the second number of requests performed on the second referral source.

Referring now to FIG. 12C, an embodiment of a method for benchmarking online activity via encoded links is depicted. In brief overview, at step 1270, the system or server 1200 may identify, for an information resource, a plurality of encoded links encoded by the server of the online activity benchmarking system 1200 and linked to the information resource. At step 1272, the server 1200 may receive via the identified plurality of encoded links, a plurality of requests to access the information resource. At step 1274, the server 1200 may identify for each request of the plurality of requests to access the information resource, one or more attributes corresponding to the request. At step 1276, the server 1200 may categorize the plurality of requests to access the information resource based on the one or more identified attributes. At step 1278, the server 1200 may provide for presentation, an output indicating statistics corresponding to the categorized plurality of requests based on the one or more identified attributes.

More particularly, at step 1270, the system or server 1200 may identify, for an information resource, a plurality of encoded links encoded by the server of the online activity benchmarking system 1200 and linked to the information resource. The link generator 1245 or the online activity benchmarking system 1200 can maintain a plurality of encoded links and resources associated with the encoded links that are configured to cause client devices requesting to access the encoded links to be redirected to other resources to which the encoded links are linked. In some implementations, the online activity benchmarking system 1200 can maintain a database, such as database, that can be configured to maintain a mapping of encoded links to resources to which to redirect client devices accessing the encoded links.

The request manager 1250 can receive a request from a content publisher to provide statistical information relating to one or more information resources of the content publisher. The request manager 1250 can be configured to identify, for an information resource of the content publisher, a plurality of encoded links generated by the link generator 1245 that are linked to the information resource. In some embodiments, the request manager 1250 can perform a lookup in a data structure maintaining a mapping of encoded links to information resources to identify each of the encoded links linked to the information resource. For instance, if the information resource has a resource identifier example1.com, the request manager 1250 can perform a lookup to identify each of the encoded links that are linked to the resource identifier example1.com.

At step 1272, the server 1200 may receive via the identified plurality of encoded links, a plurality of requests to access the information resource. Referring to FIG. 12A, for example, the request manager 1250 can receive, via the identified multiple encoded links, a request 1220 and a request 1230, both to access the same first resource 1240. The request manager 1250 can be configured to identify, for each of the identified plurality of encoded links, a plurality of requests to access the information resource. The request manager 1250 can perform a lookup in a data structure that maintains an activity log of all of the requests to access encoded links generated by the link generator 1245. The activity log can be updated to maintain request related information in the activity log for each request to access an information resource via an encoded link generated by the link generator 1245. In some embodiments, the request manager 1250 of the online activity benchmarking system 1200 can identify link activity 1210. Link activity can include any actions performed by users of one or more client devices on encoded links generated by the link generator 1255. Examples of actions can include clicking on encoded links, sharing encoded links, requesting to generate the encoded links, among others. The online activity benchmarking system 1200 can identify these actions and record the actions in the database 230. In some embodiments, the database 230 can include one or more data structures for recording link activity. For instance, each time a client device requests access (for instance, by clicking) to a link generated by the link generator 1255, the request manager 1250 can identify the activity (for instance, the request to access the link) and update one of the data structures to include the identified activity.

The activity log can be maintained in the database 230 by the online activity benchmarking system 1200. The activity log can be configured to include an entry for each request to access an information resource via an encoded link generated by the link generator 1245. A log manager (not shown) can be configured to insert an entry in the activity log responsive to the online activity benchmarking system 1200 receiving a request to access an information resource via an encoded link generated by the link generator 1245. Each entry can include various types of information. In some embodiments, each entry can include values corresponding to a plurality of attributes across which different information resources of content publishers can be benchmarked.

The activity log can store data corresponding to each request. The activity log can store, for each entry corresponding to a request to access an encoded link, data identifying one or more attributes of the request. Examples of the attributes of the request can include i) a source resource on which the encoded link is presented when accessed, ii) a destination resource to which the encoded link is linked, iii) a time of the request; iv) a cookie of the online activity benchmarking system assigned to the client device from which the request was received; v) a topic of the source resource; vi) a topic of the destination resource, vii) a type of client device accessing the content; viii) the location or IP address of the client device, among others.

At step 1274, the server 1200 may identify for each request of the plurality of requests to access the information resource, one or more attributes corresponding to the request. The request manager 1250 can be configured to identify, for each request to access the information resource via the plurality of encoded links, values of one or more attributes corresponding to the request. The request manager 1250 can identify the values of one or more attributes from the entries of the activity log that correspond to the identified plurality of requests. In some embodiments, the request manager 1250 can identify values of a subset or portion of the attributes for which benchmarking needs to be performed. In some embodiments, depending on the request to benchmark data, the attributes for which benchmarking needs to be performed are included in the request to benchmark. In some embodiments, the identified one or more attributes can include a type of the client device, a geographic location of the client device, a time of day at which the request is performed, or a source Uniform Resource Locator (URL) on which the request is performed. In some embodiment, the geographic location of the client device can be identified from a domain of the client device.

At step 1276, the server 1200 may categorize the plurality of requests to access the information resource based on the one or more identified attributes. The content analyzer 1260 can categorize the requests to access the information resource via the encoded links based on the one or more identified attributes. The content analyzer 1260 can categorize the requests by sorting the requests according to one or more attributes. For instance, requests that were received when the client device transmitting the request was accessing a first information resource can be categorized or grouped together, while requests that were received when the client device transmitting the request was accessing a second information resource can be categorized or grouped together. In some embodiments, requests that were received from a mobile phone can be assigned to a particular category, while requests that were received from a laptop can be assigned to another category, among others. The categories across which requests can be categorized is based on the attributes and the values of the attributes that are stored in the activity log.

At step 1278, the server 1200 may provide for presentation, an output indicating statistics corresponding to the categorized plurality of requests based on the one or more identified attributes. The content analyzer 1260 can generate one or more reports for presentation that presents graphics or any other content that provides statistics based on the requests to access the information resource via the encoded links linked to the information resource. The content analyzer 1260 can generate the report responsive to a request from a content publisher to provide statistics related to the information resource. In some embodiments, the content analyzer 1260 can generate a report comparing the performance of a first information resource and a second information resource based on determining statistics from requests to access each of the first information resource and the second information resource via respective encoded links generated by the link generator 1245.

For example, the content analyzer 1260 can provide a statistics output corresponding to multiple requests based on different verticals and different request time periods as attributes. In some embodiments, the content analyzer 1260 can determine a first number of requests to access the information resource via encoded links of the online activity benchmarking system that are displayed on webpages corresponding to the first vertical. Similarly, the content analyzer 1260 can determine a second number of requests to access the information resource via encoded links of the online activity benchmarking system that are displayed on webpages corresponding to a second vertical. The content analyzer 1260 can then provide, for presentation, a visual content item (e.g., graphs, charts or other graphical representations of the statistics output 1265) based on at least one of the first number of requests or the second number of requests. For example, the content analyzer can provide the first number of requests via encoded links present on webpages corresponding to the first vertical (e.g., sports) and the second number of requests via encoded links present on webpages corresponding to the second vertical (e.g., music) per different types of client devices performing each request (e.g., mobile devices and desktop devices) during different months (e.g., September 2014, October 2014, November 2014, and December 2014).

It should be understood that any of the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA or in any script language, such as Python or TCL. The software programs may be stored on or in one or more articles of manufacture as object code.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed is:

1. A system for analyzing traffic across media channels, comprising:
    at least one server having one or more processors, configured to:
        receive, from a computing device, a request to generate encoded links for a resource of a first entity, the request identifying a first media channel, a second media channel, and the resource;
        generate a first encoded link for the first media channel and a second encoded link for the second media channel, the first encoded link and the second encoded link used to access the resource via the at least one server;
        store, in one or more data structures, a first association between the first encoded link and the first media channel and a second association between the second encoded link and the second media channel;

provide, to the first computing device, the first encoded link and the second encoded link, the first encoded link to be distributed via the first media channel, the second encoded link to be distributed via the second media channel;

determine, for the first media channel, a first metric based on a first number of requests to access the resource responsive to a first interaction with the first encoded link;

determine, for the second media channel, a second metric based on a second number of requests to access the resource responsive to a second interaction with the second encoded link; and provide, for the resource of the first entity, a report generated based on the first metric and the second metric.

2. The system of claim 1, wherein the at least one server is further configured to:

monitor for an interaction by one or more second computing devices with an encoded link corresponding to one of the first encoded link or the second encoded link to access the resource;

identify, responsive to detecting the action, a media channel corresponding to one of the first media channel or the second media channel via which the encoded link is distributed; and update a database to include a data structure associating the interaction with the encoded link and the media channel via which the encoded link is distributed.

3. The system of claim 1, wherein the at least one server is further configured to:

generate, responsive to detecting an interaction by one or more second computing device with an encoded link corresponding to one of the first encoded link or the second encoded lin to access the resource, a cookie for a media channel-corresponding to one of the first media channel or the second media channel associated with the encoded link on which the interaction is detected; and track the activity performed via a plurality of encoded links associated with the media channel to access one of a plurality of resources using the cookie generated by the server for the media channel.

4. The system of claim 1, wherein the at least one server is further configured to generate the first encoded link for the first media channel to access the resource subsequent to accessing a first content service, service associated with the first media channel to distribute the first encoded link; and the second encoded link for the second media channel to access the resource subsequent to accessing a second content service, the second service associated with the second media channel to distribute the second encoded link.

5. The system of claim 1, wherein the request identifies a first resource category and a second resource category; and wherein the at least one server is further configured to identify the first resource category as the first media channel and the second resource category as the second media channel.

6. The system of claim 1, wherein the at least one server is further configured to identify, responsive to detecting an interaction by one or more second computing devices with an encoded link corresponding to one of the first encoded link or the second encoded link to access the resource, a common resource identifier of the resource accessed is shared by the first media channel and the second media channel.

7. The system of claim 1, wherein the at least one server is further configured to maintain, on a database, a plurality of entries using the activity tracked via at least one of the first encoded link or via the second encoded link, each entry of the plurality of entries identifying at least one of the first encoded link or the second encoded link, at least one of the first media channel or the second media channel, and the resource accessible via the first encoded link and the second encoded link.

8. The system of claim 1, wherein the at least one server is further configured to provide an output based on at least one of the first metric for the first media channel and the second metric for the second media channel, the first metric identifying the first number of resources to access the resource via the first encoded link distributed through the first media channel, the second metric identifying the second number of requests to access the resource via the second encoded link distributed through the second media channel.

9. The system of claim 1, wherein the at least one server is further configured to rank the first media channel and the second media channel in accessing the resource based on the first metric for the first media channel and the second metric for the second media channel.

10. A method of analyzing traffic across media channels, comprising:

receiving, by a server having one or more processors, from a first computing device, a request to generate encoded links for a resource of a first entity, the request identifying a first media channel, a second media channel, and a resource;

generating, by the server, a first encoded link for the first media channel and a second encoded link for the second media channel, the first encoded link and the second encoded link used to access the resource via the server;

storing, by the server, in one or more data structures, a first association between the first encoded link with the first media channel and a second association between the second encoded link with the second media channel;

providing, by the server, to the first computing device, the first encoded link and the second encoded link, the first encoded link to be distributed via the first media channel, the second encoded link to be distributed via the second media channel;

determining, by the server, for the first media channel, a first metric based on a first number of requests to access the resource responsive to a first interaction with the first encoded link;

determining, by the server, for the second media channel, a second metric based on a second number of requests to access the resource responsive to a second interaction with the second encoded link; and providing, by the server, for the resource of the first entity, a report generated based on the first metric and the second metric.

11. The method of claim 10, wherein tracking further comprises:

monitoring for an interaction by one or more second computing devices with an encoded link corresponding to one of the first encoded link or the second encoded link to access the resource;

identifying, responsive to detecting the interaction, a media channel corresponding to one of the first media channel or the second media channel via which the encoded link is distributed; and updating a database to include a data structure associating the interaction with the encoded link and the media channel via which the encoded link is distributed.

12. The method of claim 10, further comprising generating, by the server, responsive to detecting an interaction by one or more second computing device with an encoded links corresponding to one of the first encoded link or the second encoded link to access the resource, a cookie for a media channel corresponding to one of the first media channel or the second media channel-associated with the encoded link on which the interaction is detected; and wherein tracking further comprises tracking the activity performed via an encoded link of the plurality of encoded links associated with the media channel to access one of a plurality of resources using the cookie generated by the server for the media channel.

13. The method of claim 10, further comprising generating, by the server, the first encoded link for the first media channel to access the resource subsequent to accessing a first service, the first service associated with the first media channel to distribute the first encoded link; and the second encoded link for the second media channel to access the resource subsequent to accessing a second service, the second service associated with the second media channel to distribute the second encoded link.

14. The method of claim 10, wherein the request identifies a plurality of resource categories for the plurality of media channels.

15. The method of claim 10, further comprising identifying, by the server, responsive to detecting an interaction by the one or more second computing devices with an encoded link corresponding to one of the first encoded link or the second encoded link to access the resource, a common resource identifier of the resource accessed is shared by the first media channel and the second media channel.

16. The method of claim 10, further comprising maintaining, by the server, on a database, a plurality of entries using the activity tracked via at least one of the first encoded link or via the second encoded link, each entry of the plurality of entries identifying at least one of the first encoded link or the second encoded link, at least one of the first media channel or the second media channel, and the resource accessible via the first encoded link and the second encoded link.

17. The method of claim 10, further comprising providing, by the server, an output based on at least one of the first metric for the first media channel and the second metric for the second media channel in accessing the resource, the first metric identifying a first number of resources to access the resource via the first encoded link distributed through the first media channel, the second metric identifying a second number of requests to access the resource via the second encoded link distributed through the second media channel.

18. The method of claim 10, further comprising ranking, by the server, the first media channel and the second media channel in accessing the resource based on the first metric for the first media channel and the second metric for the second media channel.

* * * * *